US012699777B2

(12) United States Patent
Marando et al.

(10) Patent No.:  US 12,699,777 B2
(45) Date of Patent:       Aug. 4, 2026

(54) OWNER REVOCATION EMULATION CONTAINER

(71) Applicant: Microchip Technology Incorporated, Chandler, AZ (US)

(72) Inventors: Eileen Marando, Bellmore, NY (US); Subhashini Vaidyanathan, New Westminster (CA)

( * ) Notice: Subject to any disclaimer, the term of this patent is extended or adjusted under 35 U.S.C. 154(b) by 210 days.

(21) Appl. No.: 18/386,102

(22) Filed: Nov. 1, 2023

(65) Prior Publication Data

US 2024/0152620 A1      May 9, 2024

Related U.S. Application Data

(60) Provisional application No. 63/423,021, filed on Nov. 6, 2022.

(51) Int. Cl.
G06F 21/57      (2013.01)
G06F 21/60      (2013.01)

(52) U.S. Cl.
CPC .......... G06F 21/575 (2013.01); G06F 21/602 (2013.01)

(58) Field of Classification Search
None
See application file for complete search history.

(56) References Cited

U.S. PATENT DOCUMENTS 11,250,134 B2      2/2022  Kumar 11,601,268 B2      3/2023  Hershman et al.
11,915,026 B1 *      2/2024  Chandrashekar ..... G06F 9/5077
2010/0037000 A1      2/2010  Kaabouch et al. ........... 711/103
(Continued)

FOREIGN PATENT DOCUMENTS

JP      2018-523930 T      8/2018  ............. G06F 21/44
JP      2022-028632 A      2/2022  ............. G06F 21/57
WO      2023/212178 A1      11/2023

OTHER PUBLICATIONS

International Search Report and Written Opinion, Application No. PCT/US2023/036839, 14 pages, Feb. 28, 2024.
(Continued)

*Primary Examiner* — Benjamin E Lanier
(74) *Attorney, Agent, or Firm* — SLAYDEN GRUBERT BEARD PLLC

(57)      ABSTRACT

A device having a processor and a boot code, the processor may create a plurality of revocation emulation containers corresponding to a plurality of owners of the electronic device over time, wherein respective revocation emulation containers may comprise asset revocation information associated with respective owners of the electronic device. The processor may program the asset revocation information of the plurality of revocation emulation containers in a one-time-programmable manner. The processor may use the asset revocation information of the plurality of revocation emulation containers to determine whether to revoke use of respective assets of a plurality of assets associated with the plurality of owners of the electronic device over time. The processor may revoke the subsequent use of respective assets of the plurality of assets associated with the plurality of owners of the electronic device over time based on a determination the respective asset should be revoked.

15 Claims, 44 Drawing Sheets

(56) References Cited

U.S. PATENT DOCUMENTS

| | | | | |
|---|---|---|---|---|
| 2015/0121070 A1* | 4/2015 | Lau | ........................ | G06F 21/572 |
| | | | | 713/189 |
| 2017/0180139 A1* | 6/2017 | Jeansonne | ............. | H04L 9/3236 |
| 2019/0068615 A1* | 2/2019 | Pack | ......................... | H04L 9/30 |
| 2020/0186350 A1 | 6/2020 | Wentz et al. | | |
| 2020/0403795 A1* | 12/2020 | Murdoch | ................ | H04L 9/321 |
| 2022/0164214 A1* | 5/2022 | Yu | ........................ | G06F 9/45558 |
| 2022/0382872 A1* | 12/2022 | Sakib | .................... | H04L 9/3247 |

OTHER PUBLICATIONS

Japanese Office Action, Application No. 2025-522605, 6 pages, Mar. 31, 2026.

\* cited by examiner

110

302

310

173

Non-Volatile Memory

311b

Container Content

| | |
|---|---|
| Owner Configuration | 501 |
| Owner ID | 502 |
| Owner RPMC | 503 |
| Owner Transfer Authorization Key | 504 |
| Encrypted ECDH Private Key | 505 |
| ECDH Public Key Hash | 506 |
| Key Hash Blob (KHB) Hash | 507 |
| TAGx Image Key Revocation | 508 |
| TAGx Image Rollback Protection | 509 |
| TAG0 Base Address Pointer | 510 |
| TAG1 Base Address Pointer | 511 |
| Debug Support | 512 |
| Platform ID | 513 |
| Security Features | 514 |
| PlatK Hash | 515 |
| PUF Activation Code | 621 |

FIG. 6

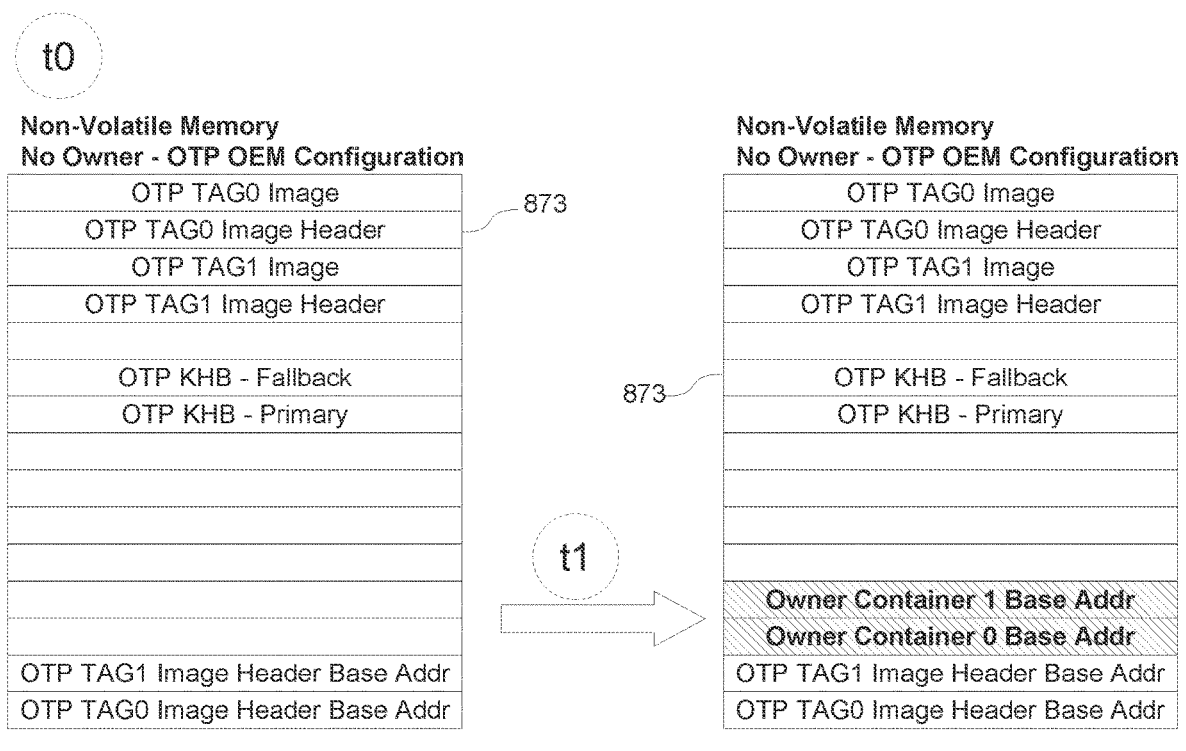
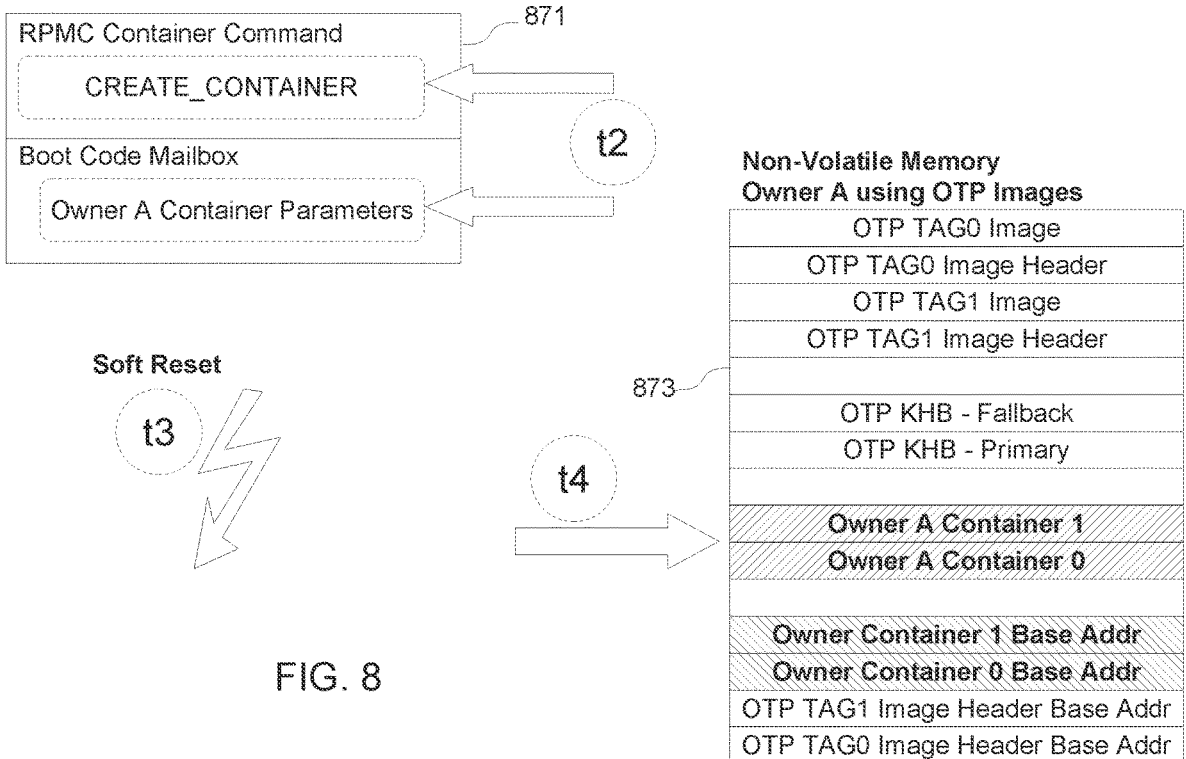
FIG. 8

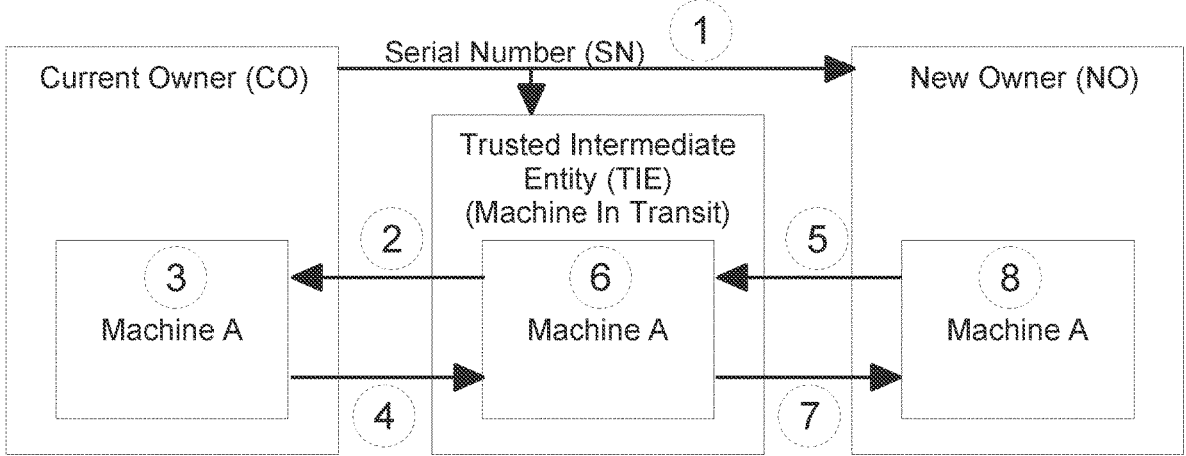

1. CO may send Machine A serial number to TIE and NO (if NO is known)

2. TIE may send OTAKpub1 key to CO

3. CO may run ENABLE_UNRESTRICTED_TRANSFERS command passing OTAKpub1 key as new OTAK public key 4. CO may send Machine A to TIE 5. NO may send OTAKpub2 key to TIE 6. TIE may run UPDATE_OTAK_KEY command passing OTAKpub2 key as new OTAK public key (TIE signs command with OTAKpriv1 key)

7. TIE may send Machine A to NO

8. NO may run UPDATE_CONTAINER_REQUEST with "transfer ownership" sub-command (NO signs command with OTAKpriv2 key)

FIG. 11

1. CO sends Machine B serial number to NO

2. NO sends OTAKpub3 key to CO

3. CO runs ENABLE_UNRESTRICTED_TRANSFERS command passing OTAKpub3 key as new OTAK public key 4. CO sends Machine B to UIE 5. UIE forwards Machine B to NO (as is)

6. NO runs UPDATE_CONTAINER_REQUEST with "transfer ownership" command (NO signs command with OTAKpriv3 key)

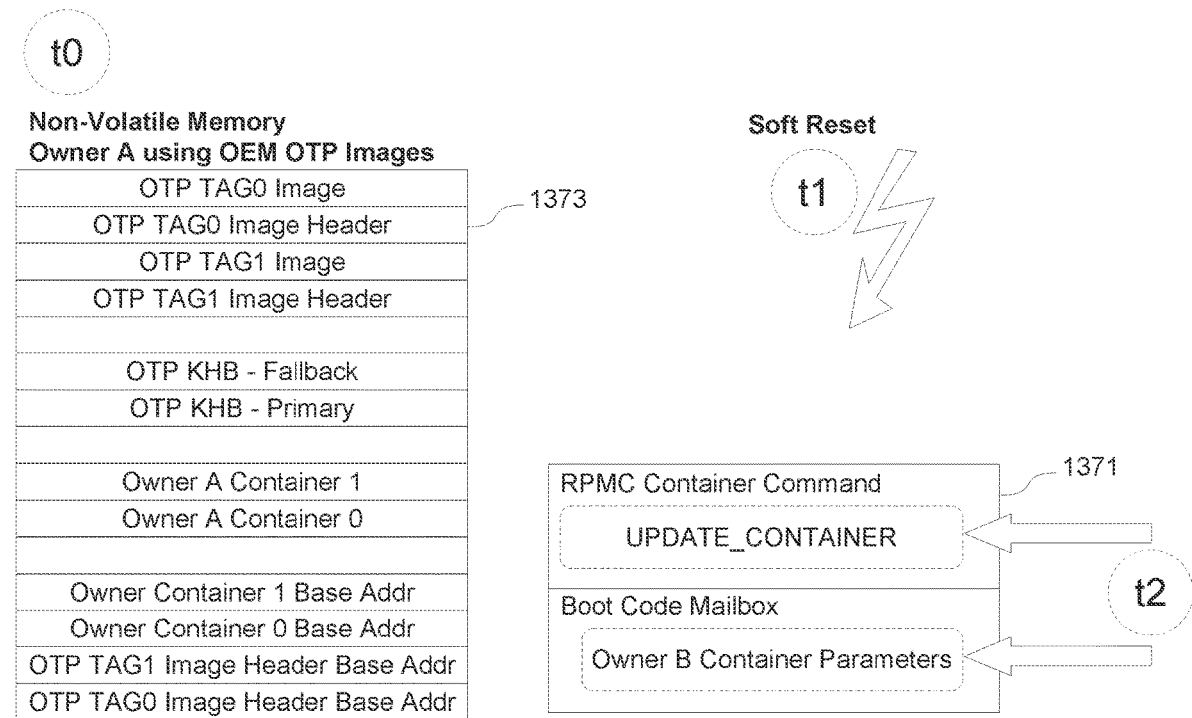
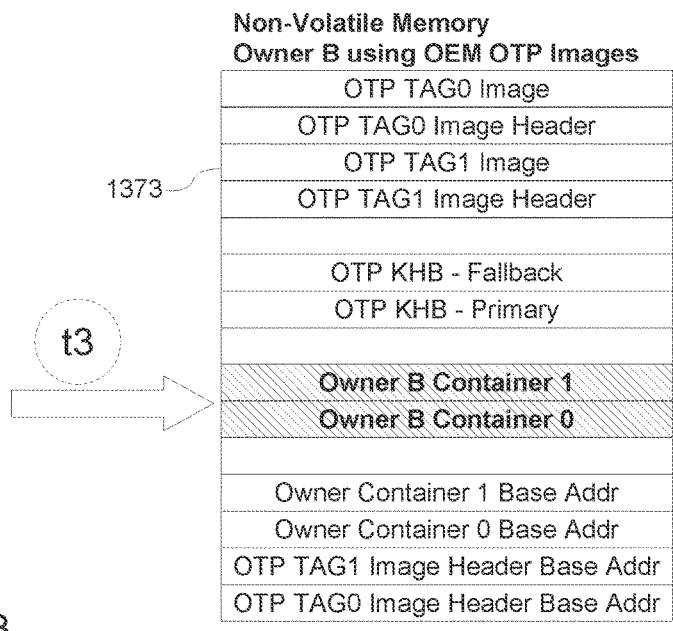
FIG. 13

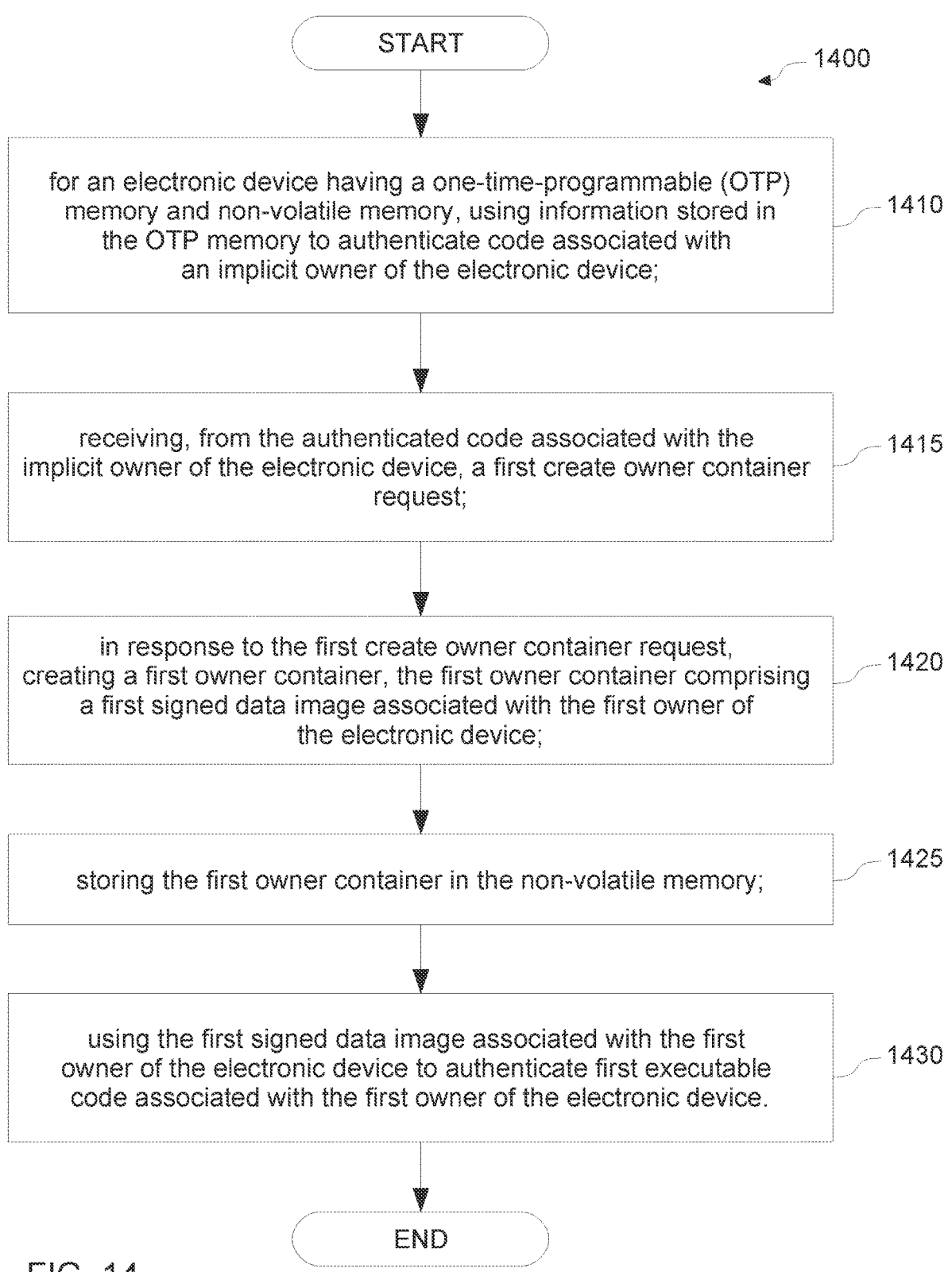

START

1400 for an electronic device having a one-time-programmable (OTP) memory and non-volatile memory, using information stored in the OTP memory to authenticate code associated with an implicit owner of the electronic device;

1410 receiving, from the authenticated code associated with the implicit owner of the electronic device, a first create owner container request;

1415 in response to the first create owner container request, creating a first owner container, the first owner container comprising a first signed data image associated with the first owner of the electronic device;

1420 storing the first owner container in the non-volatile memory;

1425 using the first signed data image associated with the first owner of the electronic device to authenticate first executable code associated with the first owner of the electronic device.

1430

END

FIG. 14

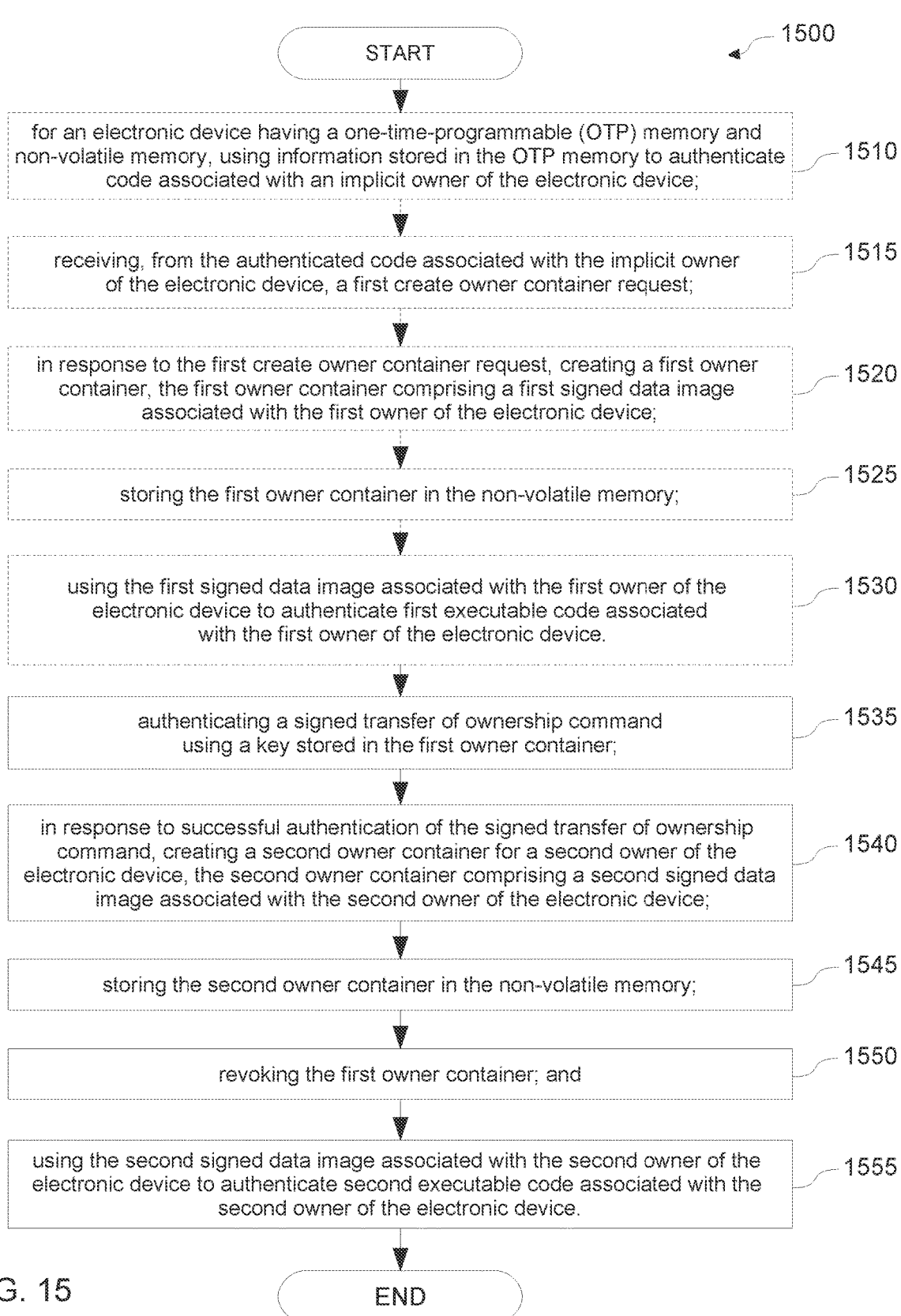

START

1500 for an electronic device having a one-time-programmable (OTP) memory and non-volatile memory, using information stored in the OTP memory to authenticate code associated with an implicit owner of the electronic device;

1510 receiving, from the authenticated code associated with the implicit owner of the electronic device, a first create owner container request;

1515 in response to the first create owner container request, creating a first owner container, the first owner container comprising a first signed data image associated with the first owner of the electronic device;

1520 storing the first owner container in the non-volatile memory;

1525 using the first signed data image associated with the first owner of the electronic device to authenticate first executable code associated with the first owner of the electronic device.

1530 authenticating a signed transfer of ownership command using a key stored in the first owner container;

1535 in response to successful authentication of the signed transfer of ownership command, creating a second owner container for a second owner of the electronic device, the second owner container comprising a second signed data image associated with the second owner of the electronic device;

1540 storing the second owner container in the non-volatile memory;

1545 revoking the first owner container; and

1550 using the second signed data image associated with the second owner of the electronic device to authenticate second executable code associated with the second owner of the electronic device.

1555

END

FIG. 15

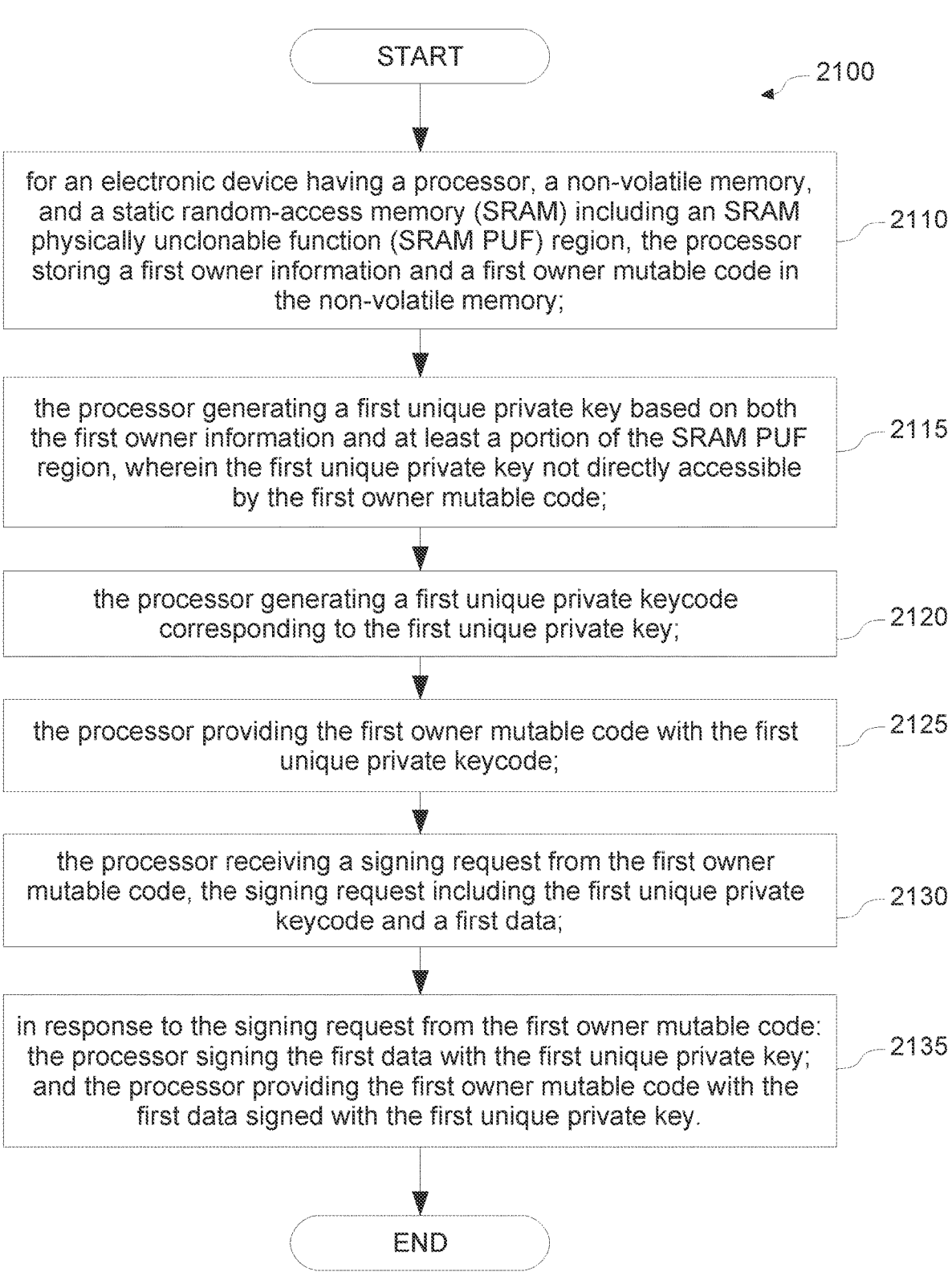

START

2100 for an electronic device having a processor, a non-volatile memory, and a static random-access memory (SRAM) including an SRAM physically unclonable function (SRAM PUF) region, the processor storing a first owner information and a first owner mutable code in the non-volatile memory;

2110 the processor generating a first unique private key based on both the first owner information and at least a portion of the SRAM PUF region, wherein the first unique private key not directly accessible by the first owner mutable code;

2115 the processor generating a first unique private keycode corresponding to the first unique private key;

2120 the processor providing the first owner mutable code with the first unique private keycode;

2125 the processor receiving a signing request from the first owner mutable code, the signing request including the first unique private keycode and a first data;

2130 in response to the signing request from the first owner mutable code: the processor signing the first data with the first unique private key; and the processor providing the first owner mutable code with the first data signed with the first unique private key.

2135

END

FIG. 21

START

2200

See blocks 2110-2135 (FIGURE 21)

2210 the processor receiving a key generation request from the first owner mutable code;

2215 in response to the key generation request from the first owner mutable code, the processor generating a first owner unique mutable code key based on at least a portion of the SRAM PUF region.

2220

END

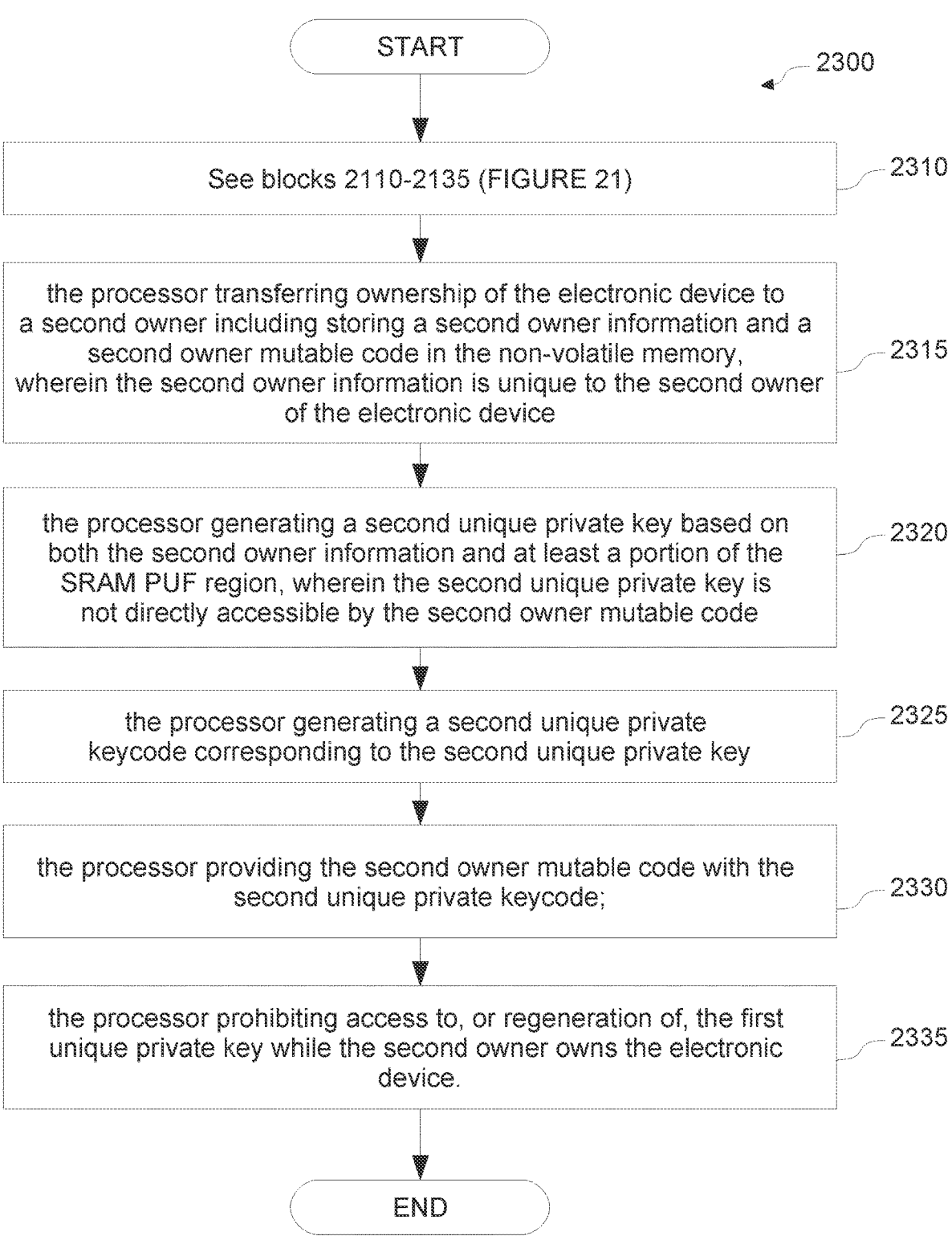

START

2300

See blocks 2110-2135 (FIGURE 21) — 2310 the processor transferring ownership of the electronic device to a second owner including storing a second owner information and a second owner mutable code in the non-volatile memory, wherein the second owner information is unique to the second owner of the electronic device — 2315 the processor generating a second unique private key based on both the second owner information and at least a portion of the SRAM PUF region, wherein the second unique private key is not directly accessible by the second owner mutable code — 2320 the processor generating a second unique private keycode corresponding to the second unique private key — 2325 the processor providing the second owner mutable code with the second unique private keycode; — 2330 the processor prohibiting access to, or regeneration of, the first unique private key while the second owner owns the electronic device. — 2335

END

FIG. 23

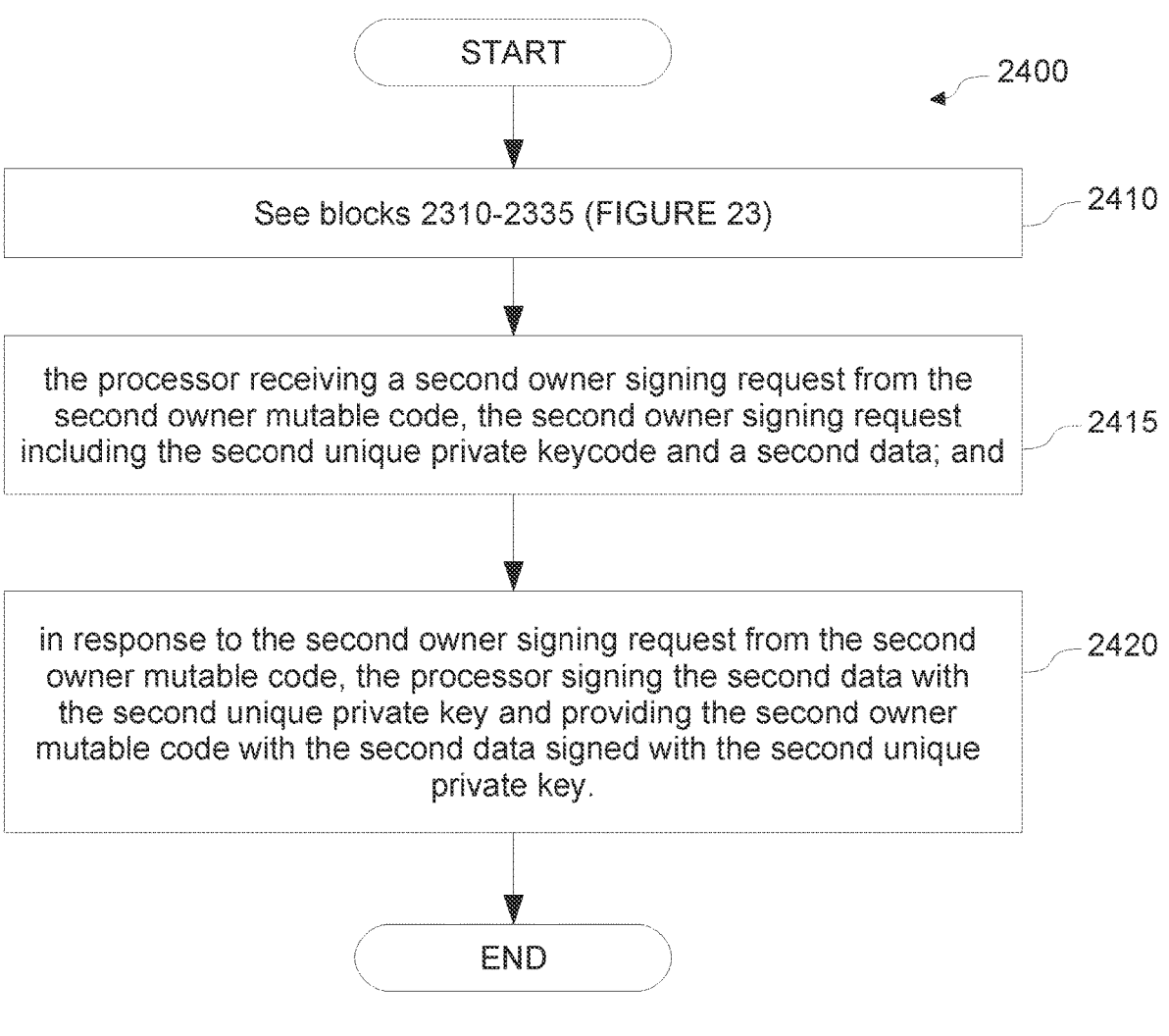

START

2400

See blocks 2310-2335 (FIGURE 23)

2410 the processor receiving a second owner signing request from the second owner mutable code, the second owner signing request including the second unique private keycode and a second data; and

2415 in response to the second owner signing request from the second owner mutable code, the processor signing the second data with the second unique private key and providing the second owner mutable code with the second data signed with the second unique private key.

2420

END

FIG. 24

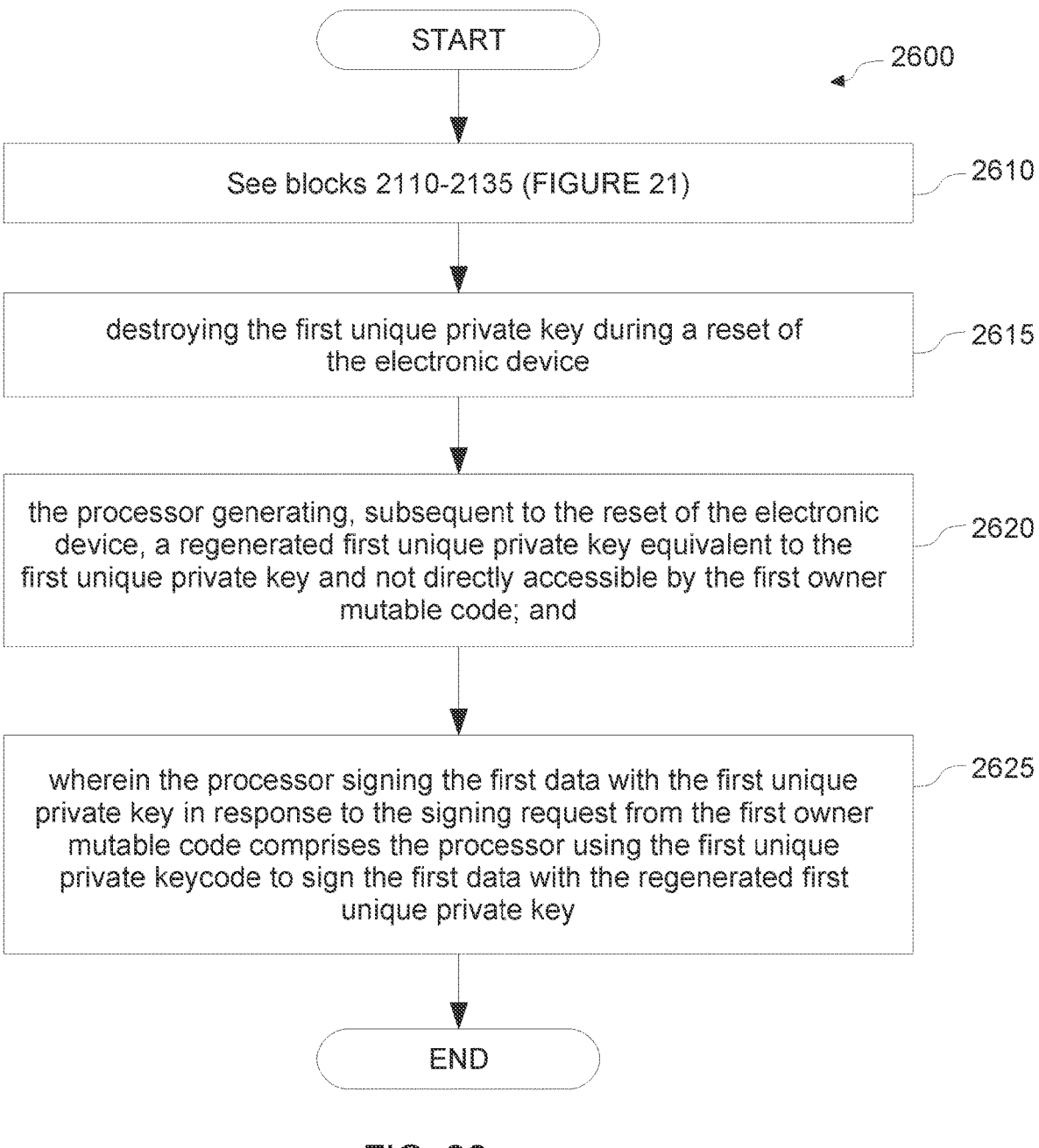

START

2600

See blocks 2110-2135 (FIGURE 21)

2610 destroying the first unique private key during a reset of
the electronic device

2615 the processor generating, subsequent to the reset of the electronic
device, a regenerated first unique private key equivalent to the
first unique private key and not directly accessible by the first owner
mutable code; and

2620 wherein the processor signing the first data with the first unique
private key in response to the signing request from the first owner
mutable code comprises the processor using the first unique
private keycode to sign the first data with the regenerated first
unique private key

2625

END

FIG. 26

START

2900

See blocks 2810-2825 (FIGURE 28)

2910 the processor providing the first owner mutable code
with the certificate having the first unique public key as the
certificate subject;

2915

END

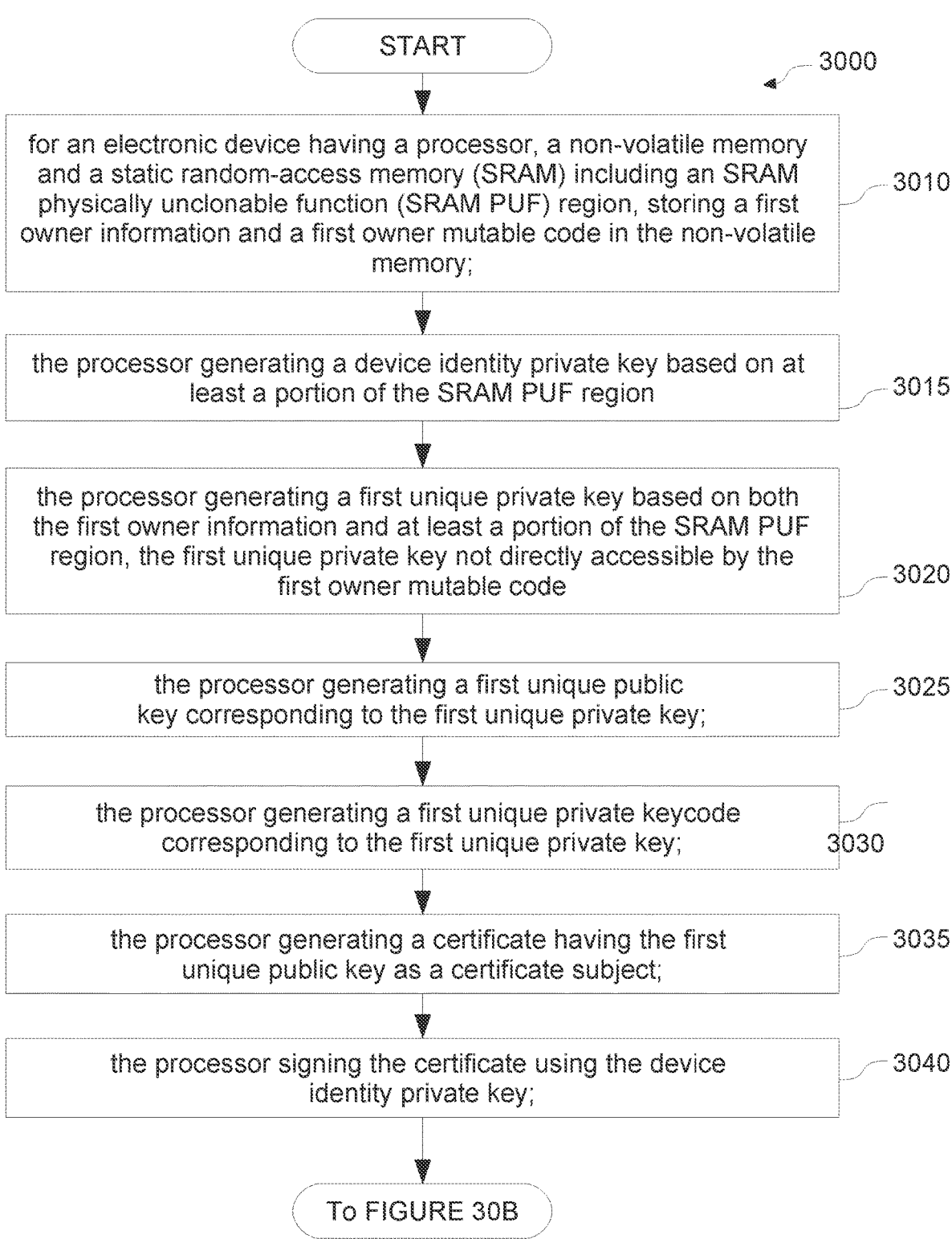

START

3000 for an electronic device having a processor, a non-volatile memory and a static random-access memory (SRAM) including an SRAM physically unclonable function (SRAM PUF) region, storing a first owner information and a first owner mutable code in the non-volatile memory;

3010 the processor generating a device identity private key based on at least a portion of the SRAM PUF region

3015 the processor generating a first unique private key based on both the first owner information and at least a portion of the SRAM PUF region, the first unique private key not directly accessible by the first owner mutable code

3020 the processor generating a first unique public key corresponding to the first unique private key;

3025 the processor generating a first unique private keycode corresponding to the first unique private key;

3030 the processor generating a certificate having the first unique public key as a certificate subject;

3035 the processor signing the certificate using the device identity private key;

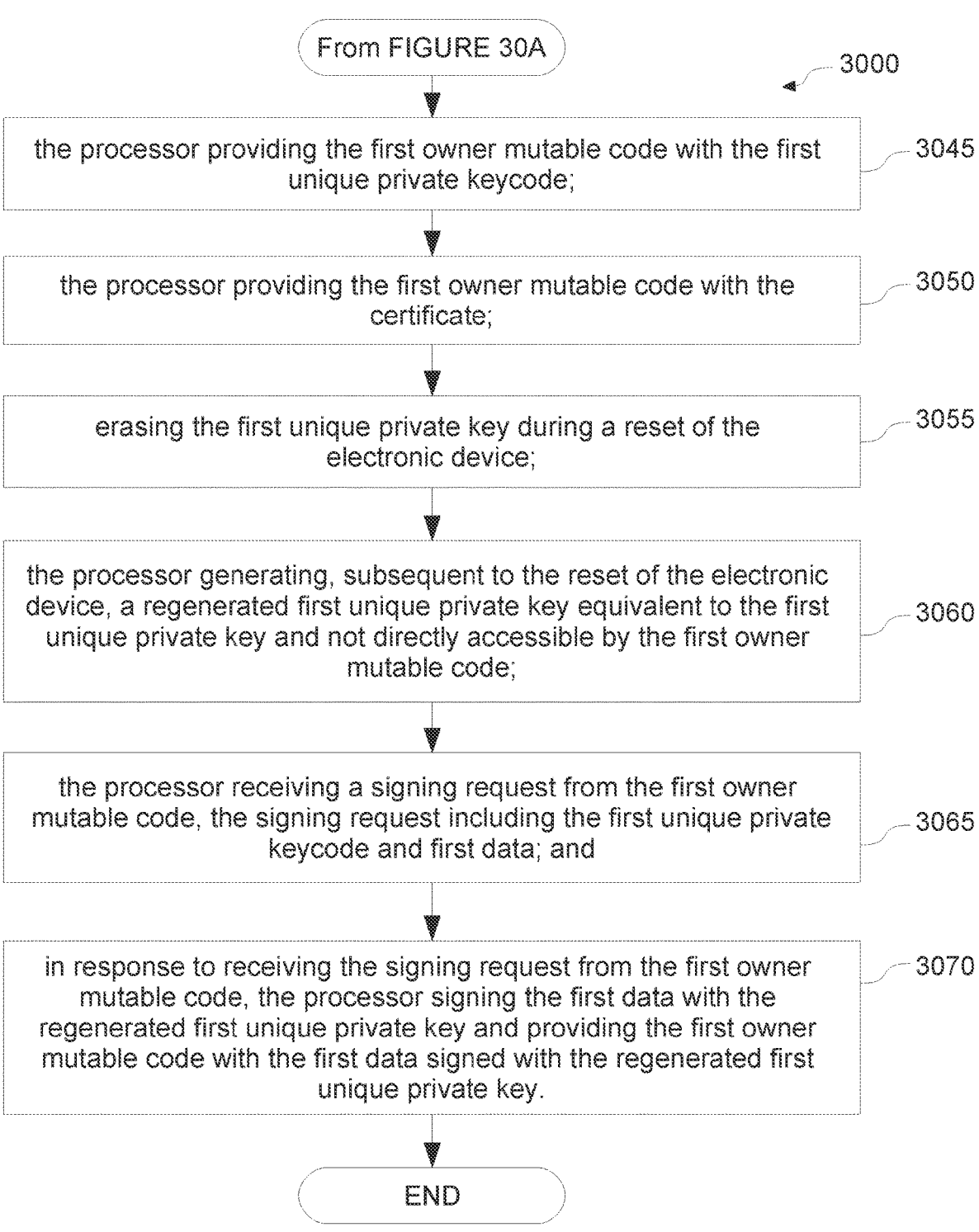

From FIGURE 30A

3000 the processor providing the first owner mutable code with the first unique private keycode;    3045 the processor providing the first owner mutable code with the certificate;    3050 erasing the first unique private key during a reset of the electronic device;    3055 the processor generating, subsequent to the reset of the electronic device, a regenerated first unique private key equivalent to the first unique private key and not directly accessible by the first owner mutable code;    3060 the processor receiving a signing request from the first owner mutable code, the signing request including the first unique private keycode and first data; and    3065 in response to receiving the signing request from the first owner mutable code, the processor signing the first data with the regenerated first unique private key and providing the first owner mutable code with the first data signed with the regenerated first unique private key.    3070

END

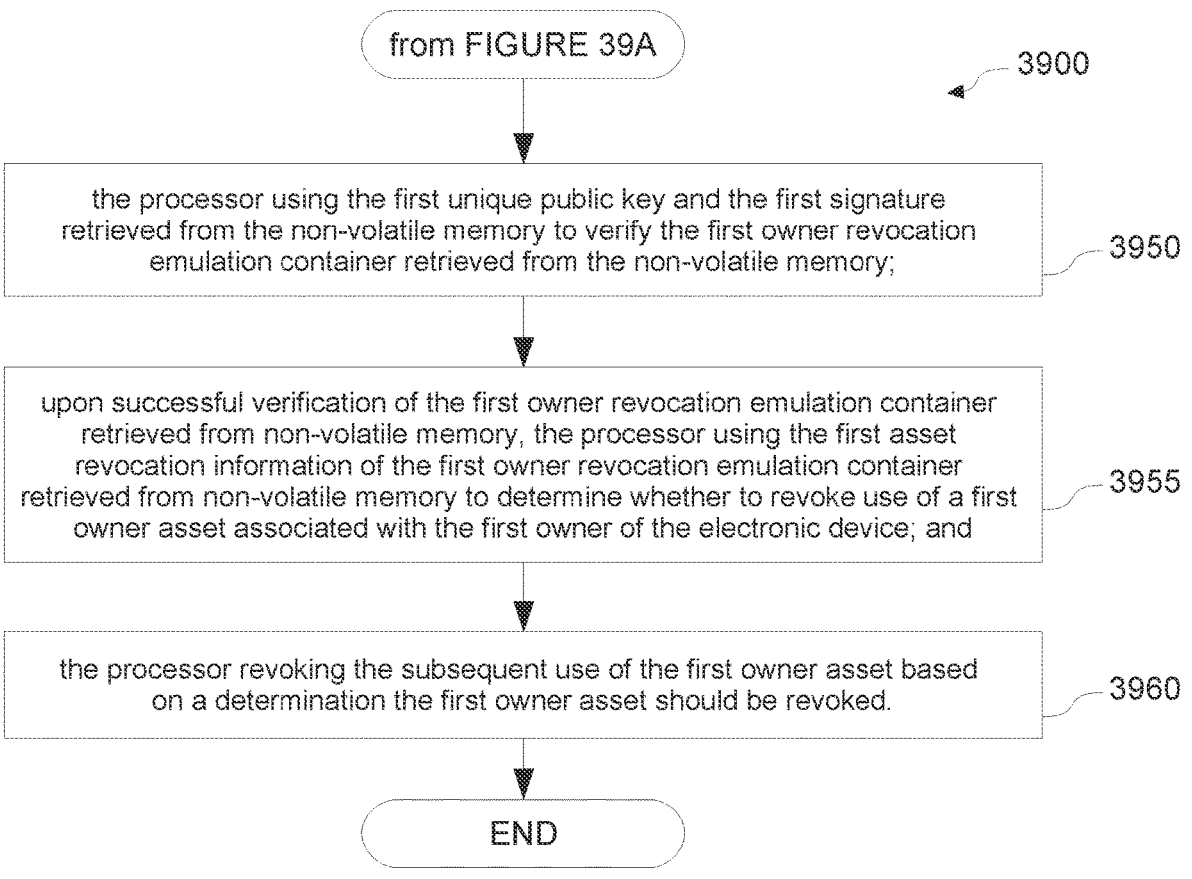

from FIGURE 39A

3900 the processor using the first unique public key and the first signature retrieved from the non-volatile memory to verify the first owner revocation emulation container retrieved from the non-volatile memory;

3950 upon successful verification of the first owner revocation emulation container retrieved from non-volatile memory, the processor using the first asset revocation information of the first owner revocation emulation container retrieved from non-volatile memory to determine whether to revoke use of a first owner asset associated with the first owner of the electronic device; and

3955 the processor revoking the subsequent use of the first owner asset based on a determination the first owner asset should be revoked.

3960

END

FIG. 39B

START

4000

See blocks 3910-3960 (FIGURES 39a-b)

4010 the processor programming the first asset revocation information of the first owner revocation emulation container in a one-time-programmable manner

4015

END

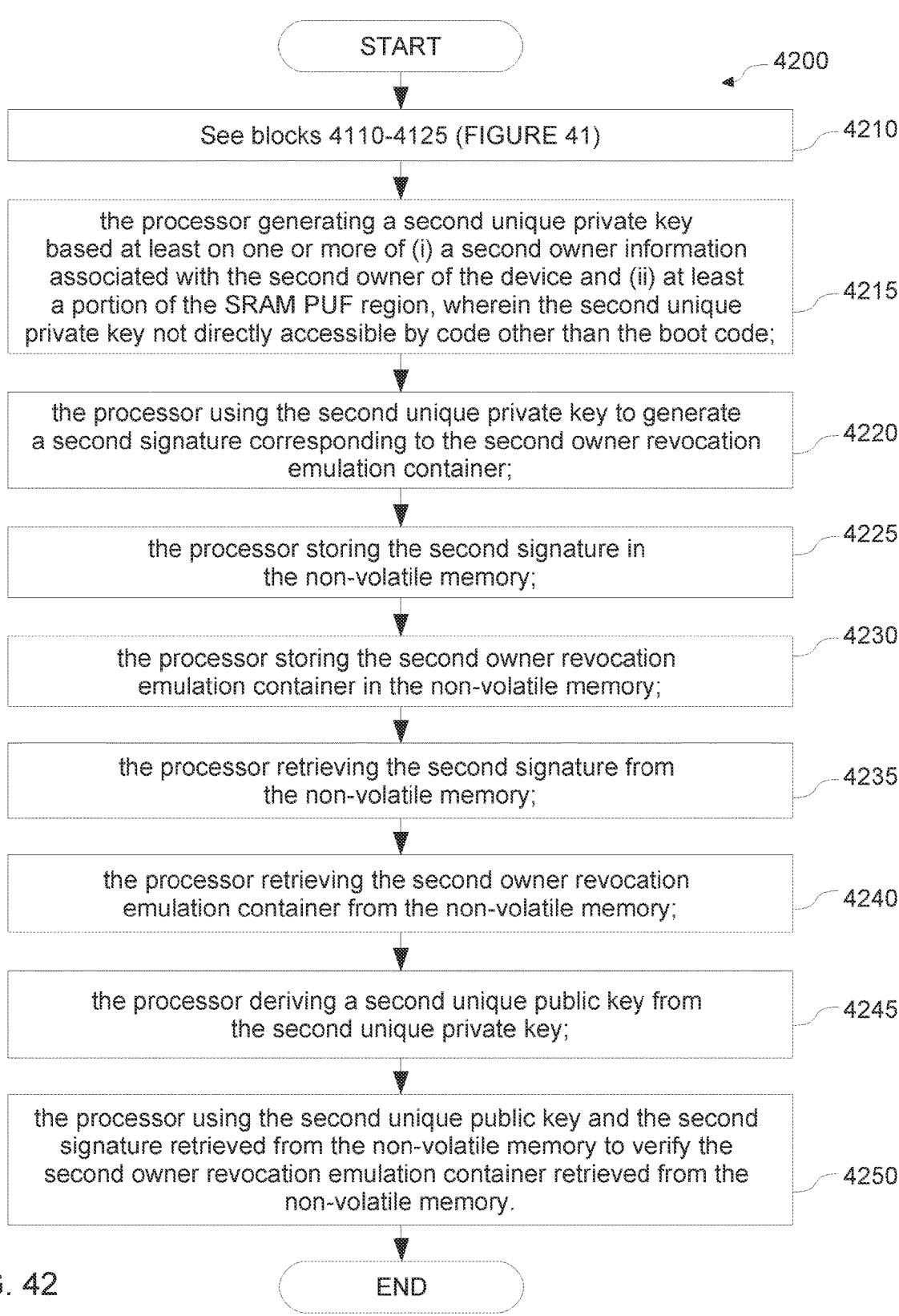

START

4200

See blocks 4110-4125 (FIGURE 41)          4210 the processor generating a second unique private key
based at least on one or more of (i) a second owner information
associated with the second owner of the device and (ii) at least
a portion of the SRAM PUF region, wherein the second unique
private key not directly accessible by code other than the boot code;          4215 the processor using the second unique private key to generate
a second signature corresponding to the second owner revocation
emulation container;          4220 the processor storing the second signature in
the non-volatile memory;          4225 the processor storing the second owner revocation
emulation container in the non-volatile memory;          4230 the processor retrieving the second signature from
the non-volatile memory;          4235 the processor retrieving the second owner revocation
emulation container from the non-volatile memory;          4240 the processor deriving a second unique public key from
the second unique private key;          4245 the processor using the second unique public key and the second
signature retrieved from the non-volatile memory to verify the
second owner revocation emulation container retrieved from the
non-volatile memory.          4250

FIG. 42          END

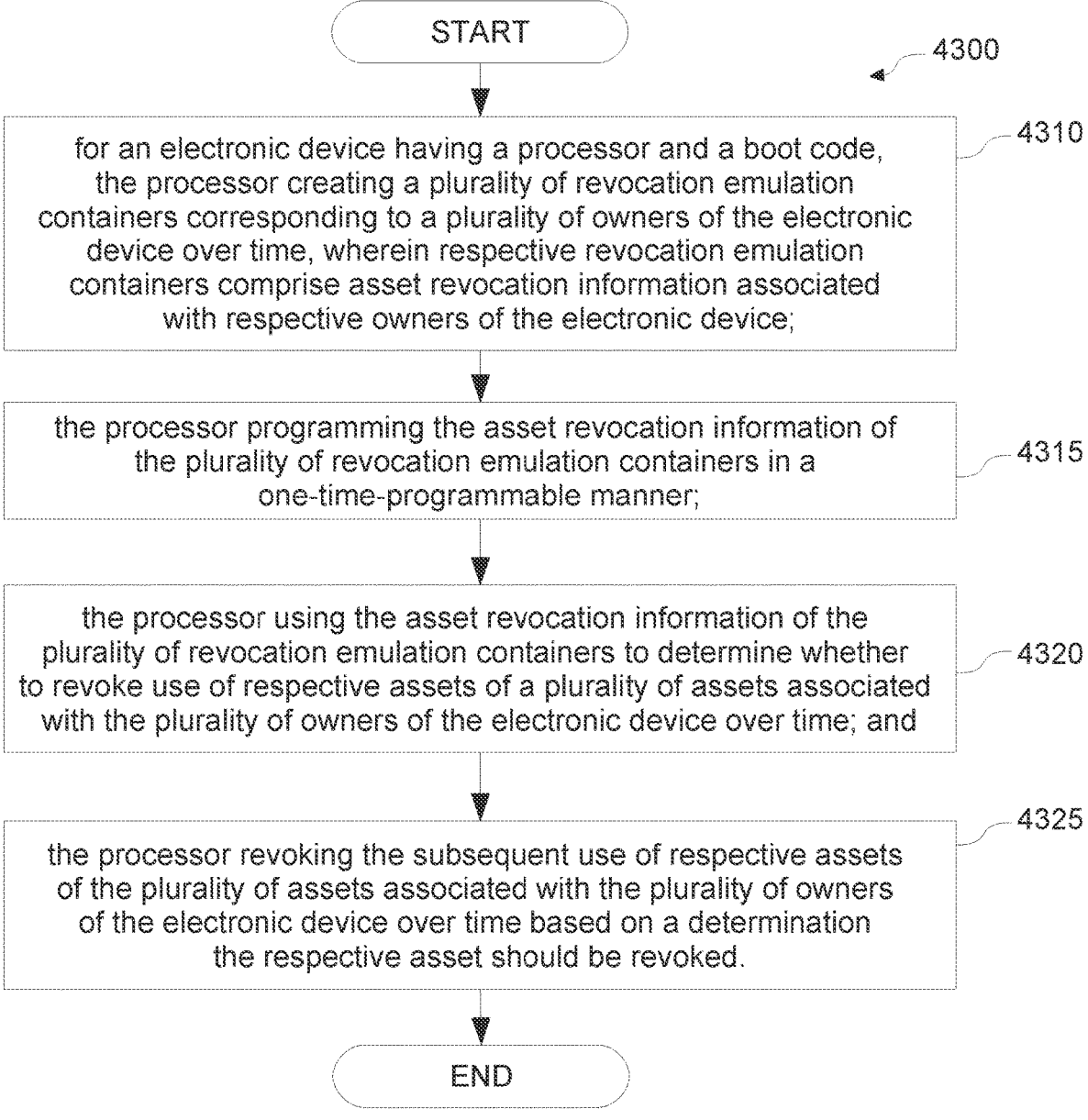

START

4300 for an electronic device having a processor and a boot code, the processor creating a plurality of revocation emulation containers corresponding to a plurality of owners of the electronic device over time, wherein respective revocation emulation containers comprise asset revocation information associated with respective owners of the electronic device;

4310 the processor programming the asset revocation information of the plurality of revocation emulation containers in a one-time-programmable manner;

4315 the processor using the asset revocation information of the plurality of revocation emulation containers to determine whether to revoke use of respective assets of a plurality of assets associated with the plurality of owners of the electronic device over time; and

4320 the processor revoking the subsequent use of respective assets of the plurality of assets associated with the plurality of owners of the electronic device over time based on a determination the respective asset should be revoked.

4325

END

FIG. 43

OWNER REVOCATION EMULATION CONTAINER

PRIORITY

The present application claims priority to U.S. Provisional Patent Application No. 63/423,021 filed Nov. 6, 2022, the contents of which are hereby incorporated in their entirety.

FIELD OF THE INVENTION

The present disclosure relates to electronic devices, and more particularly to systems and methods for an owner revocation emulation container (REC) for managing keys, images, and other assets related to an owner of an electronic device.

BACKGROUND

In computing products, the embedded controller (EC) boot code stored in boot ROM may act as the Root of Trust (RoT) for secure boot applications for a particular owner (e.g., original equipment manufacturer (OEM)) of an electronic device. The OEM may store configuration options in a one-time-programmable (OTP) memory during device provisioning. This may include cryptographic keys used for encrypting and signing the boot images. The OEM may implement and sign the EC boot images that are loaded and authenticated by the EC boot code stored in the boot ROM. The EC boot code may use custom values stored in OTP memory for authenticating and decrypting the boot images. Other features supported by the EC boot code may include key revocation and image rollback protection. This may allow the owner to deactivate one or more of the keys stored in a key manifest on the electronic device or to remove specific image revisions from service, in particular by setting bits in OTP memory during the boot sequence. The concepts of key revocation and image rollback protection may apply to the first mutable code (FMC) loaded and authenticated by the boot ROM. These concepts may also apply to images the FMC authenticates to extend the chain of trust.

ECs with secure boot typically have a single configuration provisioned in OTP memory determined at manufacturing time by the first owner (e.g., OEM). An image authentication key manifest is generated, hashed and stored in a key hash blob (KHB), and the hash of the KHB is stored in OTP memory. As a result, all owners of the device may use OEM signed images.

An EC with secure boot may have multiple owners over the life of the device. Each owner may configure the part to use a unique set of keys and image revisions that are used to validate the FMC during the boot ROM authentication sequence. These keys and images may be validated using the key revocation and image rollback protection information. When key revocation and image rollback protection is stored in OTP memory, all owners of the device must share the key revocation and image rollback bits. If 32 bits in OTP memory are allocated for key revocation, and the first owner of the device revoked 31 keys, then the second owner of the device would only be able to support one key.

Thus, there is a need to manage key revocation and image rollback protection information so that subsequent owners of the electronic device are not limited by a previous owner's use of the key revocation and image rollback protection features.

SUMMARY

According to one example, a device may have a boot code and a non-volatile memory. The boot code may executable by a processor to generate a first unique private key, wherein the first unique private key may not be directly accessible by code other than the boot code; create a first owner revocation emulation container for a first owner of the device, the first owner revocation emulation container comprising a first asset revocation information; use the first unique private key to generate a first signature corresponding to the first owner revocation emulation container; store the first signature in the non-volatile memory; store the first owner revocation emulation container in the non-volatile memory; retrieve the first signature from the non-volatile memory; retrieve the first owner revocation emulation container from the non-volatile memory; derive a first unique public key from the first unique private key; use the first unique public key and the first signature retrieved from the non-volatile memory to verify the first owner revocation emulation container retrieved from the non-volatile memory; after successful verification of the first owner revocation emulation container retrieved from the non-volatile memory, use the first asset revocation information of the first owner revocation emulation container retrieved from the non-volatile memory to determine whether to revoke use of a first owner asset associated with the first owner of the device; and revoke the subsequent use of the first owner asset based on a determination the first owner asset should be revoked Another example provides a method for an electronic device having a processor, a non-volatile memory, a boot code, and a static random-access memory (SRAM) including an SRAM physically unclonable function (SRAM PUF) region. The method may include the processor generating a first unique private key based at least on one or more of (i) a first owner information associated with a first owner of the electronic device and (ii) at least a portion of the SRAM PUF region, wherein the first unique private key not directly accessible by code other than the boot code. The method may include the processor creating a first owner revocation emulation container for the first owner of the electronic device, the first owner revocation emulation container comprising a first asset revocation information. The method may include the processor using the first unique private key to generate a first signature corresponding to the first owner revocation emulation container. The method may include the processor storing the first signature in the non-volatile memory. The method may include the processor storing the first owner revocation emulation container in the non-volatile memory. The method may include the processor retrieving the first signature from the non-volatile memory. The method may include the processor retrieving the first owner revocation emulation container from the non-volatile memory. The method may include the processor deriving a first unique public key from the first unique private key. The method may include the processor using the first unique public key and the first signature retrieved from the non-volatile memory to verify the first owner revocation emulation container retrieved from the non-volatile memory. Upon successful verification of the first owner revocation emulation container retrieved from non-volatile memory, the method may include the processor using the first asset revocation information of the first owner revocation emulation container retrieved from non-volatile memory to determine whether to revoke use of a first owner asset associated with the first owner of the electronic device. The method may include the processor revoking the subsequent use of the first owner asset based on a determination the first owner asset should be revoked.

Another example provides a method for an electronic device having a processor and a boot code. The method may include the processor creating a plurality of revocation emulation containers corresponding to a plurality of owners of the electronic device over time, wherein respective revocation emulation containers may comprise asset revocation information associated with respective owners of the electronic device. The method may include the processor programming the asset revocation information of the plurality of revocation emulation containers in a one-time-programmable manner. The method may include the processor using the asset revocation information of the plurality of revocation emulation containers to determine whether to revoke use of respective assets of a plurality of assets associated with the plurality of owners of the electronic device over time. The method may include the processor revoking the subsequent use of respective assets of the plurality of assets associated with the plurality of owners of the electronic device over time based on a determination the respective asset should be revoked.

BRIEF DESCRIPTION OF THE DRAWINGS

The figures illustrate example methods and systems for managing keys, images, and other assets related to an owner of an electronic device.

FIG. 6 illustrates a block diagram of example container content of an owner container for managing ownership of an electronic device.

FIG. 8 illustrates a block diagram of an example of managing ownership of an electronic device, including by creating a first owner container using OEM signed images and OTP configuration.

FIG. 11 and FIG. 12 illustrate block diagrams of two examples of managing ownership of an electronic device using an unrestricted transfer and an owner transfer authorization key (OTAK).

FIG. 13 illustrates a block diagram of an example of managing ownership of an electronic device, including by transferring ownership using a current owner's container command (CCK) key and a first mutable binary (FMB) configuration stored in OTP memory.

FIG. 14 illustrates a flow chart of an example method for managing ownership of an electronic device, including secure transfer of ownership of the electronic device, over time.

FIG. 15 illustrates a flow chart of an example method for managing ownership of an electronic device, including secure transfer of ownership of the electronic device, over time.

FIGS. 21-29, 30A, and 30B illustrate flow charts of example methods for using an SRAM PUF shared by multiple entities for managing device keys.

FIGS. 39A, 39B, and 40-44 illustrate flow charts of example methods for managing ownership, keys, images, and other assets related to an owner of an electronic device.

Figure 1:
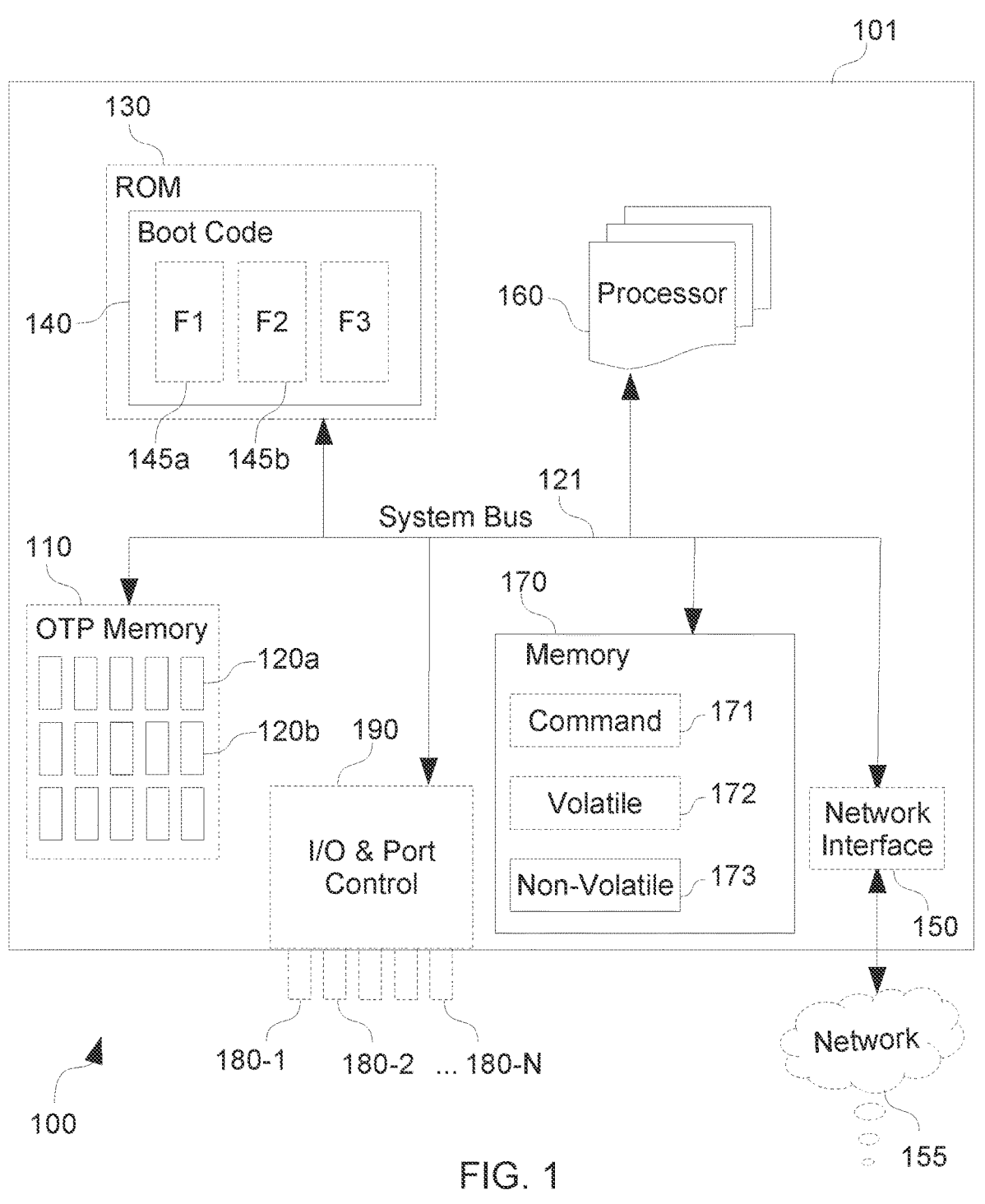
FIG. 1 illustrates a block diagram of an example system for managing ownership, keys, images, and other assets related to an owner of an electronic device.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

The present disclosure provides systems and methods for managing device keys, e.g., to provide device authentication (attestation) to multiple applications (e.g., multiple owners of an electronic device over time) while maintaining the secrecy of device private keys for each application (e.g., owner). In some examples, the present disclosure provides systems and methods for key management in which both the boot code and a first mutable code (FMC) can generate or use the same device attestation key pair. In the same or other examples where an electronic device may have multiple owners over the life of the device, the present disclosure provides systems and methods to generate device keys as a function of the current owner of the electronic device so that no two owners can have the same private key (e.g., device attestation key).

The present disclosure provides systems and method to support multiple owners of a particular electronic device over time, including secure transfer of ownership between the different owners, by storing each owner's information and configuration in a signed secure replay protected monotonic counter (RPMC) owner container in memory, e.g., in serial peripheral interface (SPI) flash memory. In an example, the owner's cryptographic keys, secrets, and configuration information may be stored in a secure manner in non-volatile memory (NVM) (e.g., OTP memory, SPI flash memory, or electrically erasable programmable read-only memory (EEPROM)). Because secure information may be stored in an erasable memory, the content may be signed and verified before it is used to aid in security. In some examples the system and methods for storing and updating the signed secure RPMC owner container may comply with NIST 800-193 Platform Firmware Resiliency Guidelines. As used herein, "secure RPMC owner container," "RPMC owner container," and "owner container" refer to a signed secure RPMC owner container.

When an electronic device (e.g., a microcontroller) starts up (e.g., power on or after a hardware or software reset), boot code may be loaded and executed by a processor on the device. The boot code may perform functions related to the device start-up, for example, initializing the hardware, which may include disabling interrupts, initializing buses, setting processor(s) in a specific state, and initializing memory. After performing the hardware initialization, the boot code may then load a first mutable code (FMC), for example, from a signed first mutable binary (FMB) that may comprise one or more images. In an example, the FMC may be application firmware that may be signed by an OEM or other owner of the electronic device. In the same or different examples, the FMC may be the OEM or other owner application firmware, ROM extension (ROM EXT) or boot code extension, RIoT (Robust Internet of Things) Code, or other mutable code. The functions performed by the boot code may be called the boot process.

The electronic device may contain security mechanisms to protect against malicious attacks on the device. For example, an electronic device may prevent (1) the loading and execution of the FMC, (2) transfer of ownership of the electronic device, or (3) crisis recovery by anyone other than the silicon owner. In an example, these operations may require knowledge of secrets (e.g., cryptographic keys) known to the silicon owner. Because the silicon owner controls the secrets (e.g., cryptographic keys) used for the loading and execution of the FMC, transfer of ownership, and crisis recovery, malicious attacks on the device may be reduced.

The silicon owner, or owner of the electronic device, may be the entity that provides the signed FMB that is loaded and authenticated by the boot code. The FMB may contain the FMC image loaded and executed by the boot code. The owner may provide a KHB that may contain hashes of each of the public keys that may be used to authenticate the FMB. For example, during manufacturing, a hash of the OEM KHB may be stored in OTP memory and the OEM KHB itself may be stored in non-volatile memory (e.g., SPI flash). The boot code may compute the SHA384(OEM KHB) and compare it against the hash of the OEM KHB stored in OTP memory. If the computed hash matches the stored hash, the boot code may trust the public key hashes stored in the OEM KHB and use those to authenticate the OEM FMB. The OEM may establish ownership during manufacturing (e.g., the OEM as an implicit owner) or when ownership is requested by another entity. Once ownership is established, the silicon owner may use the OEM images signed by OEM image signing keys or the owner may provide its own images signed by its image signing keys. In the latter example, an owner-provided KHB hash value may be stored in a secure RPMC owner container and an owner-provided KHB may be stored in non-volatile memory (e.g., SPI flash). The owner's image signing keys may be validated by the hashes stored in the owner-provided KHB. For example, the boot code may compute the SHA384(owner-provided KHB) and compare it against the stored owner-provided KHB hash value. If the computed hash matches the stored hash, the boot code may trust the public key hashes stored in the owner-provided KHB and use those to authenticate the owner-provided FMB.

Security features for an electronic device may be implemented using the boot code on the electronic device. In an example, the security features may be implemented using immutable boot code. Immutable boot code, which may be referred to as a hardware Root of Trust (RoT), may be built into the electronic device during fabrication and, therefore, may be implicitly trusted because it cannot be modified.

For the purposes of this disclosure, an electronic device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an electronic device may be a personal computer, a personal digital assistant (PDA), a consumer electronic device, a server, a network storage device, or any other suitable device and may vary in size, shape, performance, functionality, and price. The electronic device may include memory, one or more processing resources such as a central processing unit (CPU) or hardware or software control logic. Additional components of the electronic device may include one or more storage devices, one or more communications ports for communicating with external devices as well as various input and output (I/O) devices, such as a keyboard, a mouse, and a video display. The electronic device may also include one or more buses operable to transmit communication between the various hardware components.

System

FIG. 1 illustrates a block diagram of an example system 100 for managing ownership of an electronic device 101, including through secure transfer of ownership of the electronic device, over time. As depicted in FIG. 1, system 100 may comprise electronic device 101. Components of electronic device 101 may include, without limitation, one or more processors 160 and a system bus 121 that communicatively couples various system components to processors 160 including, for example, OTP memory 110, ROM 130, memory 170, I/O & port control 190, and a network interface 150. The system bus 121 may be any suitable type of bus structure, e.g., a memory bus, a peripheral bus, or a local bus using any of a variety of bus architectures. In an example, components of electronic device 101 may all reside on the same die. In another example, components of electronic device 101 may comprise individual components that are electrically coupled.

Processor 160 may comprise any system, device, or apparatus operable to interpret or execute program instructions or process data, and may include, without limitation a microprocessor, microcontroller, digital signal processor (DSP), application specific integrated circuit (ASIC), or any other digital or analog circuitry to interpret or execute program instructions or process data. In some examples, processor 160 may interpret or execute program instructions or process data stored locally (e.g., in memory 170, ROM 130, OTP memory 110, or another component of electronic device 101). In the same or alternative examples, processor 160 may interpret or execute program instructions or process data stored remotely.

OTP memory 110 (one-time-programmable memory) may comprise any system, device, or apparatus that can be programmed only once and thereafter retain the programmed data. OTP memory 110 may comprise one-time-programmable bits 120a, 120b, and others. In an example, bits 120a and 120b of OTP memory 110 may comprise traditional logic gates connected with metal wiring and the connections may be paired with fuses. During programming, the fuses may be blown out in order to make these connections permanent. In this manner, OTP memory 110 may be unmodifiable once programmed. In an example, an unprogrammed bit (e.g., 120a, 120b) may return a value of 0 when read by processor 160 whereas a programmed bit may return a value of 1 when read by processor 160. According to this example, once the bit 120a, 120b has been programmed with a 1 value, it cannot be re-programmed to a 0 value.

Figure 19:
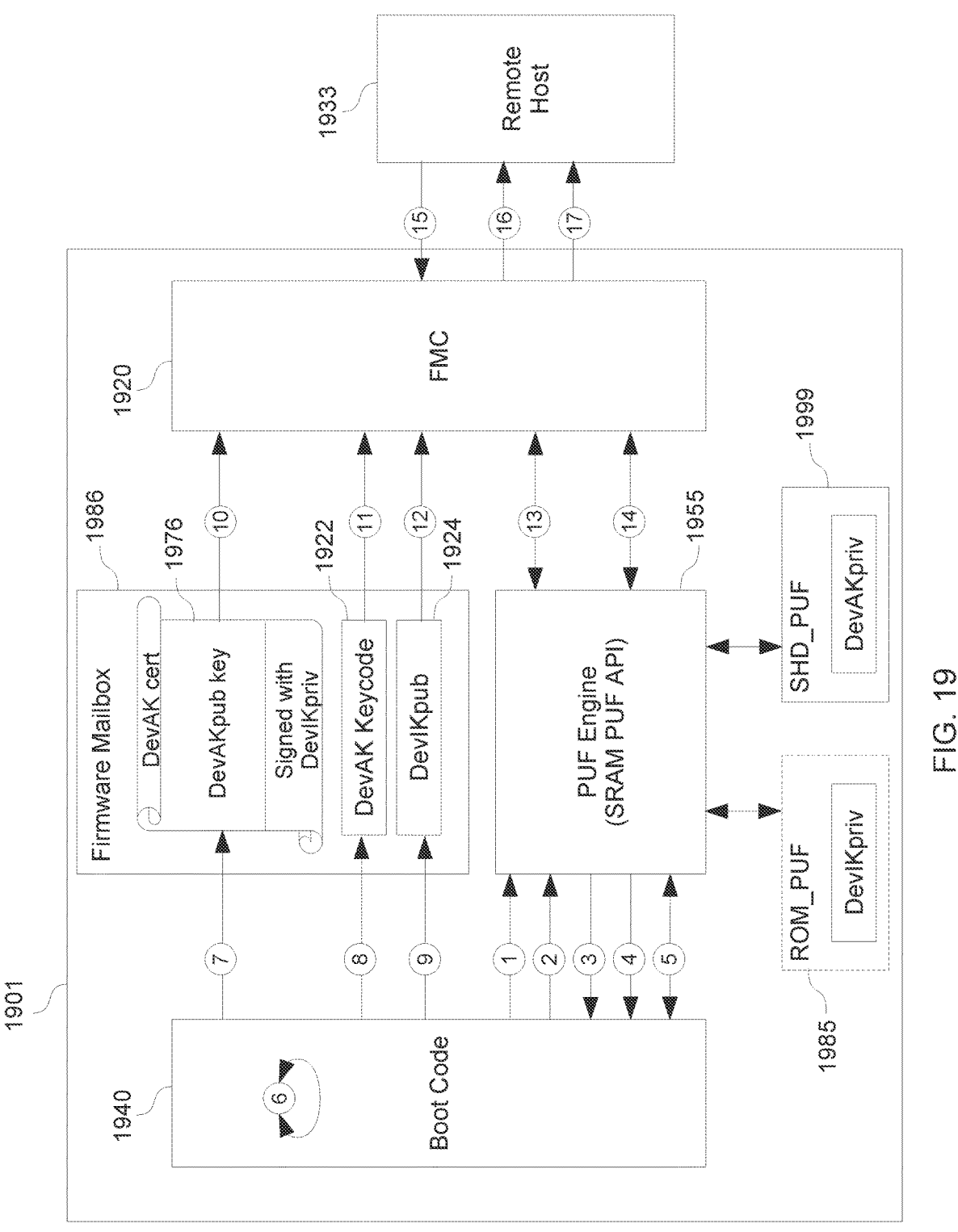
FIG. 19 illustrates an example electronic device with an SRAM PUF shared by multiple entities for managing device keys.

ROM 130 may comprise any system, device, or apparatus operable to retain program instructions or data after power to electronic device 101 is turned off (e.g., a non-volatile memory). ROM 130 (e.g., boot ROM) may comprise boot code 140, which may be used by processor 160 during the boot process (or start-up) of electronic device 101. According to an example, boot code 140 may be immutable, i.e., built into the electronic device during fabrication and, therefore, may be implicitly trusted (e.g., a hardware root of trust) because it cannot be modified. Boot code 140 may comprise code that performs functions including, without limitation, functions F1 (145a) and F2 (145b), among others. In an example, function F1 may be boot code. In the same or different example, function F2 may be part of a runtime application programming interface (API), e.g., PUF engine 1955 (FIG. 19). In an example, boot code 140 may be authenticated mutable code that may act as a ROM extension (e.g., an FMC that may be authenticated by other boot code stored in ROM, where the FMC may be stored in volatile memory 172 or non-volatile memory 173). In an example, boot code 140 may comprise both immutable code (e.g., stored in ROM 130) and authenticated mutable code that may act as a ROM extension.

Memory 170 may comprise any system, device, or apparatus operable to retain program instructions or data for a period of time. Memory 170 may comprise random access memory (RAM, SRAM, DRAM), EEPROM, a PCMCIA card, flash memory (e.g., SPI flash), magnetic storage, opto-magnetic storage, hardware registers, or any suitable selection or array of volatile or non-volatile memory. In the illustrated example, memory 170 includes, without limitation, command memory 171, volatile memory 172, and non-volatile memory 173.

I/O & port control 190 may comprise any system, device, or apparatus generally operable to receive or transmit data to/from/within electronic device 101. I/O & port control 190 may comprise, for example, any number of communication interfaces, graphics interfaces, video interfaces, user input interfaces, or peripheral interfaces (e.g., without limitation, JTAG, I2C, UART, Test Access Port). I/O & port control 190 may be communicatively coupled to external ports/pins 180-1, 180-2, . . . 180-N (and others not depicted).

Network interface 150 may be any suitable system, apparatus, or device operable to serve as an interface between electronic device 101 and a network 155. Network interface 150 may enable electronic device 101 to communicate over network 155 using any suitable transmission protocol or standard. Network 155 and its various components may be implemented using hardware, software, or any combination thereof.

Although FIG. 1 illustrates various components of electronic device 101, other example systems may include electronic devices with more or fewer components. In an example, an electronic device 101 according to this disclosure may not include one or all of the components drawn in dashed lines without departing from the spirit and scope of these disclosed examples. Additionally, the various components of electronic device 101 may reside on the same die (e.g., a primary die) or may reside on separate dies. In an example, various components may reside inside the package in a multi-chip module (MCM) or externally on a system board. In the same or different examples, various components of electronic device 101 may reside in one or more of the primary die, in an MCM, and externally on a system board.

OTP Memory

Figure 2:
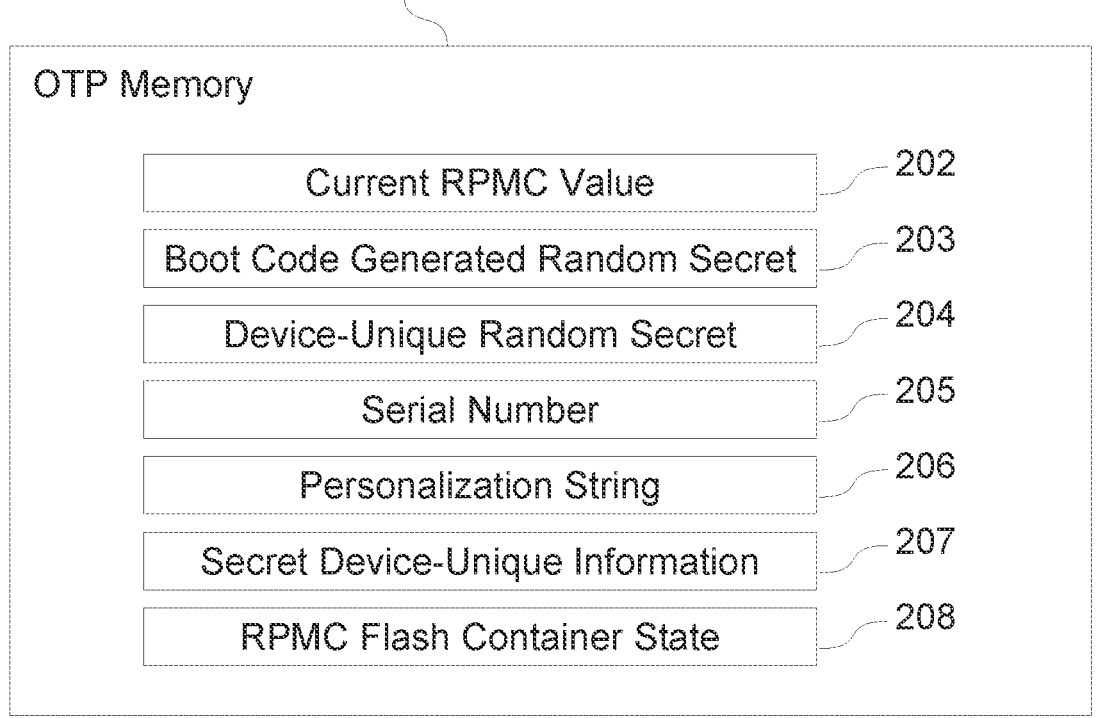
FIG. 2 illustrates a block diagram of an example OTP memory for managing ownership, keys, images, and other assets related to an owner of an electronic device.

FIG. 2 illustrates a block diagram of an example OTP memory 110 for managing ownership of an electronic device 101, including through secure transfer of ownership of the electronic device, over time. As depicted in FIG. 2, OTP memory 110 may include regions, including current RPMC value 202, boot code generated random secret 203, device-unique random secret 204, serial number 205, personalization string 206, secret device-unique information 207, and RPMC flash container state 208.

Current RPMC value 202 may be provided by a replay protected monotonic counter that is incremented over time. In the example shown in TABLE 1, current RPMC value 202 may be a value stored in an 8-bit region in OTP memory 110 and may correspond to nine different values (0-8). In this example, bits in OTP memory 110 for current RPMC value 202 may be set sequentially from lowest bit ([0]) to highest bit ([8]), and the next RPMC value may be the next integer value after current RPMC value 202. In the same or different examples, values less than current RPMC value 202 may be considered revoked and values greater than current RPMC value 202 may be considered unused. In the example shown in TABLE 1, values greater than 8 may not be used. In other examples where more than eight bits in OTP memory 110 are allocated to the current RPMC value 202, values greater than 8 may be possible. A value less than current RPMC value 202 may be considered revoked because OTP memory 110 may not be programmed to a lesser value because OTP memory, by definition, may be programmed only once. For example, when current RPMC value 202 has a value of one (1), the least significant bit is programmed and cannot be un-programmed to reset the current RPMC value 202 back to a value of zero (0).

TABLE 1

| OTP [7:0] (binary format) | Current RPMC Value (hex format) | Next RPMC Value (hex format) | Revoked RPMC Values (hex format) | Unused RPMC Values (hex format) |
|---|---|---|---|---|
| 0000_0000 | 0 | 1 | None | 1-8 |
| 0000_0001 | 1 | 2 | 0 | 2-8 |
| 0000_001x | 2 | 3 | 0-1 | 3-8 |
| 0000_01xx | 3 | 4 | 0-2 | 4-8 |
| . . . | . . . | . . . | . . . | . . . |
| 01xx_xxxx | 7 | 8 | 0-6 | 8 |
| 1xxx_xxxx | 8 | n/a | 0-7 | None |

Boot code generated random secret 203 may be any random information generated by and accessible only to boot code 140. For example, boot code generated random secret 203 may be a random number generated by boot code 140 after provisioning of electronic device 101 is complete. Device-unique random secret 204 may be any random information that is unique to electronic device 101. In an example, device-unique random secret 204 may be a device-unique random number programmed into OTP memory 110 during provisioning (e.g., by the tester). In another example, device-unique random secret 204 may be a random number generated by boot code 140 after provisioning of electronic device 101 is complete. Serial number 205 is a unique serial number assigned to electronic device 101 and programmed into OTP memory 110 during provisioning (e.g., by the tester). Personalization string 206 may be a known string programmed into OTP memory 110 during provisioning (e.g., by the tester). In alternative examples, personalization string 206 may be hard-coded in boot code 140 instead of being stored in OTP memory 110.

Secret device-unique information 207 may include (a) a device identity key ("DevIK") (e.g., a private key of a public-key cryptography key pair) or information from which a DevIK can be generated, (b) critical device configuration, e.g., image authenticity and key authenticity, (c) other cryptographic keys used by electronic device 101, or (d) other device-unique information. In some examples, secret device-unique information 207 may include (a) a unique device secret (UDS) or an encrypted UDS, or (b) a ROM seed (e.g., a random number generated by boot code 140), wherein boot code 140 may use such UDS and ROM seed as source data to generate a DevIK or other device-unique information.

RPMC flash container state 208 may indicate whether the RPMC owner feature is enabled. In an example, RPMC owner feature may be disabled by default at the time of manufacture, and this disabled state may be reflected in the RPMC flash container state 208. Boot code 140 may program RPMC flash container state 208 to indicate the owner feature is enabled when a first owner container is created.

Although FIG. 2 illustrates various regions of OTP memory 110, other example systems may include electronic devices with more or fewer regions.

RPMC Owner Container

Figure 3:
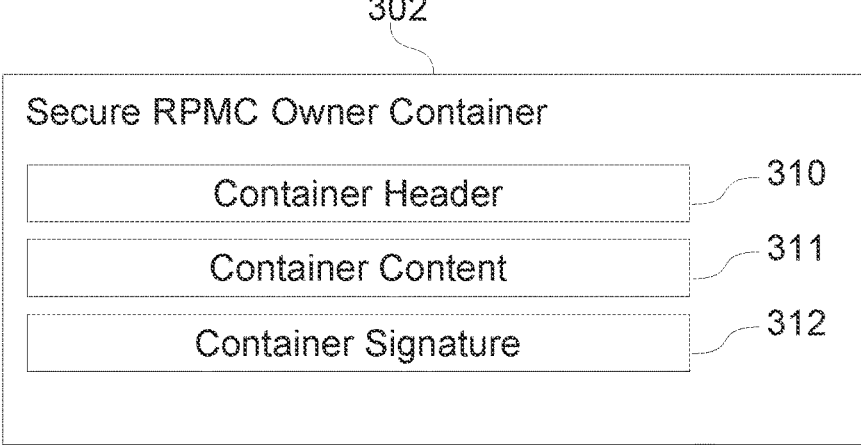
FIG. 3 illustrates a block diagram of an example secure RPMC owner container for managing ownership, keys, images, and other assets related to an owner of an electronic device.

FIG. 3 illustrates a block diagram of an example secure RPMC owner container 302 (owner container 302) for managing ownership of an electronic device 101, including through secure transfer of ownership of the electronic device, over time. In an example, an owner container 302 may be a signed data image stored in non-volatile memory (e.g., OTP memory 110, non-volatile memory 173, among others) that may contain the current silicon owner's configuration information and secrets to enable boot code 140 to load and execute the owner's executable images (e.g., FMC in FMB). As depicted in FIG. 3, owner container 302 may include three regions: container header 310, container content 311, and container signature 312. In an example, owner container 302 may be a unique signed container of information modified, stored in, and retrieved from OTP memory (e.g., OTP memory 110) or other non-volatile memory (e.g., non-volatile memory 173) by the code that creates the container (e.g., boot code 140 or a ROM extension (e.g., in authenticated FMC)). According to examples in this disclosure, owner container 302 may be signed and updated only by the code that created the container. Higher-level firmware (e.g., code other than the code that created the container) may require a command interface (e.g., command memory 171, FIG. 7) to access or modify information in owner container 302. In an example, only immutable boot code (e.g., boot code 140) may access or modify information in owner container 302. In an example, boot code that creates owner container 302 may create two redundant copies of owner container 302. One copy may be the primary owner container and the other copy may be the fallback owner container.

Container Signature

Container signature 312 may comprise a signature corresponding to owner container 302 and may be generated by boot code 140. In an example, boot code 140 may use a physically unclonable function (PUF) or a deterministic random bit generator (DRBG) to generate ECDSA signing keys. ECDSA signing keys may be generated by any signing algorithm. For example, container signature 312 may be an ECDSA-384 signature having the following characteristics:

Algorithm: Elliptic Curve Digital Signature Algorithm (ECDSA)

Key Size: 384 bit

Curve: NIST "secp384r1" curve

Hashing Algorithm: SHA384

Signed Message (m)={container header 310|container content 311}

Boot code 140 may derive the ECDSA private signing key used to sign owner container 302. In an example, the signing key may be generated as a function of the current owner and the unique silicon die. Thus, it may be possible to have a unique signing per owner per silicon die. According to an example, boot code 140 may use a DRBG to derive the ECDSA private signing key and may provide the following inputs to the DRBG:

Personalization String: may be a known string, e.g., "Container *one* Key Generator"

Additional Input: may be {RPMC value 431|device serial number 435}

Entropy Input: may be device unique random secret 204

True Random Number Generator (TRNG) Input: may be boot code generated random secret 203

In the above example, boot code 140 may generate the ECDSA private signing key using a method from section B.4.1 Key Pair Generation Using Extra Random Bits of the FIPS 186-4 specification (although other specifications may also be used):

private key (d)

$$d = (c \bmod(n-1)) + 1$$

n=prime number defined for P-384 curve c=448-bit random positive integer value

In an example, boot code 140 may extract the first 448-bit positive integer value generated by the DRBG and use that value for "c" to generate the ECDSA private signing key.

Although FIG. 3 illustrates various regions of owner container 302, other example systems may include electronic devices with more or fewer regions.

Container Header

Figure 4:
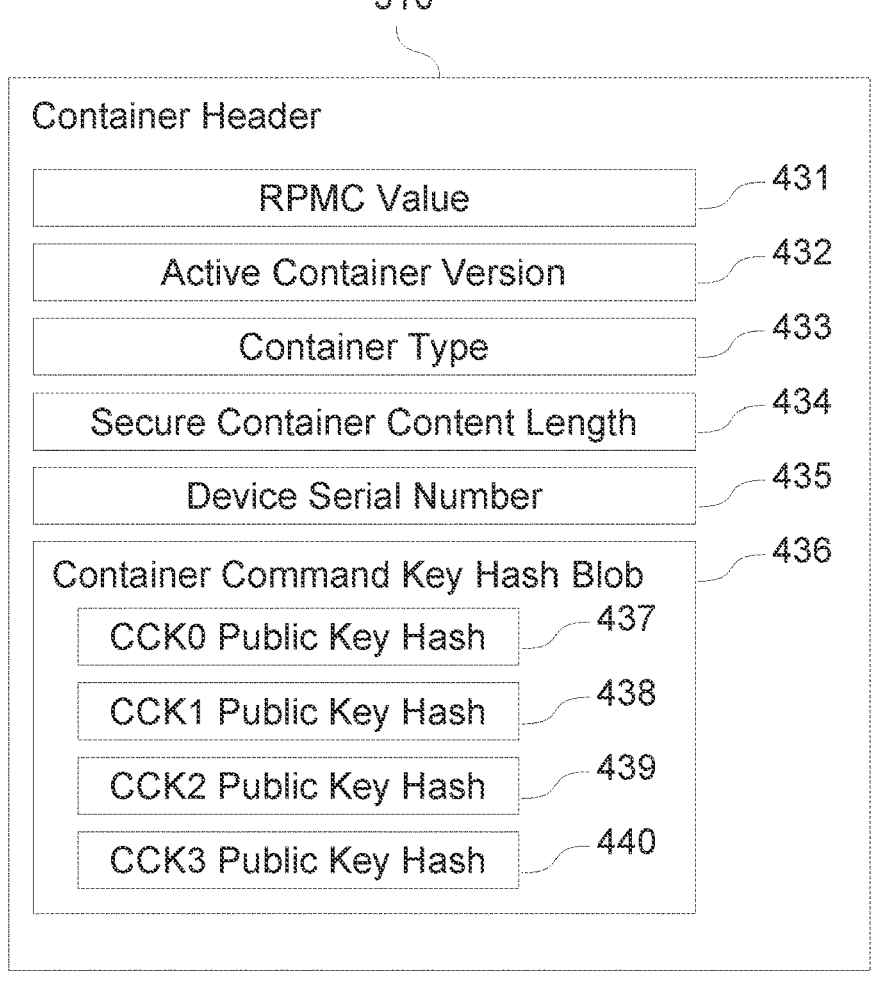
FIG. 4 illustrates a block diagram of an example container header of an owner container for managing ownership of an electronic device.

FIG. 4 illustrates a block diagram of an example container header 310 of an owner container 302 for managing ownership of an electronic device 101. In an example, container header 310 may have a common format for the owner containers created for electronic device 101. As depicted in FIG. 4, container header 310 may include regions 431-436, including: RPMC value 431, active container version 432, container type 433, secure container content length 434, device serial number 435, and container command key hash blob 436.

RPMC value 431 may be provided by a replay protected monotonic counter that may be checked against the current RPMC value 202 in OTP memory 110 to determine if this owner container is valid or has been revoked. In an example, when RPMC value 431 for an owner container 302 has a value of three (3), boot code 140 may determine that owner container is valid when the current RPMC value 202 also has a value of three (3) (e.g., FIG. 2). In the same or different examples, when RPMC value 431 for an owner container 302 has a value of three (3), boot code 140 may determine that owner container is revoked when the current RPMC value 202 has a value greater than three (3) (e.g., TABLE 1 (Revoked RPMC Values)). In some examples, RPMC value 431 may be used in a check for primary and fallback containers.

Active container version 432 may represent a version number for owner container 302. In an example, the owner of electronic device 101 may desire to update information in owner container 302 (e.g., regions illustrated in FIG. 6) in a way that does not require incrementing the RPMC value 431. Accordingly, boot code 140 may increment active container version 432 when the other information is updated. In another example, boot code 140 may set active container version 432 to zero (0) during operations where RPMC value 431 is incremented. Thus, the container with the highest RPMC value 431 and highest active container version 432 may be the primary owner container for electronic device 101.

Container type 433 may represent a type associated with owner container 302. In an example, container type 433 may have a value indicating the container is uninitialized. In another example, container type 433 may have a value indicating owner container 302 is initialized and is a valid owner container. Secure container content length 434 may indicate the number of bytes in owner container content 311. Device serial number 435 may correspond to the serial number of electronic device 101, e.g., unique serial number 205 in OTP memory 110. Container command key hash blob 436 may contain a hash (e.g., SHA384 (Secure Hash Algorithm)) of one or more container command keys (CCK) which may be public keys of a cryptographic key pair. In the illustrated example, container command key hash blob 436 may include hashes of public key CCK0 437, CCK1 438, CCK2 439, and CCK3 440. In an example, these key hashes may be used to verify commands related to owner container 302. (Alternatively, container command key hash blob 436 may contain the public keys instead of hashes of the public keys. In this example, more memory may be needed.) In an example, CCK0-3 (437-440) may be revoked by setting the hash entry to zero (0). Although FIG. 4 illustrates various regions of container header 310, other example systems may include electronic devices with more or fewer regions.

Container Contents

Figure 5:
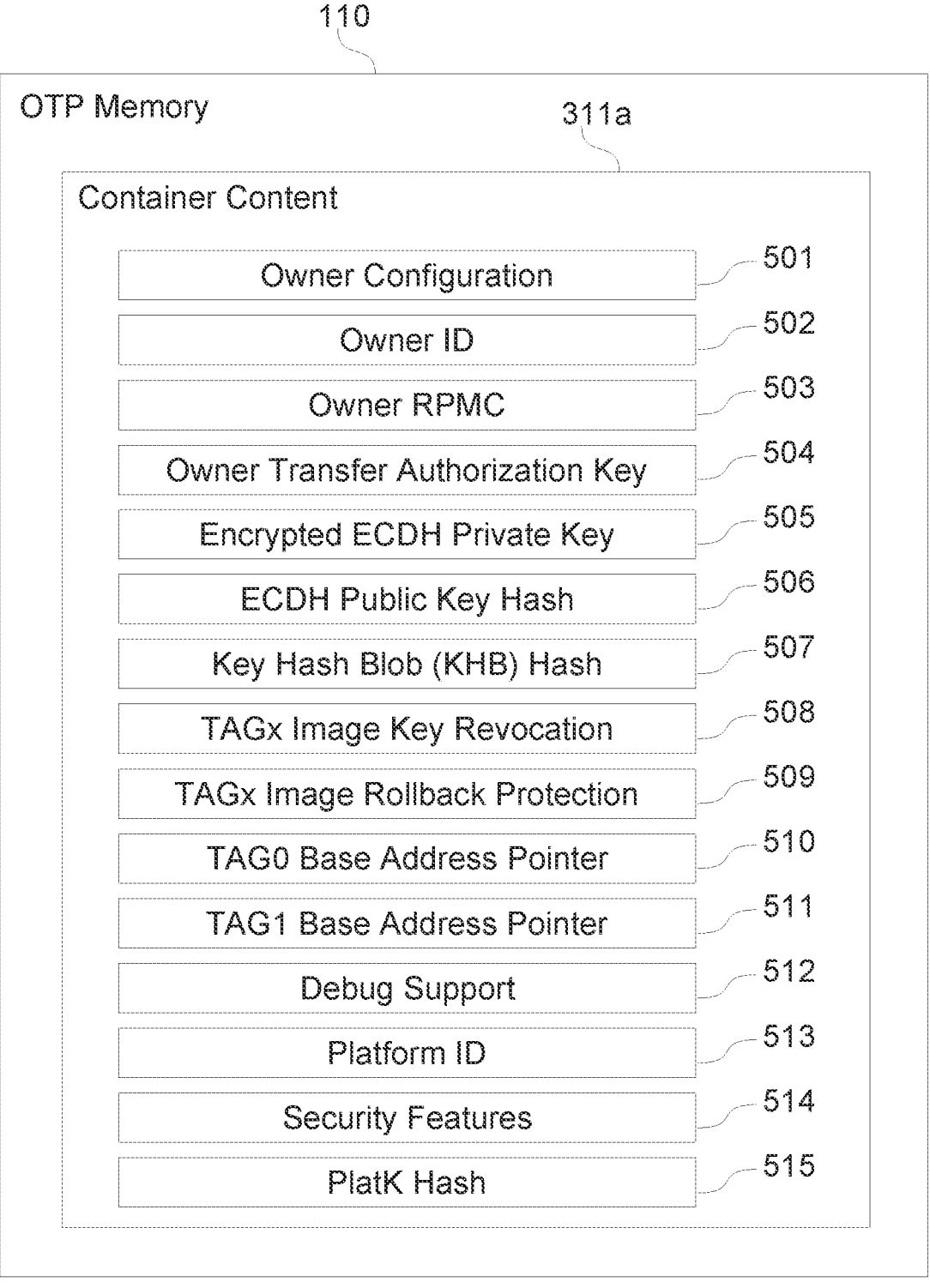
FIG. 5 illustrates a block diagram of example container content of an owner container for managing ownership of an electronic device.

Owner container 302 may have different configurations that may be based on the configuration source, including:

FMB Image Configuration Source=OTP memory (e.g., FIG. 5)

FMB Image Configuration Source=OTP emulation in SPI flash RPMC container (e.g., FIG. 6)

FIG. 5 illustrates a block diagram of example container content 311a of an owner container 302 for managing ownership of an electronic device 101. As depicted in FIG. 5, container content 311a may be programmed in OTP memory 110 and may include regions 501-515, including: owner configuration 501, owner ID 502, owner RPMC 503, owner transfer authorization key (OTAK) 504, encrypted ECDH private key 505, ECDH public key hash 506, key hash blob (KHB) hash 507, TAGx image key revocation 508, TAGx image rollback protection 509, TAG0 base address pointer 510, TAG1 base address pointer 511, debug support 512, platform ID 513, security features 514, and PlatK hash 515. In an example, some or all of container content 311a may be programmed into OTP memory 110 during provisioning (e.g., by the tester). In the same or different example, some or all of container content 311a may be programmed into OTP memory 110 by boot code 140 after provisioning of electronic device 101 is complete. Higher-level firmware (e.g., code other than the code that created the container) may require a command interface (e.g., command memory 171, FIG. 7) to access or modify information in container content 311a of owner container 302.

Owner configuration 501 may include the location of configuration information corresponding to the FMB. For example, configuration information may be located in OTP memory 110, non-volatile memory 173, or other memory. In an example, when configuration information is located in OTP memory 110, the container configuration may be an OTP configuration. In an example, when configuration information is located in non-volatile memory 173 (e.g., SPI flash), the container configuration may be emulating OTP memory (OTP emulation configuration, described more fully below).

Owner configuration 501 may include information on who can transfer ownership of electronic device 101. In an example, the current silicon owner may transfer ownership by executing a transfer of ownership command signed by the owner's public container command key (CCK). In another example, both the current silicon owner and the new owner may transfer ownership. The current silicon owner may transfer ownership to a new owner by executing a transfer of ownership command signed by the owner's public CCK, and the new owner may transfer ownership by executing a transfer of ownership command signed by an owner transfer authorization key (OTAK). The OTAK may be a public key programmed by the current owner into owner container 302 (e.g., in owner transfer authorization key 504) that may enable the new owner (or approved intermediate entity) to execute a transfer of ownership command. Owner configuration 501 may include information indicating whether RPMC owner container crisis commands are supported. In an example, if crisis commands are enabled, an owner may use I/O & port control 190 (e.g., I2C crisis port, UART crisis port) to insert owner container commands into command memory 171 (e.g., FIG. 7). In an example, owner container crisis commands may be disabled by default and may be enabled (e.g., by programming owner configuration 501) by an owner of electronic device 101.

Owner ID 502 may be a value provided by the owner at the time of ownership transfer and may be used to identify the owner. Owner RPMC 503 may be a value determined by boot code 140 at the time of ownership transfer. For example, it may be the first RPMC value assigned to the owner at the time ownership transfer. In an example, owner ID 502 and owner RPMC 503, together, may indicate a unique owner for a particular electronic device 101. Owner transfer authorization key (OTAK) 504 may be a one-time ECDSA-384 public key (Elliptic Curve Digital Signature Algorithm) used to verify a transfer of ownership command, for example, when configuration information in owner configuration 501 enables a new owner to execute a transfer of ownership command.

Encrypted ECDH private key 505 may be an encrypted ECDH (Elliptic-curve Diffie-Hellman) private key used to derive an AES256 (Advanced Encryption Standard) image encryption key (IEK) that may be used to decrypt a FMB image stored in non-volatile memory 173. ECDH public key hash 506 may be a SHA384 hash of an ECDH public key that may be used to derive an AES256 key encryption key (KEK) that may be used to decrypt encrypted ECDH private key 505. In an example, encrypted ECDH private key 505 and ECDH public key hash 506 may be exchanged according to a Diffie-Hellman key exchange protocol and used to decrypt a FMB image.

Key hash blob (KHB) hash 507 may be a SHA384 hash of an owner provided KHB (e.g., stored in non-volatile memory 173) that may contain hashes of each of the public keys that may be used to authenticate other data (e.g., the FMB, RPMC container commands, among others). TAGx image key revocation 508 may indicate whether public keys in the owner's KHB are available or have been revoked (not available for use). In an example, KHB hash 507 may include eight (8) public keys and TAGx image key revocation 508 may comprise one bit corresponding to each public key. In this example, when a bit in TAGx image key revocation 508 is programmed to a value of one (1), the corresponding key may be revoked. In an example, boot code 140 may not use a revoked key (e.g., before using a key, boot code 140 may check to ensure a corresponding bit in TAGx image key revocation 508 is not programmed to a value of one (1)). TAGx image rollback protection 509 may indicate whether a current image revision (e.g., FMB) is available for use or has been revoked (not available for use). In an example, KHB hash 507 may allow for up to 128 image revisions and TAGx image rollback protection 509 may comprise one bit corresponding to each revision. In this example, when a bit in TAGx image rollback protection 509 is programmed to a value of one (1), the corresponding image revision may be revoked. In an example, boot code 140 may not authenticate a revoked image (e.g., before loading an image, boot code 140 may check to ensure a corresponding bit in TAGx image rollback protection 509 is not programmed to a value of one (1)).

TAG0 base address pointer 510 may be the base address for the image header of the FMB. TAG1 base address pointer 511 may be the base address for the image header of the copy of the FMB. Debug support 512 may indicate whether debug (e.g., UART production debug) is supported. Platform ID 513 may comprise an owner platform identification value. Security features 514 may indicate whether the current owner has enabled various security features. In an example, security features 514 may indicate whether an image rollback protection feature is enabled (e.g., whether an image revision may be revoked using TAGx image rollback protection 509). In the same or different examples, security features 514 may indicate whether a key revocation feature is enabled (e.g., whether a key may be revoked using TAGx image key revocation 508). PlatK Hash 515 may comprise a hash (e.g., SHA384) of a platform public key which may be a key used for signing crisis commands (e.g., if owner configuration 501 indicates RPMC owner container crisis commands are supported).

Although FIG. 5 illustrates various regions of container content 311*a*, other example systems may include electronic devices with more or fewer regions. In additional examples, specific regions of container content 311*a* may include features in addition to those described above or may omit some of the features described above.

FIG. 6 illustrates a block diagram of example container content 311*b* of an owner container 302 for managing ownership of an electronic device 101. As depicted in FIG. 6, container content 311*b* may be programmed in non-volatile memory 173 and may include regions 501-515, which are described with respect to FIG. 5 and differ in that they are stored in non-volatile memory 173 rather than OTP memory 110. In an example, an owner container 302 with container content 311*b* stored in non-volatile memory 173 may emulate an owner container stored in OTP memory 110 (OTP emulation) because boot code 140 may store configuration parameters (e.g., in container content 311*b*) when it creates the owner container, and no commands exist for boot code 140 (or other code) to modify those parameters. In the case where a malicious user may attempt to alter the secure RPMC owner container 302 while it is stored in non-volatile memory 173 (e.g., to alter any of the OTP emulated parameters), verification of the container will fail. Thus, configuration parameters in owner container 302 stored in non-volatile memory 173 may be considered to emulate OTP memory.

In an example, container content 311*b* may include PUF activation code 621 (e.g., "PUF" refers to physically unclonable functions, described in more detail below). Boot code 140 may use PUF activation code 621 for generating and passing device attestation key(s) (DevAK) to the silicon owner's firmware. In an example, on the first power on reset cycle after owner container content 311*b* is created or updated, boot code 140 may use a shared SRAM PUF to generate PUF activation code 621 and store it in owner container content 311*b*. During a subsequent boot process, if boot code 140 loads an authentic image (e.g., FMB), boot code 140 may use PUF activation code 621 to generate DevAK private and public keys. In an example, boot code 140 may place the DevAK public key into an X.509 certificate and sign the certificate using the DevIK private key (e.g., secret device-unique information 207 in FIG. 2). In examples, the signed certificate, along with PUF activation code 621 may be passed to the owner's firmware (e.g., via firmware mailbox 788 in FIG. 7). The owner's firmware may regenerate the DevAK private key using the PUF activation code 621.

Additional examples of the PUF activation code 621, SRAM PUF, DevAK and DevIK keys, and device certificates are provided in FIGS. 16-30 and associated descriptions (Physically Unclonable Function (PUF) SRAM section, below).

In some examples (not illustrated), boot code 140 may generate PUF activation code 621 during manufacturing (e.g., before creating owner container 311*b*). According to this example, boot code 140 may store PUF activation code 621 in non-volatile memory (e.g., non-volatile memory 173)

at an address stored in OTP memory 110. Boot code 140 may store a hash of PUF activation code 621 in OTP memory that may be used to verify the integrity of PUF activation code 621 when it is retrieved from non-volatile memory 173. Accordingly, boot code 140 may use PUF activation code 621 to generate DevAK private and public keys even before creating the first owner container 311*b*.

Although FIG. 6 illustrates various regions of container content 311*b*, other example systems may include electronic devices with more or fewer regions. In additional examples, specific regions of container content 311*b* may include features in addition to those described above or may omit some of the features described above.

Command Interface

Figure 7:
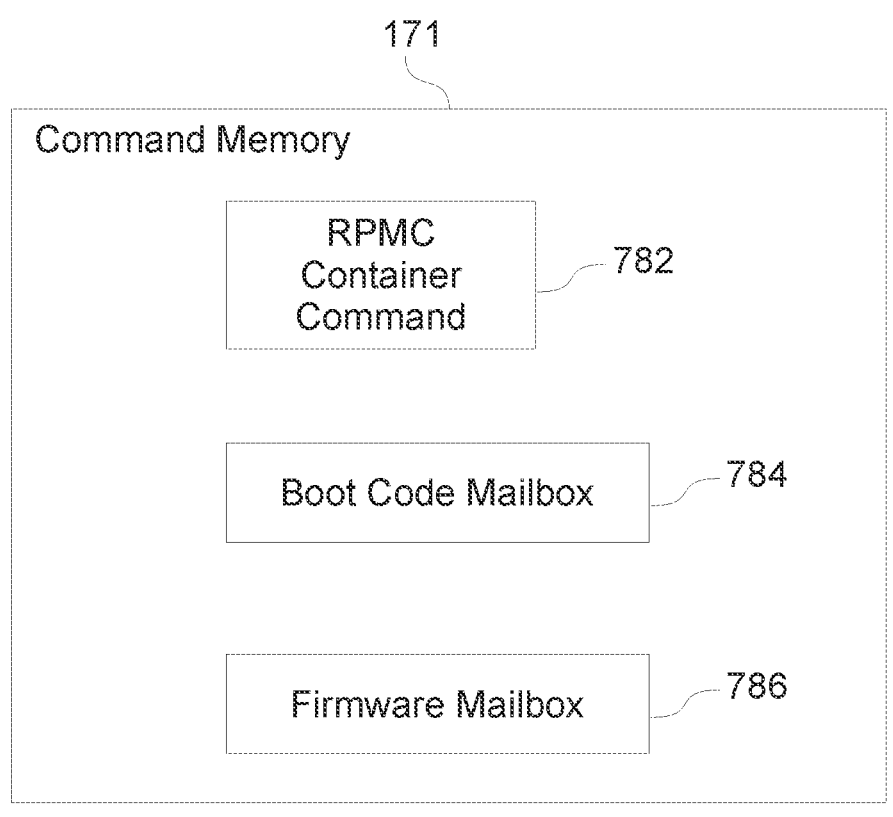
FIG. 7 illustrates an example command memory.

FIG. 7 illustrates an example command memory 171. Command memory 171 may comprise rewritable memory (e.g., registers, SRAM) and may contain RPMC container command 782, boot code mailbox 784, and firmware mailbox 786. According to an example, the boot code 140 may authenticate and optionally decrypt the FMB from non-volatile memory 173 (e.g., SPI flash) and then may load the FMC into internal volatile memory 172 (e.g., SRAM) for subsequent execution by processor 160. For example, the boot code may load the FMB into internal volatile memory 172 (e.g., SRAM), authenticate the FMB, and optionally decrypt the FMB, which may include one or more images, including the FMC as the first image. In an example, the authenticated and optionally decrypted FMB remain in volatile memory 172 (e.g., SRAM). This binary image may be referred to as the "owner" image. The boot code may then cause execution of the FMC by processor 160 (e.g., jumping to the base address of the FMC). The FMC may either be a ROM extension (e.g., an authenticated ROM extension in FMC) or application firmware. An owner application may communicate with boot code 140 or ROM EXT to request a transfer of ownership or perform some other action on its behalf. The application may communicate this action by loading a signed command into the boot code mailbox 784, setting the associated command bits in RPMC container command 782, and triggering a reset (e.g., soft reset).

In the above example, RPMC container command 782 and boot code mailbox 784 may be used to initiate RPMC container requests to be processed by boot code 140. (Firmware mailbox 786 may be used by boot code 140 (or ROM EXT) to pass information to application firmware.) In an example, command memory 171 may be user-accessible so that code other than boot code 140 (e.g., FMC) may initiate requests to be processed by boot code 140. In another example, command memory 171 may be accessed via external hardware (UART interface, I2C interface, among others), for example, to perform crisis recovery (if owner configuration 501 in owner container 311*a/b* indicates RPMC owner container crisis commands are supported).

In an example, RPMC container command 782 may include a bit that, when set, may indicate an RPMC command is pending for electronic device 101. RPMC container command 782 may additionally comprise a command field that may indicate a specific command for boot code 140 to process. In the same or another example, boot code mailbox 784 may be programmed with command parameters corresponding to a pending command. In an example, command parameters stored in boot code mailbox 784 may be signed and boot code 140 may authenticate a pending command (e.g., a command may be considered a signed command when the parameters stored in boot code mailbox 784 are signed) during the boot process before executing the command.

Owner Container Actions

The following non-exclusive list of operations may be performed for owner container 302:

CREATE_CONTAINER_REQUEST
    INCREMENT_RPMC_REQUEST
    UPDATE_CONTAINER_REQUEST
    REPAIR_FALLBACK_CONTAINER_REQUEST
    CRISIS_RECOVERY_REQUEST
    ENABLE_UNRESTRICTED_TRANSFERS
    UPDATE_OTAK_KEY

In an example, boot code 140 may authenticate a signed command received from trusted application firmware and load it into internal volatile memory 172 (e.g., SRAM) for execution by processor 160. In another example, boot code 140 may authenticate a signed command received as crisis recovery commands from I/O & port control 190 (e.g., I2C, UART) and load it into internal volatile memory 172 (e.g., SRAM) for execution by processor 160.

CREATE_CONTAINER_REQUEST Command

This signed command may be invoked to cause boot code 140 to create and program the first signed owner container 302 in non-volatile memory 173 (e.g., SPI flash). Boot code 140 may ignore this command if it is invoked after the first signed owner container 302 has already been created. For example, after creating the first signed owner container 302, boot code 140 may program a bit in OTP memory 110 (e.g., RPMC flash container state 208) indicating a container was created and thereafter check that OTP bit before executing the CREATE_CONTAINER_REQUEST command. If the OTP bit is programmed, boot code 140 may ignore subsequent CREATE_CONTAINER_REQUEST commands.

In an example, the CREATE_CONTAINER_REQUEST command may result in the creation of two identical signed owner containers 302 (e.g., a primary container and a fallback container). These signed containers may be stored in non-volatile memory 173 (e.g., SPI flash). In an example, boot code 140 will set the OTP bit indicating a container was created if it verifies both signed containers are saved successfully in non-volatile memory 173.

In an example, boot code 140 may use command parameters stored in boot code mailbox 784 for the CREATE_CONTAINER_REQUEST command. Command parameters may include an owner creation public key (OCKpub), a command signature signed with the owner creation private key (OCKpriv), and other command parameters corresponding to regions 433-434 and 437-440 in FIG. 4 (container header 310) and 501-502 and 505-515 in FIG. 6 (container content 311*b*). Before creating signed owner container 302, boot code 140 may verify the command signature using OCKpub. In an example, boot code 140 may verify command parameter OCKpub by computing its hash and comparing that to the OCKpub hash retrieved from the KHB stored in non-volatile memory 173. (The KHB stored in non-volatile memory 173 may be validated against KHB hash 507 in OTP memory 110.) If verification of either OCKpub or the command signature fails, boot code 140 may stop execution of the CREATE_CONTAINER_REQUEST command without creating the first owner container 302. In an example, boot code 140 may store an unsuccessful command status in firmware mailbox 786.

If verification is successful, boot code 140 may create signed owner container 302. In an example, boot code 140 may store a successful command status in firmware mailbox 786. In an example, boot code 140 may save corresponding command parameters (in boot code mailbox 784) into corresponding regions in container header 310 (regions 433-434 and 437-440 in FIG. 4) and container content 311*b*

(regions 501-502 and 505-515 in FIG. 5). Boot code 140 may use the following for the new signed owner container 302:

RPMC value 431 (and owner RPMC 503): may default to zero (because this is the first owner container). Boot code 140 may check if any bits of current RPMC value 202 in OTP memory are set and, if so, set these to the first valid, non-zero value.

Active container version 432: may default to zero.

Device serial number 435: may set to value stored in OTP serial number 205.

Owner transfer authorization key 504: may default to zero.

PUF activation code 621: may default to zero when processing the CREATE_CONTAINER_REQUEST command. Boot code 140 may generate and store PUF activation code 621 in signed owner container 302 following the next power cycle.

INCREMENT_RPMC_REQUEST Command

This signed command may be invoked to cause boot code 140 to increment the RPMC value 431 of the primary owner container 302 (without changing other container content). If permitted, boot code 140 may retrieve the primary owner container 302, increment the RPMC value 431, and reset active container version 432 back to zero. Boot code 140 may erase the primary and fallback containers stored in non-volatile memory 173 and store the updated owner container 302 in their place. Once both containers are updated successfully, the boot code may increment the current RPMC value 202 in OTP memory 110 which may revoke the previous containers.

In an example, boot code 140 may use command parameters stored in boot code mailbox 784 for the INCREMENT_RPMC_REQUEST command. Command parameters may include a container commands public key (CCKpub), an indication of which of CCK0-CCK3 (hashes in current owner container header 310 region 436) the CCKpub corresponds to, and a command signature signed with the container commands private key (CCKpriv). Before incrementing RPMC value 431, boot code 140 may verify the command signature using CCKpub. In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) If verification of either CCKpub or the command signature fails, boot code 140 may stop execution of the INCREMENT_RPMC_REQUEST command without incrementing RPMC value 431. In an example, boot code 140 may store an unsuccessful command status in firmware mailbox 786.

If verification is successful, boot code 140 may increment RPMC value 431 as described above. In an example, boot code 140 may store a successful command status in firmware mailbox 786.

UPDATE_CONTAINER_REQUEST Command

This signed command may be invoked to cause boot code 140 to update the selected container and increment current RPMC value 202 in OTP memory 110. In an example, the specific update performed may be determined by a sub-command parameter of command parameters stored in boot code mailbox 784 for the UPDATE_CONTAINER_RE-QUEST command. In an example, sub-commands may include: (1) "key revocation and rollback protection" and (2) "transfer ownership".

In an example, boot code 140 may use command parameters stored in boot code mailbox 784 for the UPDATE_CONTAINER_REQUEST command. Command parameters may include a signature public key (CCKpub or OTAKpub), an indication of which of OTAKpub or CCK0-CCK3 (hashes in current owner container header 310 region 436) to use for verification, and a command signature signed with private key OTAKpriv or CCKpriv. Before updating owner container 302, boot code 140 may verify the command signature using OTAKpub or CCKpub (whichever is indicated for use). In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) In another example, boot code 140 may verify command parameter OTAKpub by comparing it to the owner transfer authorization key 504 stored in current owner container content 311b. If verification of either (1) the selected OTAKpub or CCKpub key or (2) the command signature fails, boot code 140 may stop execution of the UPDATE_CONTAINER_REQUEST command without modifying the current owner container 302 or incrementing current RPMC value 202 in OTP memory 110. In an example boot code 140 may store an unsuccessful command status in firmware mailbox 786.

If (1) verification of both the selected OTAKpub or CCKpub key and the command signature is successful and (2) sub-command is "transfer ownership," boot code 140 may update signed owner container 302. In an example, boot code 140 may save command parameters (e.g., in boot code mailbox 784) corresponding to regions 433-434 and 437-440 in FIG. 4 (container header 310) and 501-502 and 505-515 in FIG. 6 (container content 311b) into corresponding regions in container header 310 and container content 311b of updated signed owner container 302. Boot code 140 may use the following defaults for the updated signed owner container 302:

RPMC value 431 (and owner RPMC 503): may use {current RPMC value 202+1}.

Active container version 432: may default to zero.

Device serial number 435: may set to value stored in OTP serial number 205.

Owner transfer authorization key 504: may default to zero.

PUF activation code 621: may default to zero when processing the CREATE_CONTAINER_REQUEST command. Boot code 140 may generate and store PUF activation code 621 in signed owner container 302 following the next power cycle.

If (1) verification of both the selected OTAKpub or CCKpub key and the command signature is successful, (2) sub-command is "transfer ownership," and (3) both updated primary and fallback owner containers 302 are successfully written to non-volatile memory 173, boot code 140 may increment current RPMC value 202 in OTP memory 110. In an example, boot code 140 may store a successful command status in firmware mailbox 786.

If (1) verification of both the selected OTAKpub or CCKpub key and the command signature is successful and (2) sub-command is "key revocation and rollback protection," boot code 140 may process the key revocation and rollback protection request. In an example, boot code 140 may update one or both of TAGx image key revocation 508 and TAGx image rollback protection 509 in container content 311*b* of signed owner container 302. In an example, boot code 140 may store a successful command status in firmware mailbox 786.

REPAIR_FALLBACK_CONTAINER_REQUEST Command

This signed command may be invoked to cause boot code 140 to update the fallback container to match the primary container. If the primary container is valid and the fallback container does not match the primary container, boot code 140 may erase the fallback container and copy the primary container to the fallback container location. In an example, boot code 140 may use command parameters stored in boot code mailbox 784 for the REPAIR_FALLBACK_CON-TAINER_REQUEST command. Command parameters may include a signature public key (CCKpub or OTAKpub), an indication of which of OTAKpub or CCK0-CCK3 (hashes in current owner container header 310 region 436) to use for verification, and a command signature signed with private key OTAKpriv or CCKpriv. The boot code may verify the signature public key and command signature for the REPAIR_FALLBACK_CONTAINER_REQUEST command using the same mechanisms disclosed for the UPDATE_CONTAINER_REQUEST (above). In an example, if verification succeeds and no errors are detected in updating the fallback container, a matching fallback container may be stored in non-volatile memory 173 (e.g., SPI flash) resulting in matching primary and fallback containers stored in in non-volatile memory 173, and boot code 140 may store a successful command status in firmware mailbox 786. If verification fails or an error is detected, there may be no change (e.g., primary container is still valid in non-volatile memory 173 and fallback container is still invalid). In this latter example, boot code 140 may store an unsuccessful command status in firmware mailbox 786.

CRISIS_RECOVERY_REQUEST Command

This signed command may be invoked to cause boot code 140 to recover from the case where the primary and fallback containers are not valid. In an example, this command may be serviced when both containers are invalid. Boot code 140 may permit the owner to restore a saved copy of a working owner container using a crisis command (e.g., RESTOR-E_OWNER_CONTAINER) issued via I/O & port control 190 (e.g., I2C crisis port, UART crisis port).

ENABLE_UNRESTRICTED_TRANSFERS Command

This signed command may be invoked to cause boot code 140 to perform the following owner container 302 updates:
 Update owner configuration 501 (FIG. 5) so that both the current silicon owner and a new owner may transfer ownership of electronic device 101.
 Provision owner transfer authorization key 504.
 Increment active container version 432 (FIG. 4).
 Re-sign owner container 302.
In an example, boot code 140 may use command parameters stored in boot code mailbox 784 for the ENABLE_UNRESTRICTED_TRANSFERS command. Command parameters may include an OTAKpub public key (e.g., for provisioning owner transfer authorization key 504), a signature public key (CCKpub), an indication of which of CCK0-CCK3 (hashes in current owner container header 310 region 436) the CCKpub corresponds to, and a command signature signed with the container commands private key (CCKpriv). Before updating owner container 302, boot code 140 may verify the command signature using CCKpub. In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) If verification of either CCKpub or the command signature fails, boot code 140 may stop execution of the ENABLE_UN-RESTRICTED_TRANSFERS command without updating owner container 302. In an example, boot code 140 may store an unsuccessful command status in firmware mailbox 786.

If verification is successful, boot code 140 may perform updates to owner container 302 as described above (e.g., by updating both copies of the container in non-volatile memory (e.g., SPI flash)). In an example, boot code 140 may store a successful command status in firmware mailbox 786.

UPDATE_OTAK_KEY Command

This signed command may be invoked to cause boot code 140 to perform the following owner container 302 updates:
 Provision owner transfer authorization key 504.
 Increment active container version 432 (FIG. 4).
 Re-sign owner container 302.
This signed command may allow an intermediate entity that has the OTAKpriv private key to cause the above updates. In an example, boot code 140 may ignore this command unless owner configuration 501 is configured to allow both the current silicon owner and a new owner to transfer ownership of electronic device 101 (e.g., unrestricted transfers have been enabled).

In an example, boot code 140 may use command parameters stored in boot code mailbox 784 for the UPDATE_O-TAK_KEY command. Command parameters may include a new OTAKpub new public key (e.g., for provisioning owner transfer authorization key 504), a signature public key (CCKpub or OTAKpub), an indication of which of OTAK-pub or CCK0-CCK3 (hashes in current owner container header 310 region 436) to use for verification, and a command signature signed with private key OTAKpriv or CCK-priv. Before updating owner container 302, boot code 140 may verify the command signature using OTAKpub or CCKpub (whichever is indicated for use). In an example, boot code 140 may verify command parameter CCKpub by computing its hash and comparing that to the corresponding CCKpub hash (CCK0-CCK3) stored in current owner container header 310. (Information in current owner container header 310 may be trusted because owner container 302 may be verified by boot code 140.) In another example, boot code 140 may verify command parameter OTAKpub by comparing it to the owner transfer authorization key 504 stored in current owner container content 311*b*. If verification of either (1) the selected OTAKpub or CCKpub key or (2) the command signature fails, boot code 140 may stop execution of the UPDATE_OTAK_KEY command without modifying the current owner container 302. In an example boot code 140 may store an unsuccessful command status in firmware mailbox 786.

If verification is successful, boot code 140 may perform updates to owner container 302 as described above (e.g., by updating both copies of the container in non-volatile memory (e.g., SPI flash)). In an example, boot code 140 may store a successful command status in firmware mailbox 786.

Ownership of Electronic Device

Electronic device 101 may have one or more owners over its lifetime and each owner may customize the images permitted to run on the machine. In an example, the OEM may be the first implicit owner (a "No Owner" state), and the OEM's configuration may be stored in OTP memory 110. The OEM may enable the part to support transfer of ownership by establishing the first owner container. The silicon owner may be the entity that controls keys used for code execution, transfer of ownership, and crisis recovery, for example, corresponding to the currently active (not revoked) secure RPMC owner container (e.g., the owner container with an RPMC value 431 matching the current owner RPMC value 202 in OTP memory 110).

Establishing Ownership

During manufacturing, OTP memory 110 may be provisioned with OEM image configuration parameters, which may include KHB hash 507 used for authenticating OEM images stored in non-volatile memory 173 (e.g., SPI flash). Other parameters in OTP memory 110 (e.g., illustrated in FIG. 2 and FIG. 5) may also be provisioned by the OEM during manufacturing. This configuration may be referred to as the "Legacy Secure Boot" state. In this state, only the signed OEM images (e.g., FMB) may be authenticated and executed on the electronic device 101.

RPMC owner container 302 may be created by the OEM using the CREATE_CONTAINER_REQUEST command. The OEM may opt to use either the OTP memory configuration (e.g., FIG. 5) or an owner container configuration (OTP emulation) (e.g., FIG. 6).

The OEM owner container 302 may be created by authentic firmware loaded from non-volatile memory 173 (e.g., SPI flash) or via code loaded into volatile memory 172 (e.g., SRAM) via I/O & port control 190 (e.g., I2C crisis port, UART crisis port). The firmware may store the CREATE_CONTAINER_REQUEST command into boot code mailbox 784 (FIG. 7), set the RPMC Container Command 782 to indicate a pending request, and assert reset (e.g., soft reset).

FIG. 8 illustrates a block diagram of an example of managing ownership of an electronic device 101, including by creating a first owner container using OEM signed images and OTP configuration. Contents of non-volatile memory 873 (e.g., SPI flash) are shown at time t0 and includes: OTP TAG0/1 image header base addresses, OTP KHB (primary and fallback), and OTP TAG0/1 image headers and images (e.g., FMB). At time t0, there may be no owner of electronic device 101, although the OEM may be an implicit owner. In an example, at time t1, OEM application code may write owner container 0/1 (primary and fallback containers) base addresses into non-volatile memory 873. At time t2, OEM application code may store the CREATE_CONTAINER_REQUEST command to RPMC container command region in command memory 871 and may store the new owner's (Owner A) container parameters in boot code mailbox in command memory 871. In an example, the parameter corresponding to owner configuration parameter 501 may specify an OTP configuration for the Owner A. At time t3, OEM application code may cause a soft system reset of electronic device 101. During the boot process, boot code 140 may notice a pending CREATE_CONTAINER_REQUEST (e.g., in command memory 871) command and process the command. At time t4, if the command is successful, boot code 140 may write Owner A Containers 0/1 (primary and fallback containers) to non-volatile memory 873. As illustrated, after time t4, electronic device 101 may be owned by Owner A using OTP images. In an example, following time t4, OEM application may read command status bits from firmware mailbox 786 (FIG. 7) to verify successful completion of the command. OEM application may optionally read Owner A Containers 0/1 from non-volatile memory 873 and verify the content. In an example, OEM application may optionally save a copy of Owner A Containers 0/1 as a backup.

Figure 9:
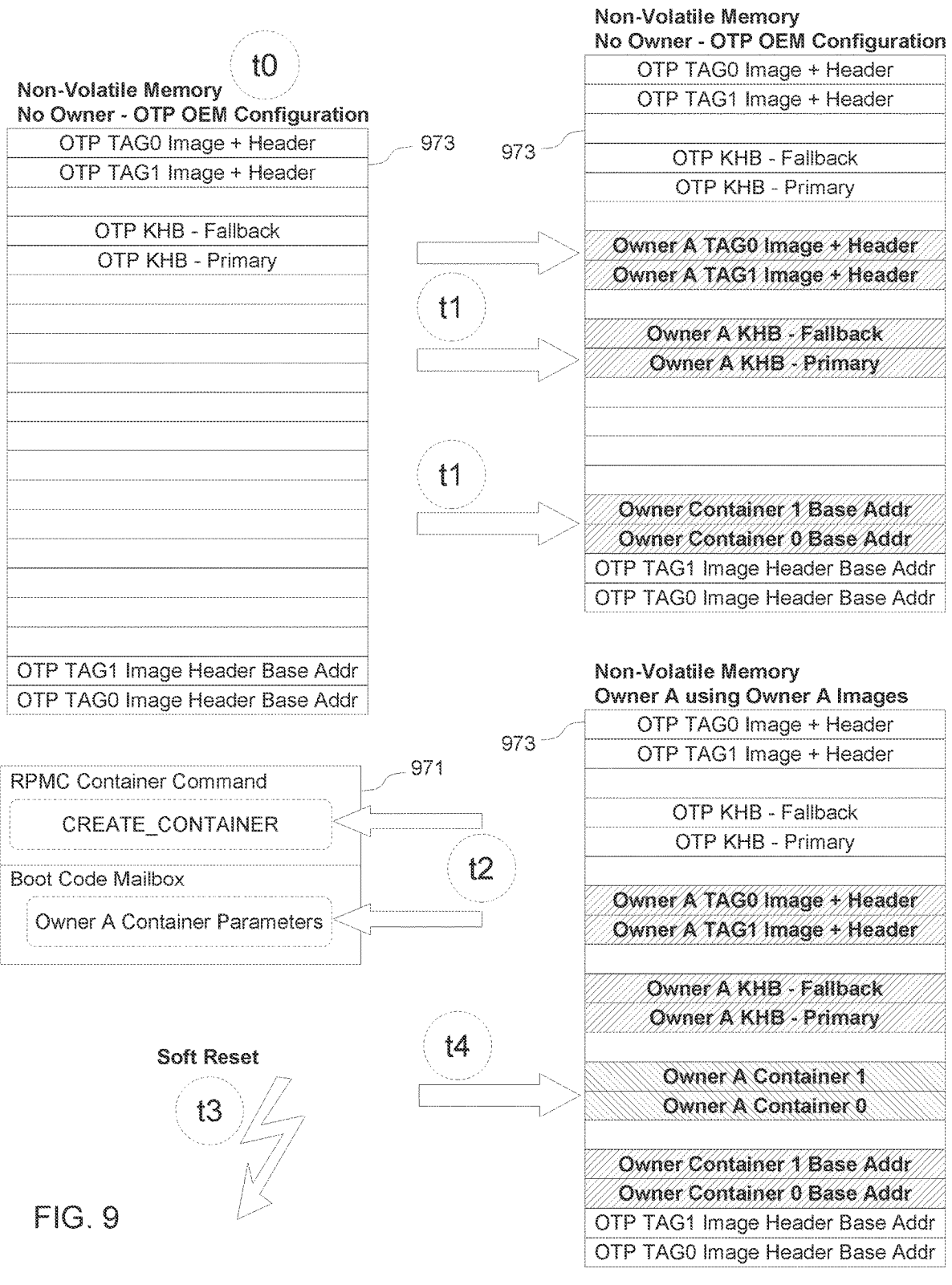
FIG. 9 illustrates a block diagram of an example of managing ownership of an electronic device, including by creating a first owner container using OEM signed images and OTP emulation configuration.

FIG. 9 illustrates a block diagram of an example of managing ownership of an electronic device 101, including by creating a first owner container using OEM signed images and OTP emulation configuration. Contents of non-volatile memory 973 (e.g., SPI flash) are shown at time t0 and includes: OTP TAG0/1 image header base addresses, OTP KHB (primary and fallback), and OTP TAG0/1 images+headers (e.g., FMB). At time t0, there may be no owner of electronic device 101, although the OEM may be an implicit owner. In an example, at time t1, OEM application code may write (1) owner container 0/1 base addresses, (2) Owner A KHBs (primary and fallback), and (3) Owner A TAG0/1 images+headers (e.g., FMB) into non-volatile memory 973. At time t2, OEM application code may store the CREATE_CONTAINER_REQUEST command to RPMC container command region in command memory 971 and may store the new owner's (Owner A) container parameters in boot code mailbox in command memory 971. In an example, the parameter corresponding to owner configuration parameter 501 may specify an OTP emulation configuration for Owner A. At time t3, OEM application code may cause a soft system reset of electronic device 101. During the boot process, boot code 140 may notice a pending CREATE_CONTAINER_REQUEST command and process the command. At time t4, if the command is successful, boot code 140 may write Owner A Containers 0/1 (primary and fallback containers) to non-volatile memory 973 and begin executing Owner A image (e.g., TAG0 image). As illustrated, after time t4, electronic device 101 may be owned by Owner A using Owner A images. In an example, following time t4, Owner A application may read command status bits from firmware mailbox 786 (FIG. 7) to verify successful completion of the command. Owner A application may optionally read Owner A Containers 0/1 from non-volatile memory 973 and verify the content. In an example, Owner A application may optionally save a copy of Owner A Containers 0/1 as a backup.

Boot Sequence for Electronic Device Having RPMC Owner Containers

Figure 10:
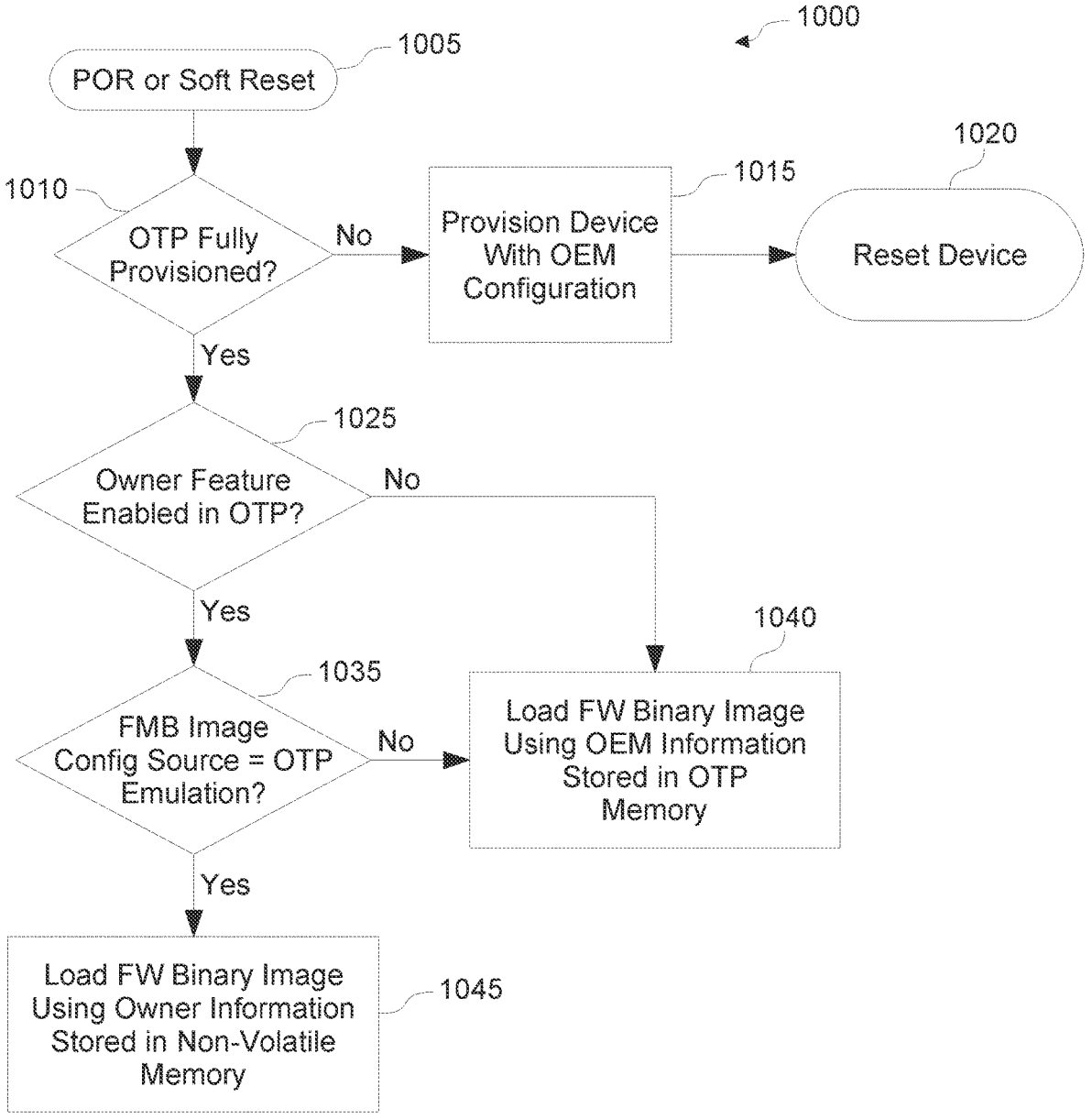
FIG. 10 illustrates a flow chart of an example method for managing ownership of an electronic device, including secure transfer of ownership of the electronic device, over time.

FIG. 10 illustrates a flow chart of an example method 1000 for managing ownership of an electronic device, including secure transfer of ownership of the electronic device, over time. According to one example, method 1000 may begin at block 1005. In an example, method 1000 may be performed by boot code 140. In some examples, starting block 1005 may represent a time when electronic device 101 is first powered up (POR) or a time following a reset of the electronic device (e.g., a device reset, a reboot, or a power cycle). Thus method 1000 may be performed by boot code 140 at a time when OTP memory 110 is not user-accessible (e.g., because user code has not yet been loaded). Teachings of the present disclosure may be implemented in a variety of configurations of system 100. As such, the initialization point for method 1000 and the order of 1005-1045 comprising method 1000 may depend on the implementation chosen.

Following a POR or soft reset, boot code may proceed to block 1010 where it determines whether OTP memory has been fully provisioned. If not, boot code may proceed to block 1015, provision electronic device 101 with the OEM configuration, and then proceed to block 1020 and reset electronic device 101.

If boot code determines in block 1010 that the OTP memory is fully provisioned, it may proceed to block 1025 where it may determine whether the owner feature is enabled in OTP memory 110. In an example, this feature may be disabled by default (i.e., at the time of manufacture). If the owner feature is not enabled, boot code may proceed to block 1040 where it may load the firmware binary image using OEM information stored in OTP memory 110. At block 1040, the OEM may be the implicit owner of electronic device 101 because only OEM signed firmware may be loaded and executed (may also be referred to as "Legacy Secure Boot"). In an example, OEM firmware may enable the owner feature by issuing the CREATE_CONTAINER_REQUEST command (e.g., illustrated in FIG. 8 and FIG. 9). If boot code determines at block 1025 that the owner feature is enabled in OTP memory 110, boot code may proceed to block 1035 where it may determine whether the FMB image configuration source is OTP emulation. If the FMB image configuration source is not OTP emulation, the image configuration source may be OTP memory. In this example, boot code may proceed to block 1040 for Legacy Secure Boot. If boot code determines at block 1035 that the FMB configuration image source is OTP emulation, boot code may proceed to block 1045 where it may attempt to load firmware using RPMC owner container information stored in non-volatile memory 173 (e.g., SPI flash). In an example, block 1045 may represent a secure boot process using RPMC owner containers stored in non-volatile memory 173.

Although FIG. 10 discloses a particular number of operations related to method 1000, method 1000 may be executed with greater or fewer operations than those depicted in FIG. 10. In addition, although FIG. 10 discloses a certain order of operations to be taken with respect to method 1000, the operations comprising method 1000 may be completed in any suitable order.

Transferring Ownership of an Electronic Device

In an example, an OEM may be the first silicon owner (e.g., owner of electronic device 101). However, owners may change one or more times over the life of the electronic device. The owner is the entity who may determine the keys used to authenticate the FMB images. Transfer of ownership may be the act of changing the entity responsible for determining the FMB signing keys.

In an example, an owner may opt to use RPMC owner containers 302 with either the OTP configuration (using OEM images) (e.g., FIG. 5) or owner defined configuration (using owner images) (e.g., FIG. 6). New owner containers 302 may be created by authentic firmware loaded from non-volatile memory 173 (e.g., SPI flash) or via I/O & port control 190 (e.g., I2C crisis port, UART crisis port) by executing the UPDATE_CONTAINER_REQUEST command for transfer of ownership. According to an example, this command may be supported when the current owner enables unrestricted transfers of ownership by executing the ENABLE_UNRESTRICTED_TRANSFERS command.

In some examples, there may be three types of ownership transfers:

Current owner performs the transfer to the new owner.

Trusted intermediate entity performs the transfer to the new owner (unrestricted transfers).

Current owner enables the new owner to claim ownership (unrestricted transfers).

Using its CCK keys, the current owner of electronic device 101 may transfer ownership to a new owner if the new owner is willing to provide its information to the current owner. In another example, the current owner may use its CCK keys to return the system to the OEM/refurbished state. This latter type of transfer may be simplified if the OEM images and configuration information are retained in non-volatile memory 173 (e.g., SPI flash). In an example, boot code 140 may not load the OEM images unless the current owner transfers ownership to use the OEM images.

The Owner Transfer Authorization Key (OTAK) may support a one-time transfer of ownership to a new owner while avoiding providing the new owner's information to the current owner. Using the OTAK transfer (which may be referred to as an "unrestricted transfer"), the new owner may upload its information and complete the ownership transfer as long as the current owner enabled the OTAK transfer. The OTAK ownership transfer may be completed where the new owner may or may not be present at the time the current owner relinquishes the machine.

Figure 12:
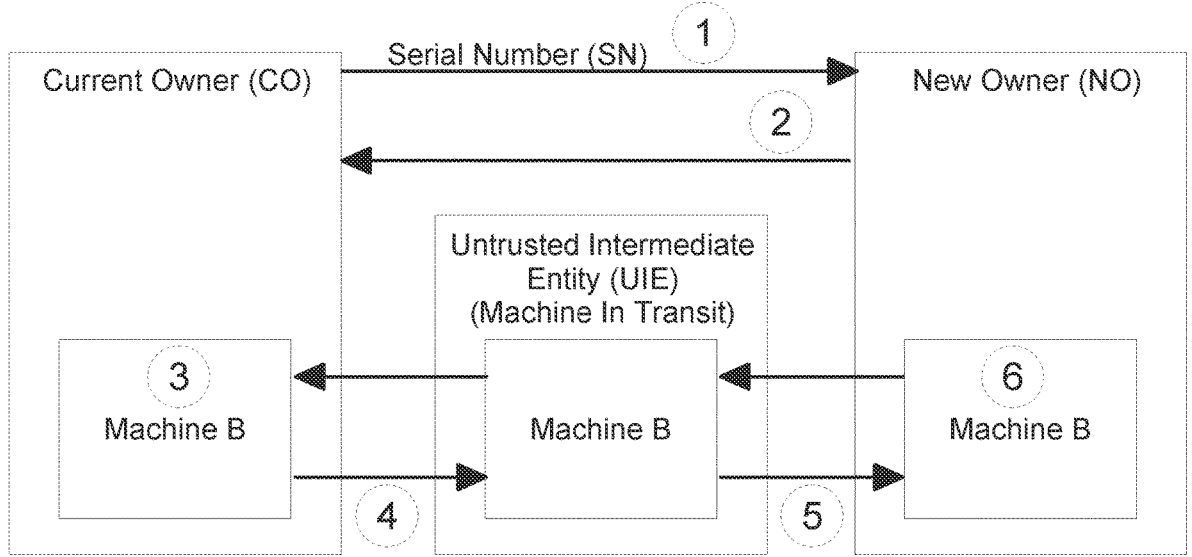

FIG. 11 and FIG. 12 illustrate block diagrams of two examples of managing ownership of an electronic device 101 using an unrestricted transfer and OTAK. As illustrated in FIG. 11, current owner (CO) may want to transfer ownership of Machine A to a new owner (NO). In an example, the current owner may rely on a trusted intermediate entity (TIE) (e.g., a sales distribution channel) to assist in transferring ownership to the new owner. In an example, the following events (1-8) may occur during the transfer.

1—CO may send Machine A serial number to TIE and NO (if NO is known). TIE and NO may use the serial number to confirm they receive the correct equipment (e.g., Machine A).

2—TIE may send OTAKpub1 key to CO. OTAKpub1 key may be a public key of a public/private key pair owned by TIE.

3—CO may run ENABLE_UNRESTRICTED_TRANSFERS command, passing OTAKpub1 key as the new OTAK public key for Machine A.

4—CO may send Machine A to TIE.

5—NO may send OTAKpub2 key to TIE. OTAKpub2 key may be a public key of a public/private key pair owned by NO.

6—TIE may run UPDATE_OTAK_KEY command, passing OTAKpub2 key as the new OTAK public key for Machine A. Because UPDATE_OTAK_KEY is a signed command, TIE may sign the command with TIE's OTAKpriv1 private key. TIE may use I/O & port control 190 (e.g., I2C crisis port, UART crisis port) to insert UPDATE_OTAK_KEY command into command memory 171 (e.g., FIG. 7).

7—TIE may send Machine A to NO.

8—NO may run UPDATE_CONTAINER_REQUEST with "transfer ownership" sub-command. Because UPDATE_CONTAINER_REQUEST is a signed command, NO may sign the command with NO's OTAKpriv2 private key. NO may use I/O & port control 190 (e.g., I2C crisis port, UART crisis port) to insert UPDATE_CONTAINER_REQUEST command into command memory 171 (e.g., FIG. 7).

Although FIG. 11 discloses a particular number of events related to an unrestricted ownership transfer, this type of transfer may be executed with greater or fewer events than those depicted in FIG. 11. For example, CO may not send the serial number to either or both of TIE and NO. In addition, although FIG. 11 discloses a certain order of events, the events may be completed in any suitable order.

As illustrated in FIG. 12, current owner (CO) may want to transfer ownership of Machine B to a new owner (NO). In an example, the transfer may use an untrusted intermediate entity (UIE) to assist in transferring ownership to the new owner. In an example, the following events (1-6) may occur during the transfer.

1—CO may send Machine B serial number to NO. NO may use the serial number to confirm it received the correct equipment (e.g., Machine B).

2—NO may send OTAKpub3 key to CO. OTAKpub3 key may be a public key of a public/private key pair owned by NO.

3—CO may run ENABLE_UNRESTRICTED_TRANS-FERS command, passing OTAKpub3 key as the new OTAK public key for Machine B.

4—CO may send Machine B to UIE. Note that UIE may not assume ownership or run commands on Machine B because UIE does not have access to OTAKpriv3.

5—UIE may forward Machine B to NO (as is).

6—NO may run UPDATE_CONTAINER_REQUEST with "transfer ownership" sub-command. Because UPDATE_CONTAINER_REQUEST is a signed command, NO may sign the command with NO's OTAK-priv3 private key. NO may use I/O & port control 190 (e.g., I2C crisis port, UART crisis port) to insert UPDATE_CONTAINER_REQUEST command into command memory 171 (e.g., FIG. 7).

Although FIG. 12 discloses a particular number of events related to an unrestricted ownership transfer, this type of transfer may be executed with greater or fewer events than those depicted in FIG. 12. For example, CO may not send the serial number to NO. In another example, CO may send Machine B to NO directly, without the need for an intermediate entity. In addition, although FIG. 12 discloses a certain order of events, the events may be completed in any suitable order.

As illustrated in FIG. 11 and FIG. 12, if an intermediate entity is required and the end owner is unknown, each temporary owner may have their own OTAK key. If an intermediate entity is required and the end owner is known, the end owner may supply their OTAK public key preventing the intermediate entities from taking ownership or altering the OTAK key. The current owner may retain ownership until the owner transfer is complete. This allows the current owner to handle any issues that arise during transfer of ownership.

In an example, there may be six scenarios for transferring ownership of electronic device 101:

Direct ownership transfer using current owner's CCK key and FMB configuration=OTP (FIG. 13).

Direct ownership transfer using current owner's CCK key and FMB configuration=OTP emulation.

Direct ownership transfer using new owner's OTAK key and FMB configuration=OTP.

Direct ownership transfer using new owner's OTAK key and FMB configuration=OTP emulation.

Indirect ownership transfer using intermediate entity, OTAK keys, and FMB configuration=OTP.

Indirect ownership transfer using intermediate entity, OTAK keys, and FMB configuration=OTP emulation.

In an example where the ownership transfer command was successful, the new owner may load and execute code via I/O & port control 190 (e.g., a crisis port). This loaded code may be used to update the SPI flash images.

Transfer Procedure Using CCK Keys

FIG. 13 illustrates a block diagram of an example of managing ownership of an electronic device 101, including by transferring ownership using current owner's CCK key and FMB configuration=OTP. Contents of non-volatile memory 1373 (e.g., SPI flash) are shown at time t0 and includes: OTP TAG0/1 image header base addresses, OTP KHB (primary and fallback), OTP TAG0/1 image headers and images (e.g., FMB), owner container 0/1 base address, and owner A container 0/1. At time to, owner A may be the owner of electronic device 101. The new owner may provide its owner configuration parameters to current owner and the current owner may sign the UPDATE_CONTAINER_RE-QUEST ("transfer ownership" sub-command) command parameters for the new owner using the current owner's CCK key (e.g., using an external hardware security module). In an example, the signed parameters may then be used by either the new owner or the current owner to perform the ownership transfer. At time t1, a soft system reset of electronic device 101 may cause it to enter crisis recovery mode. At time t2, either the new owner or the old owner may use the crisis port (e.g., I2C, UART) to issue the signed UPDATE_CONTAINER_REQUEST command. At time t3, if the command is successful, boot code 140 may write owner B Containers 0/1 (primary and fallback containers) to non-volatile memory 1373. As illustrated, after time t3, electronic device 101 may be owned by owner B using OEM OTP images.

FIG. 13 illustrates transferring ownership using current owner's CCK key and FMB configuration=OTP. The process may be similar when FMB configuration=OTP emulation. For OTP emulation, after issuing the UPDATE_CON-TAINER_REQUEST, the owner may use the crisis port to load the new owner's loader code image and KHB into volatile memory 172 (e.g., SRAM (FIG. 1)). On a load success (t3), boot code 140 may write owner B Containers 0/1 (primary and fallback containers) to non-volatile memory 1373 and jump into the new owner's loader code. Subsequently, the new owner's loader code may write signed images and KHB (primary and fallback) to non-volatile memory 1373 (e.g., SPI flash).

Thus, the general procedure for ownership transfers using CCK keys may include:

The new owner may provide their owner configuration parameters to the current owner.

The current owner may sign the transfer ownership command parameters for the new owner.

(optional) The current owner may enable crisis mode for restricted signing.

(optional) The current owner may erase their images and KHB (if applicable).

Electronic device may be powered off and physically transferred to the new owner or trusted intermediate entity.

The new owner may issue the transfer ownership command using the crisis port.

(for OTP emulation) The new owner may use the crisis port to load the new owner's loader code image and KHB which will write signed images and KHB (primary and fallback) to the non-volatile memory.

Transfer Procedure Using OTAK Keys

Examples of transferring ownership using the OTAK key are discussed above for FIG. 11 and FIG. 12. The general procedure for ownership transfers using OTAK keys may include:

The new owner or trusted intermediate entity may generate a public/private ECDSA-384 key pair.

The public ECDSA key may be transferred to the current owner offline via a trusted channel.

The current owner may store this public key value to the OTAK key in the owner container and enable unrestricted transfer of ownership using the ENABLE_UN-RESTRICTED_TRANSFERS command.

(optional) The current owner may write new owner images and KHB to flash.

(optional) The current owner may erase their images and KHB.

The machine may be powered off and physically transferred to the new owner or trusted entity.

(optional) If using a trusted intermediate entity, execute (via crisis port) UPDATE_OTAK_KEY command or UPDATE_CONTAINER_REQUEST command (with "transfer ownership" sub-command) using the intermediate entity's OTAK key.

New owner may execute (via crisis port) UPDATE_CONTAINER_REQUEST command (with "transfer ownership" sub-command).

(for OTP emulation) The new owner may use the crisis port to load the new owner's loader code image and KHB which will write signed images and KHB (primary and fallback) to the non-volatile memory.

In an example, if the transfer ownership command executed successfully, the new owner may load and execute code via the same crisis port.

Locating Owner Containers

In an example, boot code 140 may be allocated the first 16 bytes in SPI Flash memory of component 0 (e.g., the first flash memory component accessed during the boot sequence) by default for the boot ROM address pointer table. This 16-byte address pointer table may be relocatable. The table may be used for locating owner images and may be remappable in OTP memory. The location of the primary RPMC owner container base address and fallback RPMC owner container base address may be stored in the last 8 bytes of the address pointer table.

RPMC Value in OTP Memory and Owner Containers

In an example, current RPMC value 202 in OTP memory 110 may match RPMC value 431 in container header 310 of the current owner container 302. During updates (e.g., UPDATE_CONTAINER COMMAND request), RPMC value 431 in container header 310 may be incremented by one indicating a container update is in progress. If the update is successful, current RPMC value 202 in OTP memory 110 may be incremented to match RPMC value 431 in the updated container header 310.

Ownership Transfer Methods

FIG. 14 illustrates a flow chart of an example method 1400 for managing ownership of an electronic device, including secure transfer of ownership of the electronic device, over time. According to one example, method 1400 may begin at block 1410. Teachings of the present disclosure may be implemented in a variety of configurations of system 100. As such, the initialization point for method 1400 and the order of 1410-1430 comprising method 1400 may depend on the implementation chosen.

At block 1410, for an electronic device having a one-time-programmable (OTP) memory and non-volatile memory, method 1400 may use information stored in the OTP memory to authenticate code associated with an implicit owner of the electronic device. At block 1415, method 1400 may receive, from the authenticated code associated with the implicit owner of the electronic device, a first create owner container request. At block 1420, method 1400 may, in response to the first create owner container request, create a first owner container, the first owner container comprising a first signed data image associated with the first owner of the electronic device. At block 1425, method 1400 may store the first owner container in the non-volatile memory. At block 1430, method 1400 may use the first signed data image associated with the first owner of the electronic device to authenticate first executable code associated with the first owner of the electronic device. In an example, method 1400 may use configuration information and secret information from the signed data image associated with the first owner of the electronic device to authenticate the first executable code associated with the first owner of the electronic device.

Although FIG. 14 discloses a particular number of operations related to method 1400, method 1400 may be executed with greater or fewer operations than those depicted in FIG. 14. For example, method 1400 may additionally authenticate the first create owner container request using a public key. In another example, after block 1430, method 1400 may continue with additional operations illustrated in FIG. 15. In addition, although FIG. 14 discloses a certain order of operations to be taken with respect to method 1400, the operations comprising method 1400 may be completed in any suitable order.

FIG. 15 illustrates a flow chart of an example method 1500 for managing ownership of an electronic device, including secure transfer of ownership of the electronic device, over time. According to one example, method 1500 may begin at block 1510. Teachings of the present disclosure may be implemented in a variety of configurations of system 100. As such, the initialization point for method 1500 and the order of 1510-1555 comprising method 1500 may depend on the implementation chosen.

According to an example, blocks 1510-1530 (dotted outlines) may be the same as blocks 1410-1430 in FIG. 14. At block 1535, method 1500 may authenticate a signed transfer of ownership command using a key stored in the first owner container. At block 1540, method 1500 may, in response to successful authentication of the signed transfer of ownership command, create a second owner container for a second owner of the electronic device, the second owner container comprising a second signed data image associated with the second owner of the electronic device. At block 1545, method 1500 may store the second owner container in the non-volatile memory. At block 1550, method 1500 may revoke the first owner container. According to an example, revoking the first owner container comprises programming a bit in the OTP memory corresponding to the second owner container. At block 1555, method 1500 may use the second signed data image associated with the second owner of the electronic device to authenticate second executable code associated with the second owner of the electronic device.

Although FIG. 15 discloses a particular number of operations related to method 1500, method 1500 may be executed with greater or fewer operations than those depicted in FIG. 15. In addition, although FIG. 15 discloses a certain order of operations to be taken with respect to method 1500, the operations comprising method 1500 may be completed in any suitable order.

Methods 1000, 1400, and 1500 may be implemented using system 100 or any other system operable to implement methods 1000, 1400, and 1500. Although examples have been described above, other variations and examples may be made from this disclosure without departing from the spirit and scope of these disclosed examples.

Physically Unclonable Function (PUF) SRAM

Some examples of the present disclosure may use the SRAM physically unclonable function (PUF) for generating and passing a device attestation key (DevAK) from boot code 130 to the first mutable code (FMC) without exposing the private key or SRAM PUF keying material. Unlike a device that uses OTP memory for DevAK keys, the SRAM PUF may allow the generation of unique device keys for a specific application without exposing the private key. In examples, keys derived from the SRAM PUF may not be stored in non-volatile memory on the chip (e.g., OTP memory 110, non-volatile memory 173, or other non-volatile memory) so that when the SRAM is not powered there are no keys present on the chip. For example, the SRAM PUF may be used to generate a device identity key (DevIK) so that there is no need to store the DevIK key in OTP memory 110 (e.g., DevIK may not be stored in secret device-unique information 207 (FIG. 2)). In the same or different example when the SRAM is powered the SRAM memory may be "secret" so that it is not directly accessible by FMC (e.g., the result of read-write locking, as described in the next paragraph below).

Figure 16:
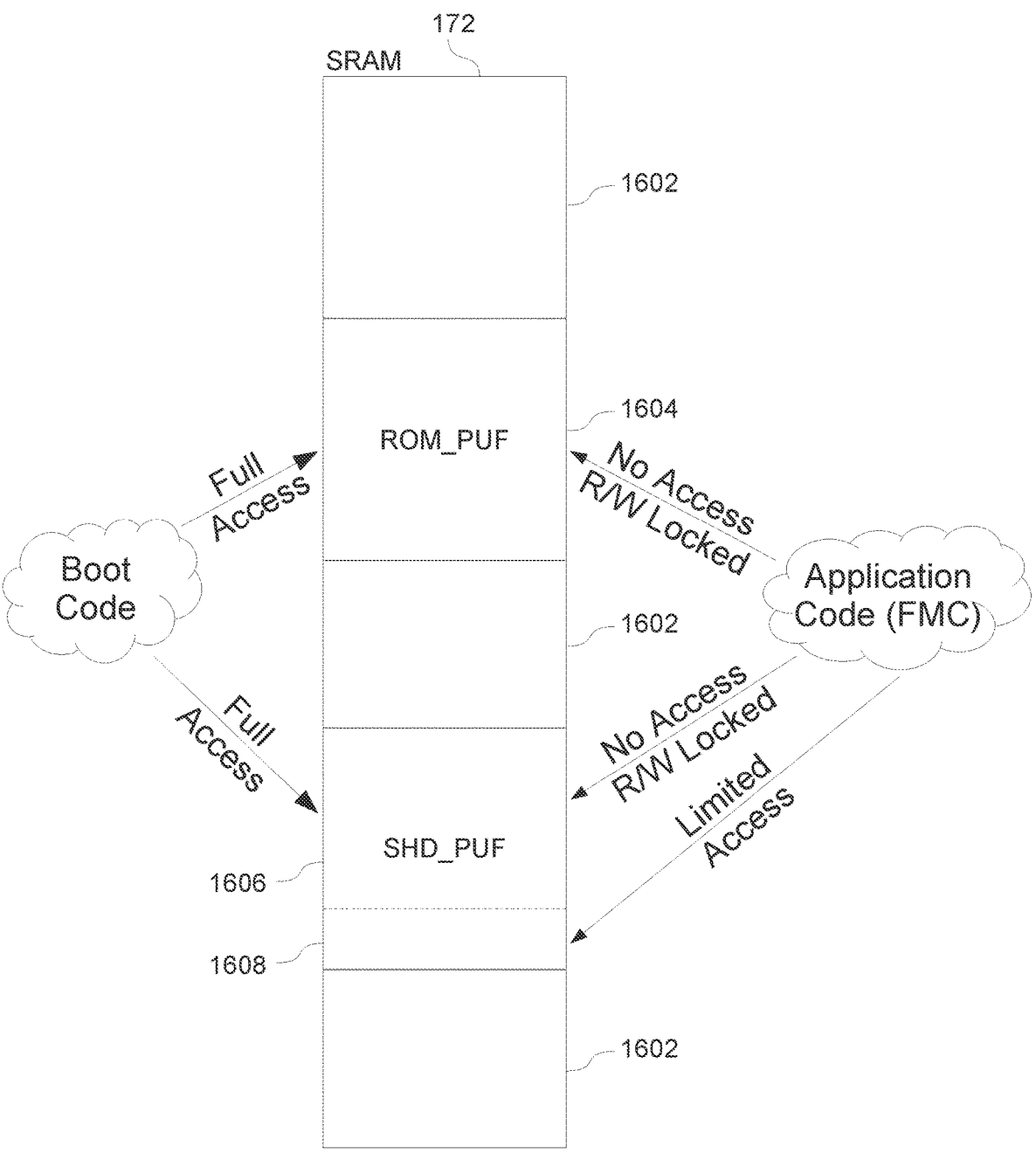
FIG. 16 illustrates an example volatile SRAM memory with physically unclonable function (PUF) regions that may be used for cryptographic key management.

FIG. 16 shows an example volatile memory 172, e.g., an SRAM that may include (a) general SRAM regions 1602, (b) ROM_PUF region 1604 and (c) shared PUF region 1606/1608 (SHD_PUF). SHD_PUF region 1606/1608 may be shared by both boot code 130 and application code, e.g., for cryptographic key management. SHD_PUF region 1606 may be used as the PUF silicon fingerprint and SHD_PUF region 1608 may be PUF state information. In an example, SRAM 172 may be read-write lockable such that, when locked, regions of SRAM 172 may be accessed by boot code 140 and, at the same time, may not be accessed by application code (e.g., controller firmware or FMC). In an example, boot code 140 may have full access to ROM_PUF region 1604 while application code (e.g., controller firmware) may not have access to ROM_PUF region 1604 because that region is read-write locked. In the same or different examples, boot code 140 may have full access to SHD_PUF region 1606/1608. Application code (e.g., controller firmware) may have limited access to SHD_PUF region 1606/1608. For example, application code (e.g., FMC) may have access to portion 1608 of SHD_PUF region 1606/1608 but may not have access to portion 1606 of SHD_PUF region 1606/1608 because that portion is read-write locked. In an example, portion 1608 of SHD_PUF region 1606/1608 may be accessed by application code (FMC) and may include some SRAM PUF state data (e.g., that may be used by PUF application programming interface (API)), but not information from which the device secrets may be derived. In contrast, portion 1606 of SHD_PUF region 1606/1608 (not accessible by application code) may include SRAM PUF keying material (e.g., the electronic device's silicon fingerprint).

In some examples boot code 140 (e.g., immutable boot code or authenticated mutable boot code) may include SRAM PUF functions to support, for example, anti-aging, error correction, randomness extraction, privacy amplification, and security countermeasure techniques, among others. The SRAM PUF functions may be built into the SRAM PUF API. In some examples, one or more of the SRAM PUF functions (e.g., error correction and privacy amplification) may be used to generate a uniformly random key based on the silicon fingerprint of the SRAM PUF. In an example, this process of using the SRAM PUF functions to generate a uniformly random key may be referred to as "enrolling" the SRAM PUF. In some examples, the SRAM PUF may be enrolled on a first power cycle. This may result in the generation of PUF activation code 621 (FIG. 6) that may be stored in container content 311b of owner container 302 (FIG. 3). In an example, the SRAM PUF enrollment may be based on the current silicon owner (e.g., based on owner ID 502, owner RPMC 503, or other value unique to the current owner) such that the uniformly random key is unique to the current silicon owner. The SRAM PUF functions may subsequently use PUF activation code 621 to regenerate the same random key that was generated during enrollment (e.g., following a second power cycle). While PUF activation code 621 may not be secret, its integrity may be maintained (e.g., as an OTP emulated parameter, as described for FIG. 6).

Figure 17:
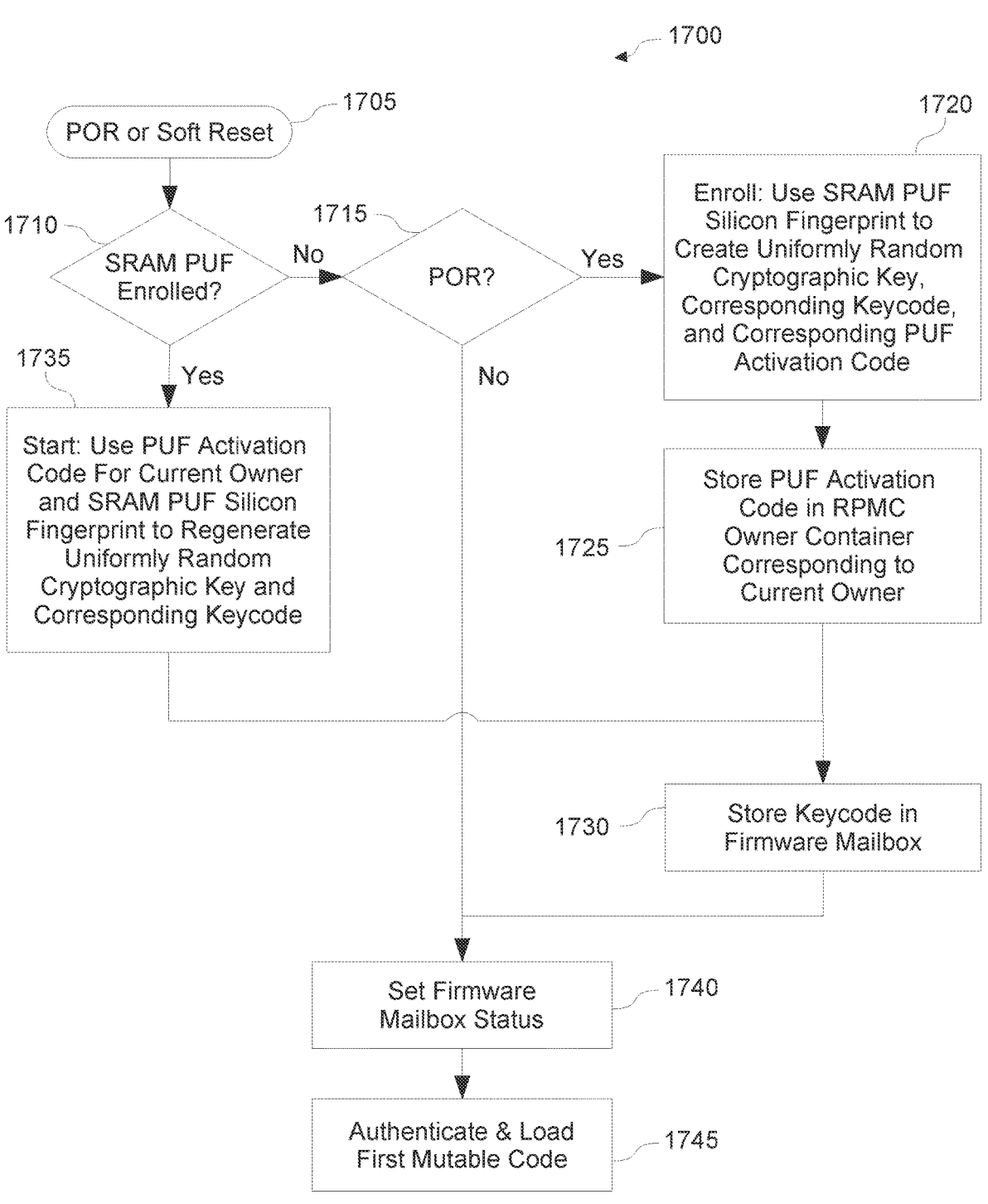
FIG. 17 illustrates a flow chart of an example method for SRAM PUF enrollment and subsequent key reconstruction.

FIG. 17 illustrates a flow chart of an example method 1700 for SRAM PUF enrollment and subsequent key reconstruction. According to one example, method 1700 may begin at block 1705. In an example, method 1700 may be performed by boot code 140. For simplicity, we may use the term boot code 140 as performing functions, which is meant to be understood as boot code 140 is read by processor 160 and causes processor 160 to perform the relevant functions. In some examples, starting block 1705 may represent a time when electronic device 101 is first powered up (i.e. power on reset (POR)) or a time following a reset of the electronic device (e.g., a device reset, a reboot, or a power cycle). Thus method 1700 may be performed by boot code 140 at a time when volatile memory 172 (e.g., SRAM with ROM_PUF and SHD_PUF regions) may not be accessed by the FMC (e.g., because FMC has not yet been authenticated and loaded). Teachings of the present disclosure may be implemented in a variety of configurations of system 100. As such, the initialization point for method 1700 and the order of 1705-1745 comprising method 1700 may depend on the implementation chosen.

Following a POR or soft reset, boot code 140 may proceed to block 1710 where it determines whether the SRAM PUF has been enrolled. In an example, boot code 140 may determine SRAM PUF has not been enrolled based on a determination this is the first power cycle or reset cycle after a change of ownership of electronic device 101 (e.g., a change ownership status bit may be set or PUF activation code 621 in owner container content 311b may not be set (e.g., is all zeros), or some other indication). If the SRAM PUF has not been enrolled, boot code may proceed to block 1715, where it may determine if this is the first power cycle after a POR (power on reset). If so, boot code 140 may proceed to block 1720 and enroll the SRAM PUF. In an example, enrollment may include using the SRAM PUF unique silicon fingerprint to create (1) a uniformly random cryptographic key, (2) a keycode corresponding to the key, and (3) a PUF activation code corresponding to the current SRAM PUF cryptographic context. In an example, enrollment may be based on the current silicon owner (e.g., based on owner ID 502, owner RPMC 503, or other value unique to the current owner) such that the uniformly random key is unique to the current silicon owner. In an example, boot code 140 may perform these tasks using the SRAM PUF API (e.g., SRAM PUF functions) so that the private cryptographic key may not be extracted by other boot code or the FMC (e.g., the private key may only be known to the SRAM PUF API).

Boot code 140 may then proceed to block 1725 and may store the PUF activation code in the secure RPMC owner container 302 corresponding to the current owner of electronic device 101 (e.g., as PUF activation code 621). In an example, block 1725 may be considered part of the enrollment process.

In an example, the enrollment process may provide different owners of electronic device 101 with a respective unique PUF activation code 621. For example, the DevAK-priv key may be generated as a function of the current owner of electronic device 101. This, in turn, may provide different owners with a unique (and random) cryptographic context (e.g., unique DevAK key). In examples, the unique PUF activation code 621 may be generated as a function of the current owner by boot code on the first power cycle after a transfer of ownership of electronic device 101. In subsequent power cycles, the stored PUF activation code 621 may be used by the SRAM PUF API functions to regenerate/recreate the previous cryptographic context (e.g., to regenerate the same DevAK key). Accordingly, by providing different owners of electronic device 101 with different PUF activation codes, the enrollment process may provide different cryptographic contexts to each owner. Thus, a subsequent owner may not devise the previous owner's cryptographic context or discover the previous owner's secrets.

After boot code 140 stores the PUF activation code in the secure RPMC owner container in block 1725, boot code 140 may then proceed to block 1730 where it may store the keycode generated in block 1720 in firmware mailbox 786 (FIG. 7). Boot code 140 may then proceed to block 1740, where it may set firmware mailbox 786 status. In an example, this status may be information stored in firmware mailbox 786 such as register bits and may indicate whether other information in firmware mailbox 786 (e.g., DevAK keycode 1922 in FIG. 19) is valid. In an example following enrollment after a POR, boot code 140 may set the status indicating the keycode stored in block 1730 is valid. Boot code 140 may then proceed to block 1745 where it may authenticate and load the FMC (e.g., firmware) into SRAM (e.g., where it may be executed by processor 160). In an example, the FMC may thereafter execute in the cryptographic context established by the enrollment process and may access the keycode stored in firmware mailbox 786. Example uses of the keycode are described in relation to FIGS. 18-30 below.

If boot code 140 determines at block 1715 that this is not the first power cycle after a POR, boot code 140 may proceed to block 1740, where it may set firmware mailbox 786 status to indicate the keycode (e.g., DevAK keycode 1922 in FIG. 19) is not valid. Boot code 140 may then proceed to block 1745 where it may authenticate and load the FMC (e.g., firmware) into SRAM (e.g., where it may be executed by processor 160).

If boot code 140 determines at block 1710 that the SRAM PUF has been enrolled, boot code 140 may proceed to block 1735 where it may start a known cryptographic context by using PUF activation code 621 corresponding to the current owner of electronic device 101 and the SRAM PUF unique silicon fingerprint to regenerate (1) the uniformly random cryptographic key and (2) the keycode corresponding to the key. Boot code 140 may then proceed to block 1730 where it may store the keycode generated in block 1735 in firmware mailbox 786 (FIG. 7). Boot code 140 may proceed to block 1740, where it may set firmware mailbox 786 status to indicate the keycode (e.g., DevAK keycode 1922 in FIG. 19) is valid. Boot code 140 may proceed to block 1745 where it may authenticate and load the FMC (e.g., firmware) into SRAM (e.g., where it may be executed by processor 160). The FMC may then execute in the cryptographic context established by the boot code 140 (i.e., corresponding to PUF activation code 621—the same cryptographic context established by the enrollment process for the current owner of electronic device 101) and may access the keycode stored in firmware mailbox 786. Example uses of the keycode are described in relation to FIGS. 18-30 below.

Although FIG. 17 discloses a particular number of operations related to method 1700, method 1700 may be executed with greater or fewer operations than those depicted in FIG. 17. For example, after block 1725, boot code 140 may sign the secure RPMC owner container as discussed above in the description of container signature 312 (FIG. 3). Signing the owner container at this time may ensure the PUF activation code 621 may only be altered by boot code 140 so that its integrity may be maintained. As another example, prior to block 1745 boot code 140 may set the read-write lock on SRAM 172 (FIG. 16) so that application code (e.g., FMC) may have access to portion 1608 of SHD_PUF region 1606/1608 but may not have access to portion 1606 of SHD_PUF region 1606/1608. In some examples, boot code 140 may set the read-write lock on SHD_PUF region 1606 on all exit events so that no user code (e.g., FMC) may access the secret SRAM PUF keying material. In addition, although FIG. 17 discloses a certain order of operations to be taken with respect to method 1700, the operations comprising method 1700 may be completed in any suitable order.

Figure 18:
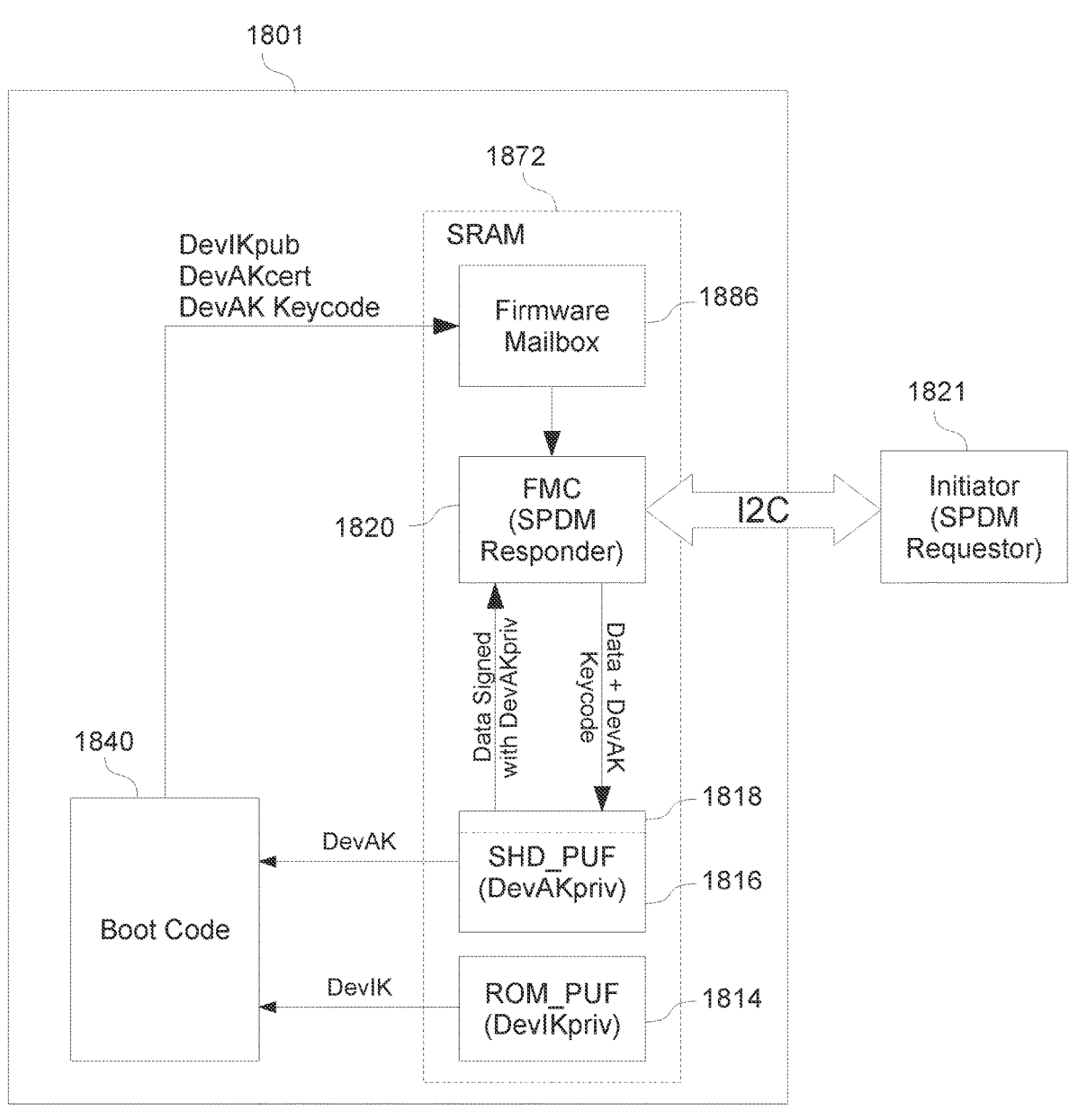
FIG. 18 illustrates an example electronic device that may respond to Secure Protocol Data Model (SPDM) commands.

FIG. 18 shows an example electronic device 1801 that may respond to Secure Protocol Data Model (SPDM) GET_ATTESTATION and GET_CERTIFICATE commands. SPDM is published by the Distributed Management Task Force. Some examples may comply with the SPDM Specification, which provides that "Runtime authentication is the process by which an authentication initiator, or Requester, interacts with a Responder in a running system. The authentication initiator can retrieve the certificate chains from the Responder and send a unique challenge to the Responder. The Responder uses the private key to sign the challenge. The authentication initiator verifies the signature by using the public key of the Responder, and any intermediate public keys within the certificate chain by using the root certificate as the trusted anchor."

Example electronic device 1801 may include boot code 1840 (e.g., immutable boot code or authenticated mutable code) and SRAM 1872. SRAM 1872 may include firmware mailbox 1886 (may be an instance of firmware mailbox 786 (FIG. 7)), and FMC 1820 (which may act as SPDM responder). SRAM 1872 may also include SHD_PUF region 1816/1818 and ROM_PUF region 1814, which may be instances of, respectively, SHD_PUF region 1606/1608 and ROM_PUF region 1604 (FIG. 16) (e.g., may be read-write lockable and FMC 1820 may have access to SHD_PUF region 1818, but not SHD_PUF region 1816 or ROM_PUF region 1814). Initiator 1821 may be external to electronic device 1801 and may act as an SPDM requester. In an example, initiator 1821 may communicate with electronic device 1801 via an I2C communication interface.

In an example, boot code 1840 may enroll the SHD_PUF to serve as the keying material for the DevAK key and may enroll the ROM_PUF to serve as the keying material for the DevIK key. In an example, boot code may perform these tasks using the SRAM PUF API (e.g., SRAM PUF functions) so that the private cryptographic keys (DevAKpriv and DevIKpriv) may not be extracted by other boot code or the FMC (e.g., the private key may only be known to the SRAM PUF API). After enrolling the SHD_PUF and ROM_PUF, boot code 1840, acting as the Root of Trust (RoT), may store the DevIKpub (public) key, the DevAK certificate containing the DevAKpub (public) key, and the DevAK keycode in firmware mailbox 1886. Boot code 1840 may obtain the DevAKpub and DevAK keycodes from SHD_PUF (via SRAM PUF API call(s)) and DevIKpub from ROM_PUF (via SRAM PUF API call(s)). (Further details on generation of the DevAK certificate are provided in FIG. 19 and associated description below.) In an example, FMC may access the information stored in firmware mailbox 1886, e.g., the DevAK keycode.

In an example, initiator 1821 may send an SPDM GET_ATTESTATION challenge to FMC 1820 via the I2C interface. To respond, FMC 1820 may need to return the challenge signed with the DevAKpriv key. However, the DevAKpriv key may be kept as a secret in SHD_PUF and may not be directly accessible by FMC 1820. In the illustrated example, FMC 1820 may provide the data to be signed and the DevAK keycode to SHD_PUF 1816/1818 (e.g., via SRAM PUF API call(s)) and, in return, receive the data signed with the DevAKpriv key. The SRAM PUF API may use the DevAK keycode to derive the DevAKpriv key. Thus, FMC 1820 may sign the GET_ATTESTATION challenge with the DevAKpriv key derived using SHD_PUF 1816/1818 and the DevAK keycode even though the DevAKpriv key is not exposed (or directly accessible) to FMC 1820. FMC 1820 may then send the signed challenge to initiator 1821.

In another example, initiator 1821 may send an SPDM GET_CERTIFICATE request to FMC 1820 via the I2C interface. In some examples, FMC 1820 may respond by sending a device X.509 certificate which may be the device attestation certificate (DevAKcert). In other examples, FMC 1820 may respond by sending a device X.509 certificate chain, which may include the device identity certificate (DevIKcert) and the device attestation certificate (DevAKcert).

FIG. 19 shows an example electronic device 1901 according to the present disclosure. Electronic device 1901 may include boot code 1904, firmware mailbox 1986, PUF engine 1955, ROM_PUF 1985, SHD_PUF 1999, and FMC 1920. Boot code 1940 may be immutable boot code stored in ROM 130 (FIG. 1) or authenticated mutable code, e.g., stored in non-volatile memory 173 (FIG. 1). PUF engine 1955 may comprise code that causes a processor to perform functions including, without limitation the SRAM PUF API functions. In an example, PUF engine 1955 code may be immutable code stored in ROM 130 (FIG. 1). Firmware mailbox 1986 may be a region in command memory 171 (FIG. 7), which may be volatile SRAM. ROM_PUF 1985 and SHD_PUF 1999 may be read-write lockable regions in non-volatile SRAM 172 (FIG. 16). FMC 1920 may be authenticated mutable code such as firmware or application code that may act as SPDM responder (e.g., similar to FMC 1820 in FIG. 18).

As depicted, ROM_PUF 1985 and SHD_PUF 1999 regions may be directly accessible by PUF Engine 1955 (SRAM PUF APIs) but not directly accessible by FMC 1920. For example, FMC 1920 may not read or write to the keying material portion of SHD_PUF 1999 region because it may read-write locked. However, F M C 1920 may call SRAM PUF API functions of PUF engine 1955, and those functions may access the SHD_PUF secrets, e.g., to sign data provided by FMC 1920 with the DevAKpriv key. In an example, the PUF engine and SRAM PUF API may be designed so as not to expose the SHD_PUF (or ROM_PUF) secrets to FMC 1920 or, in some examples, to boot code 1940. For example, SRAM PUF API functions may not allow FMC 1920 to read any of the secrets and may not return them to FMC 1920 as a result of function calls.

Remote host 1933 may be external to electronic device 1901 and may act as a SPDM requester. In an example, remote host 1901 may communicate with electronic device 1901 via a communication interface (e.g., I2C).

Electronic device 1901 may support actions including but not limited to those indicated with numbered arrows 1-18.

Action 1 may represent the boot code 1940 requesting initialization of the SRAM PUF (e.g., ROM_PUF, SHD_PUF). In an example, the initialization request may be a request to enroll the SRAM PUF following a determination the SRAM PUF is not enrolled following a change of ownership (block 1710 in FIG. 17) and start the new cryptographic context associated with the new owner. In another example, the initialization request may be a request to start a known cryptographic context for the current owner of the electronic device (block 1725 in FIG. 17). For example the known cryptographic context may be based on the current owner's PUF activation code 621 (the activation code may be passed to PUF engine 1955 as part of the function call). In examples, the initialization request may be directed to ROM_PUF 1985. In other examples, the initialization request may be directed to SHD_PUF 1999.

Action 2 may represent the boot code 1940 requesting generation (or regeneration) of the DevAKpriv key based on the current cryptographic context. The request may result in PUF engine 1955 using the secret keying information in SHD_PUF 1999 to create the DevAKpriv key based on the current cryptographic context (e.g., a context started by a previous SRAM PUF initialization request). In an example, PUF engine 1955 may return a DevAK keycode corresponding to the DevAKpriv key. In another example, action 2 may represent the boot code 1940 requesting generation (or regeneration) of the DevIKpriv key based on the current cryptographic context. The request may result in PUF engine 1955 using the secret keying information in ROM_PUF 1985 to create the DevIKpriv key based on the current cryptographic context (e.g., a context started by a previous SRAM PUF initialization request). In an example, PUF engine 1955 may return a DevIK keycode corresponding to the DevIKpriv key.

Action 3 may represent the boot code 1940 requesting the DevAKpub key or the DevIKpub key. Because the public key of the key pair is not a secret, the PUF engine 1955 may expose the public key to boot code 1940 (e.g., return the public key to the boot code 1940 so boot code 1940 may use the key). In an example, boot code 1940 provides PUF Engine 1955 with the keycode corresponding to the public key it is requesting (e.g., DevAK keycode or DevIK keycode).

Action 4 may represent the boot code 1940 requesting the DevAKpriv keycode or the DevIKpriv keycode. This keycode may be used in subsequent signing requests to PUF engine 1955 (e.g., FMC requesting signing of a SPDM attestation challenge with DevAKpriv as described for FIG. 18).

Action 5 may represent the boot code 1940 requesting signing of data with either the DevIKpriv key or the DevAKpriv key. In an example, the boot code may send the data to be signed and the corresponding keycode to PUF Engine 1955. PUF engine 1955 may return the data signed with the appropriate key.

Action 6 may represent the boot code 1940 generating certificate DevAK cert 1976. In examples, DevAK cert 1976 may include the DevAKpub key as its subject (e.g., obtained from PUF engine 1955 in Action 3). DevAK cert 1976 may be signed with DevIKpriv (e.g., boot code 1940 may send unsigned certificate data along with DevIK keycode to PUF engine 1955 for signing in action 5).

Action 7 may represent the boot code 1940 storing signed DevAK cert 1976 in firmware mailbox 1986, thereby providing it to FMC 1920.

Action 8 may represent the boot code 1940 storing the DevAK keycode 1922 in firmware mailbox 1986, thereby providing it to FMC 1920. (Boot code may get the DevAK keycode 1922 from PUF engine 1955 in action 4.)

Action 9 may represent the boot code 1940 storing signed DevIKpub 1924 in firmware mailbox 1986, thereby providing it to FMC 1920. (Boot code 1940 may get the DevIKpub key from PUF engine 1955 in action 3.)

Action 10 may represent FMC 1920 reading the signed DevAK cert 1976 from firmware mailbox 1986.

Action 11 may represent FMC 1920 reading the DevAK keycode 1922 from firmware mailbox 1986.

Action 12 may represent FMC 1920 reading the DevIKpub 1924 from firmware mailbox 1986.

Action 13 may represent FMC 1920 requesting the DevAKpub key from PUF Engine 1955. In an example, FMC 1920 may send the DevAK keycode 1922 (e.g., after obtaining it from firmware mailbox 1986) to PUF Engine 1955. PUF engine 1955 may return the DevAKpub key.

Action 14 may represent FMC 1920 requesting signing of data with the DevAKpriv key. In an example, FMC 1920 may send the data to be signed along with the DevAK keycode 1922 (e.g., after obtaining it from firmware mailbox 1986) to PUF Engine 1955. PUF engine 1955 may return the data signed with the DevAKpriv key.

Action 15 may represent remote host 1933 issuing an SPDM request (e.g., GET_ATTESTATION, GET_CERTIFICATE) to FMC 1920 (as illustrated/described in FIG. 18).

Action 16 may represent FMC 1920 returning a signed SPDM challenge to remote host 1933, e.g., in response to a GET_ATTESTATION request (as illustrated/described in FIG. 18).

Action 17 may represent FMC 1920 returning a certificate to remote host 1933, e.g., in response to a GET_CERTIFICATE request.

Although FIG. 19 discloses a particular number of Actions (1-17) related to electronic device 1901, electronic device 1901 may be capable of performing greater or fewer actions than those depicted in FIG. 19. For example, boot code 1940 or FMC 1920 may request PUF Engine 1955 stop the current cryptographic context (e.g., a stop( ) request), which may result in the SRAM PUF secrets being destroyed or erased and returning the SRAM PUF to its uninitialized state. As another example, boot code 1940 may request setting the read-write lock on SRAM PUF regions so that no user code (e.g., FMC 1920) may access the secret SRAM PUF keying material. As still another example, FMC 1920 may request generation of other keys (e.g., not DevAK or DevIK) using the SHD_PUF. In examples, PUF engine 1955 may return a keycode for the newly generated key, and FMC 1920 may use the keycode to request PUF engine 1955 sign data with the newly generated key, generate and send a public key corresponding to the newly generated key, and so forth. Accordingly, the private key may not be exposed to FMC 1920, but it may still use the private key for signing data. In addition, although FIG. 19 discloses actions 1-17, those actions may be completed in any suitable order.

Figure 20:
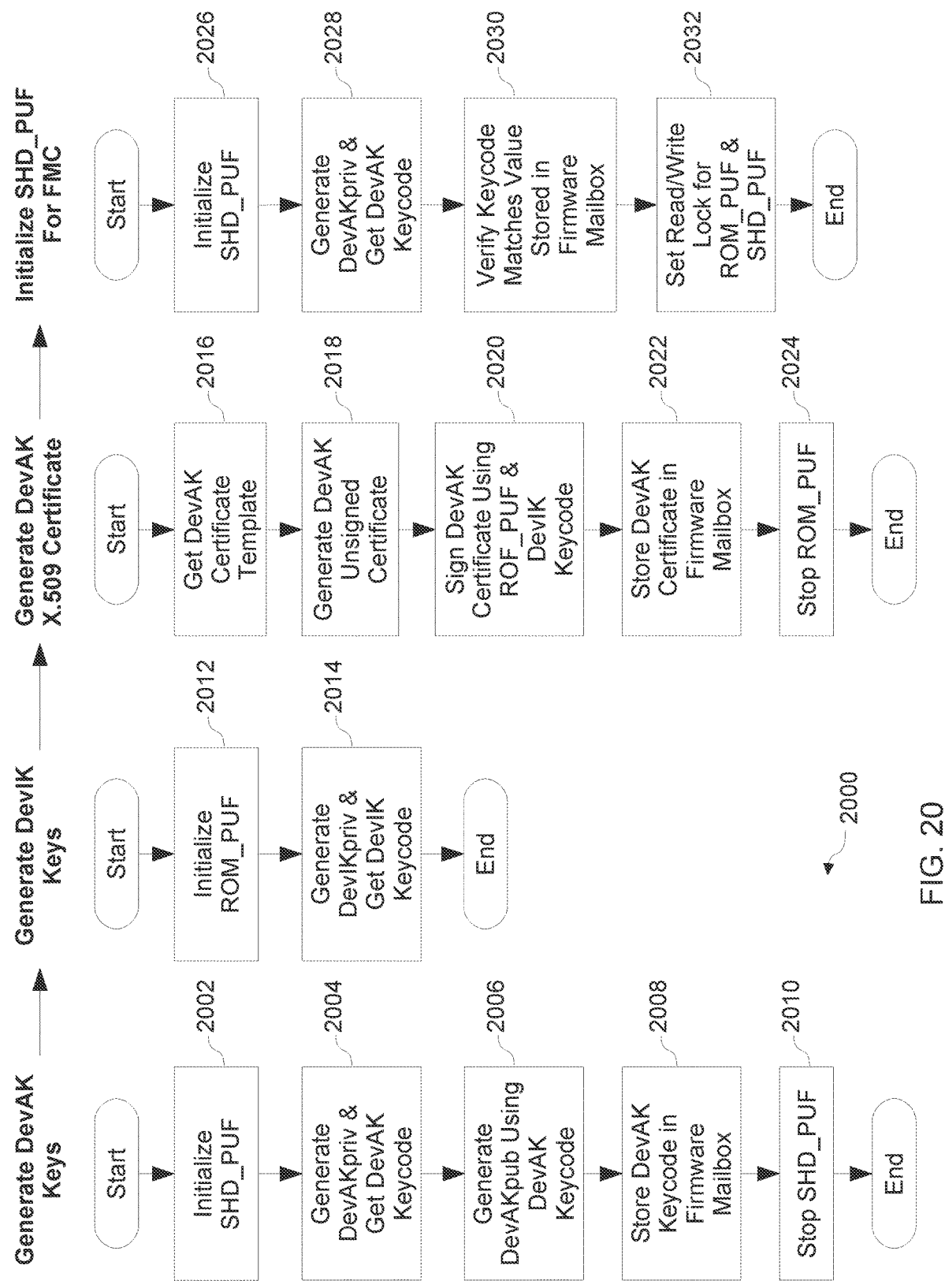
FIG. 20 illustrates an example boot code method for DevAK key and certificate generation.

FIG. 20 shows an example boot code method 2000 for DevAK key and certificate generation. According to one example, method 2000 may begin at block 2002. In an example, method 2000 may be performed by boot code 140, 1840, or 1940. In some examples, starting block 2002 may represent a time when electronic device 101 is first powered up (POR) or a time following a reset of the electronic device (e.g., a device reset, a reboot, or a power cycle). Thus method 2000 may be performed by boot code 140 at a time when volatile memory 172 (e.g., SRAM with ROM_PUF and SHD_PUF regions) may not be accessed by the FMC (e.g., because the FMC has not yet been authenticated and loaded). Teachings of the present disclosure may be implemented in a variety of configurations of system 100. As such, the initialization point for method 2000 and the order of 2002-2032 comprising method 2000 may depend on the implementation chosen.

In an example, method 2000 may begin by generating the DevAK keys. Starting at block 2002, boot code 140 may initialize the SHD_PUF (e.g., 1606/1608 in FIG. 16). In an example, this may comprise boot code 140 enrolling the SHD_PUF for the first time following a transfer of ownership of the electronic device. In another example, this may comprise providing the current owner's PUF activation code to the PUF engine to reestablish a previous cryptographic context for the current owner. The method may then proceed to block 2004 where boot code 140 may request generation of the DevAKpriv key and get the DevAK keycode (e.g., action 2 in FIG. 19). The method may then proceed to block 2006 where boot code 140 may request generation of the DevAKpub key using the DevAK keycode (e.g., action 3 in FIG. 19). The method may then proceed to block 2008 where boot code 140 may store the DevAK keycode in firmware mailbox 1986 (e.g., action 8 in FIG. 19). The method may then proceed to block 2010 where boot code 140 may request stopping the current SHD_PUF cryptographic context (e.g., a stop( ) request), which may result in the SHD_PUF secrets being destroyed or erased and returning the SHD_PUF to its uninitialized state.

In an example, method 2000 may proceed by generating the DevIK keys. Starting at block 2012, boot code 140 may initialize the ROM_PUF (e.g., 1604 in FIG. 16). In an example, this may comprise boot code 140 enrolling the ROM_PUF for the first time or, in another example, reestablishing a previous cryptographic context. In an example, the ROM_PUF cryptographic context may be the same for different owners of the electronic device. In another example, the ROM_PUF cryptographic context (like the SHD_PUF cryptographic context) may be unique for each owner of the electronic device. Thus, initializing the ROM_PUF in block 2012 may or may not comprise providing the current owner's PUF activation code to the PUF engine to reestablish a previous cryptographic context for the current owner. The method may then proceed to block 2014 where boot code 140 may request generation of the DevIKpriv key and get the DevIK keycode (e.g., action 2 in FIG. 19).

In an example, method 2000 may proceed by generating a DevAK certificate. Starting at block 2016, boot code 140 may get a DevAK certificate template which may be stored in OTP memory 110, non-volatile memory 173, boot ROM 130, or any other suitable location. (Boot code 140 may authenticate the DevAK certificate template prior to using it (not illustrated).) In an example, the DevAK certificate may be an X.509 CA or END certificate in ANSI.1 DER format. In other examples, the DevAK certificate may be generated in other certificate formats. The method may then proceed to block 2018 where boot code 140 may generate a DevAK unsigned certificate, for example, by storing the DevAKpub key (e.g., generated in block 2006) as the certificate subject. The method may then proceed to block 2020 where boot code 140 may request signing the DevAK certificate with the DevIKpriv key. In an example, boot code 140 sends the request to sign the DevAK certificate with the DevIKpriv key to the PUF engine (e.g., action 5 in FIG. 19) by providing the PUF engine with the DevAK unsigned certificate data and the DevIK keycode (e.g., generated in block 2014). The method may then proceed to block 2022 where boot code 140 may store the DevAK certificate in firmware mailbox 1986 (e.g., action 7 in FIG. 19). The method may then proceed to block 2024 where boot code 140 may request stopping the current ROM_PUF cryptographic context (e.g., a stop( ) request), which may result in the ROM_PUF secrets being destroyed or erased and returning the ROM_PUF to its uninitialized state.

In an example, method 2000 may proceed by initializing the SHD_PUF for use by the FMC. Starting at block 2026, boot code 140 may initialize the SHD_PUF as described for block 2002. The method may then proceed to block 2028 where boot code 140 may request generation of the DevAK-priv key and get the DevAK keycode (e.g., action 2 in FIG. 19). The method may then proceed to block 2030 where boot code 140 may verify the generated DevAK keycode matches the DevAK keycode 1922 previously stored in firmware mailbox 1986 (e.g., at block 2008). In this example, the verification at block 2030 may confirm the FMC and the boot code 140 are using the same cryptographic context and, thus, the same DevAK key pair. The method may then proceed to block 2032 where boot code 140 may request setting the read/write lock for ROM_PUF and SHD_PUF. In an example, the read/write lock may be set on ROM_PUF so that the FMC does not have access. In the same or different example, the read/write lock may be set on SHD_PUF so that the FMC does not have access to SHD_PUF keying material region (e.g., 1606 in FIG. 16) but does have access to SHD_PUF state region (e.g., 1608 in FIG. 16) which may allow the FMC to use the DevAK keycode and PUF APIs to sign SPDM challenges and access other allowed PUF functions (e.g., use the DevAK keycode to get the DevAKpub key, create and other cryptographic key pairs, among others).

Although FIG. 20 discloses a particular number of operations related to method 2000, method 2000 may be executed with greater or fewer operations than those depicted in FIG. 20. For example, after block 2008, boot code may not request stopping the SHD_PUF. Similarly, after block 2022, boot code may not request stopping the ROM_PUF. In these examples, stopping the SRAM PUFs on a boot code exit event may be a good practice to avoid FMC access to device secrets. However, stopping the SRAM PUFs may be avoided if, for example, boot code executes blocks 2002-2032 of method 2000 without exiting or before loading the FMC. In an example, if block 2010 is omitted, block 2026 (initializing the SHD_PUF) may also be omitted because the SHD_PUF was not stopped. In addition, although FIG. 20 discloses a certain order of operations to be taken with respect to method 2000, the operations comprising method 2000 may be completed in any suitable order. For example, boot code may generate the DevIK keys (blocks 2012-2014) prior to generating the DevAK keys (blocks 2002-2010).

FIG. 21 illustrates a flow chart of an example method 2100 for using an SRAM PUF shared by multiple entities for managing device keys. According to one example, method 2100 may begin at block 2110. Teachings of the present disclosure may be implemented in a variety of configurations of system 100. As such, the initialization point for method 2100 and the order of 2110-2135 comprising method 2100 may depend on the implementation chosen.

At block 2110, for an electronic device having a processor, a non-volatile memory, and an SRAM including an SRAM physically unclonable function (SRAM PUF) region, the processor may store a first owner information and a first owner mutable code in the non-volatile memory. In an example, the SRAM PUF region may comprise a secret unclonable silicon fingerprint unique to the electronic device. In the same or different example, the first owner information may be stored in non-volatile memory so that it may emulate a one-time-programmable memory (e.g., as an OTP emulated parameter, as described for FIG. 6) and may be unique to a first owner of the electronic device. At block 2115, the processor may generate a first unique private key based on both the first owner information and at least a portion of the SRAM PUF region, wherein the first unique private key may not be directly accessible by the first owner mutable code (e.g., PUF engine 1955 may not expose the first unique private key to first owner mutable code while still allowing first owner mutable code to sign data with the first unique private key). At block 2120, the processor may generate a first unique private keycode corresponding to the first unique private key. At block 2125, the processor may provide the first owner mutable code with the first unique private keycode. (The keycode may act as a reference or handle to the corresponding key such that when the keycode is passed to PUF engine 1955, PUF engine 1955 may use the keycode to determine the corresponding key. In this way, the key may not be exposed outside of PUF engine 1955 and its secrecy may be maintained.) At block 2130, the processor may receive a signing request from the first owner mutable code, the signing request including the first unique private keycode and a first data. In an example, the first data may comprise a device attestation challenge. At block 2130, in response to the signing request from the first owner mutable code, the processor may sign the first data with the first unique private key and provide the first owner mutable code with the first data signed with the first unique private key.

Although FIG. 21 discloses a particular number of operations related to method 2100, method 2100 may be executed with greater or fewer operations than those depicted in FIG. 21. For example, after block 2135, method 2100 may continue with additional operations illustrated in FIGS. 22-29. In addition, although FIG. 21 discloses a certain order of operations to be taken with respect to method 2100, the operations comprising method 2100 may be completed in any suitable order.

Figure 22:
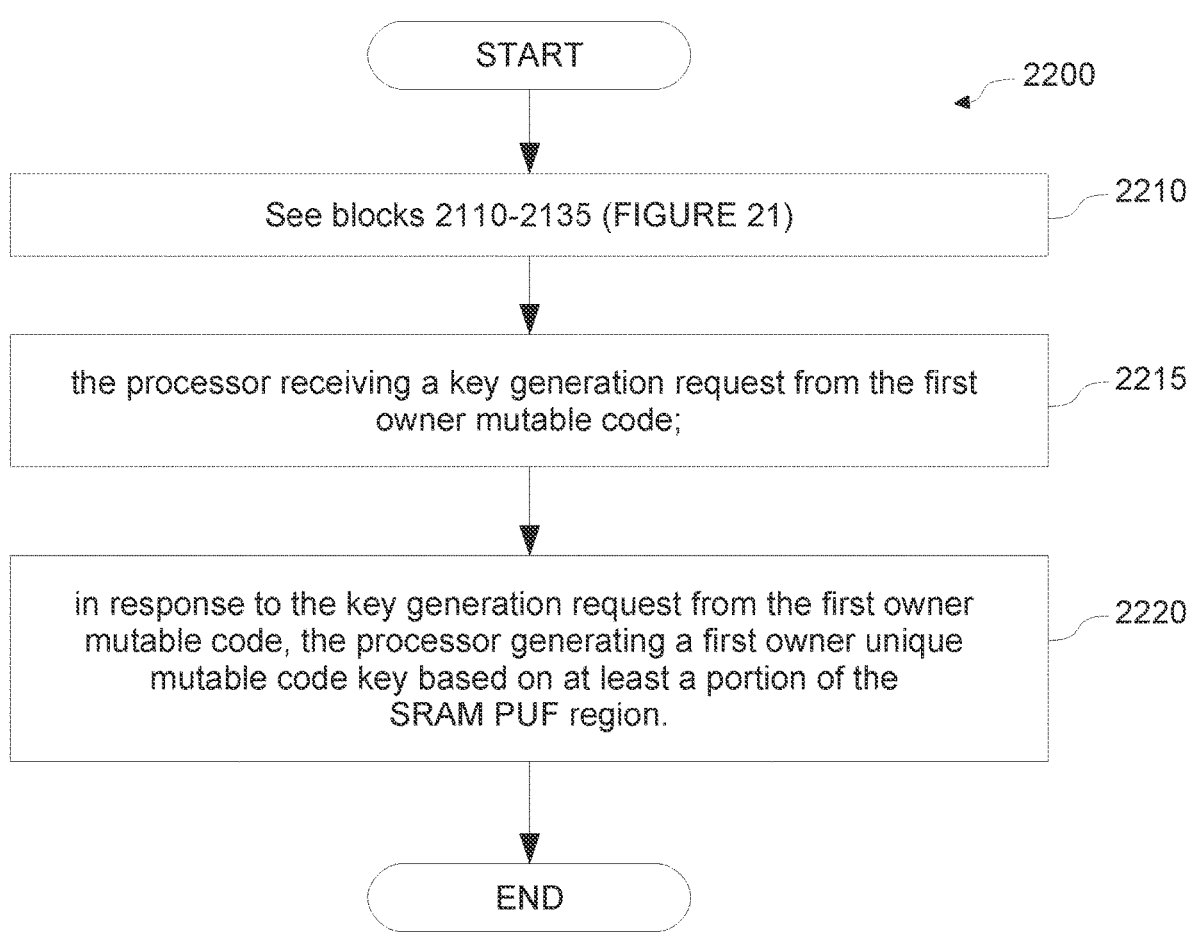

FIG. 22 illustrates a flow chart of an example method 2200 for using an SRAM PUF shared by multiple entities for managing device keys. According to one example, method 2200 may begin at block 2210. Teachings of the present disclosure may be implemented in a variety of configurations of system 100. As such, the initialization point for method 2200 and the order of 2210-2220 comprising method 2200 may depend on the implementation chosen.

According to an example, block 2210 may be the same as blocks 2110-2135 in FIG. 21. At block 2215, the processor may receive a key generation request from the first owner mutable code. At block 2220, in response to the key generation request from the first owner mutable code, the processor may generate a first owner unique mutable code key based on at least a portion of the SRAM PUF region. In an example, the generated first owner unique mutable code key may be based on keying material in SHD_PUF region 1606 (FIG. 16) and may be different than the DevAK key (e.g., for use other than responding to device attestation challenges).

Although FIG. 22 discloses a particular number of operations related to method 2200, method 2200 may be executed with greater or fewer operations than those depicted in FIG. 22. In addition, although FIG. 22 discloses a certain order of operations to be taken with respect to method 2200, the operations comprising method 2200 may be completed in any suitable order.

FIG. 23 illustrates a flow chart of an example method 2300 for using an SRAM PUF shared by multiple entities for managing device keys. According to one example, method 2300 may begin at block 2310. Teachings of the present disclosure may be implemented in a variety of configurations of system 100. As such, the initialization point for method 2300 and the order of 2310-2335 comprising method 2300 may depend on the implementation chosen.

According to an example, block 2310 may be the same as blocks 2110-2135 in FIG. 21. At block 2315, the processor may transfer ownership of the electronic device to a second owner including storing a second owner information and a second owner mutable code in the non-volatile memory, wherein the second owner information may be unique to the second owner of the electronic device. In an example, the ownership transfer may proceed as illustrated and described in any of FIGS. 8-15. At block 2320, the processor may generate a second unique private key based on both the second owner information and at least a portion of the SRAM PUF region, wherein the second unique private key may not be directly accessible by the second owner mutable code (e.g., PUF engine 1955 may not expose the key to second owner mutable code while still allowing second owner mutable code to sign data with the key). At block 2325, the processor may generate a second unique private keycode corresponding to the second unique private key. At block 2330, the processor may provide the second owner mutable code with the second unique private keycode. At block 2335, the processor may prohibit access to, or regeneration of, the first unique private key while the second owner owns the electronic device. In an example, access may be prohibited because (1) the first unique private key has been erased or destroyed (e.g., by a stop( ) request or by a reset of electronic device 101) and boot code 140 may limit the cryptographic context to that of the current user, e.g., by using the current owner's PUF activation code, which may be authenticated before use. Accordingly, the system may not allow use of a previous owner's PUF activation code, thus prohibiting access to, or regeneration of, the first unique private key.

Although FIG. 23 discloses a particular number of operations related to method 2300, method 2300 may be executed with greater or fewer operations than those depicted in FIG. 23. For example, after block 2335, method 2300 may continue with additional operations illustrated in FIGS. 24-25. In addition, although FIG. 23 discloses a certain order of operations to be taken with respect to method 2300, the operations comprising method 2300 may be completed in any suitable order.

FIG. 24 illustrates a flow chart of an example method 2400 for using an SRAM PUF shared by multiple entities for managing device keys. According to one example, method 2400 may begin at block 2410. Teachings of the present disclosure may be implemented in a variety of configurations of system 100. As such, the initialization point for method 2400 and the order of 2410-2420 comprising method 2400 may depend on the implementation chosen.

According to an example, block 2410 may be the same as blocks 2310-2335 in FIG. 23. At block 2415, the processor may receive a second owner signing request from the second owner mutable code, the second owner signing request including the second unique private keycode and a second data (e.g., an attestation challenge). At block 2420, in response to the second owner signing request from the second owner mutable code, the processor may sign the second data with the second unique private key and provide the second owner mutable code with the second data signed with the second unique private key.

Although FIG. 24 discloses a particular number of operations related to method 2400, method 2400 may be executed with greater or fewer operations than those depicted in FIG. 24. For example, after block 2420, method 2400 may continue with additional operations illustrated in FIG. 25. In addition, although FIG. 24 discloses a certain order of operations to be taken with respect to method 2400, the operations comprising method 2400 may be completed in any suitable order.

Figure 25:
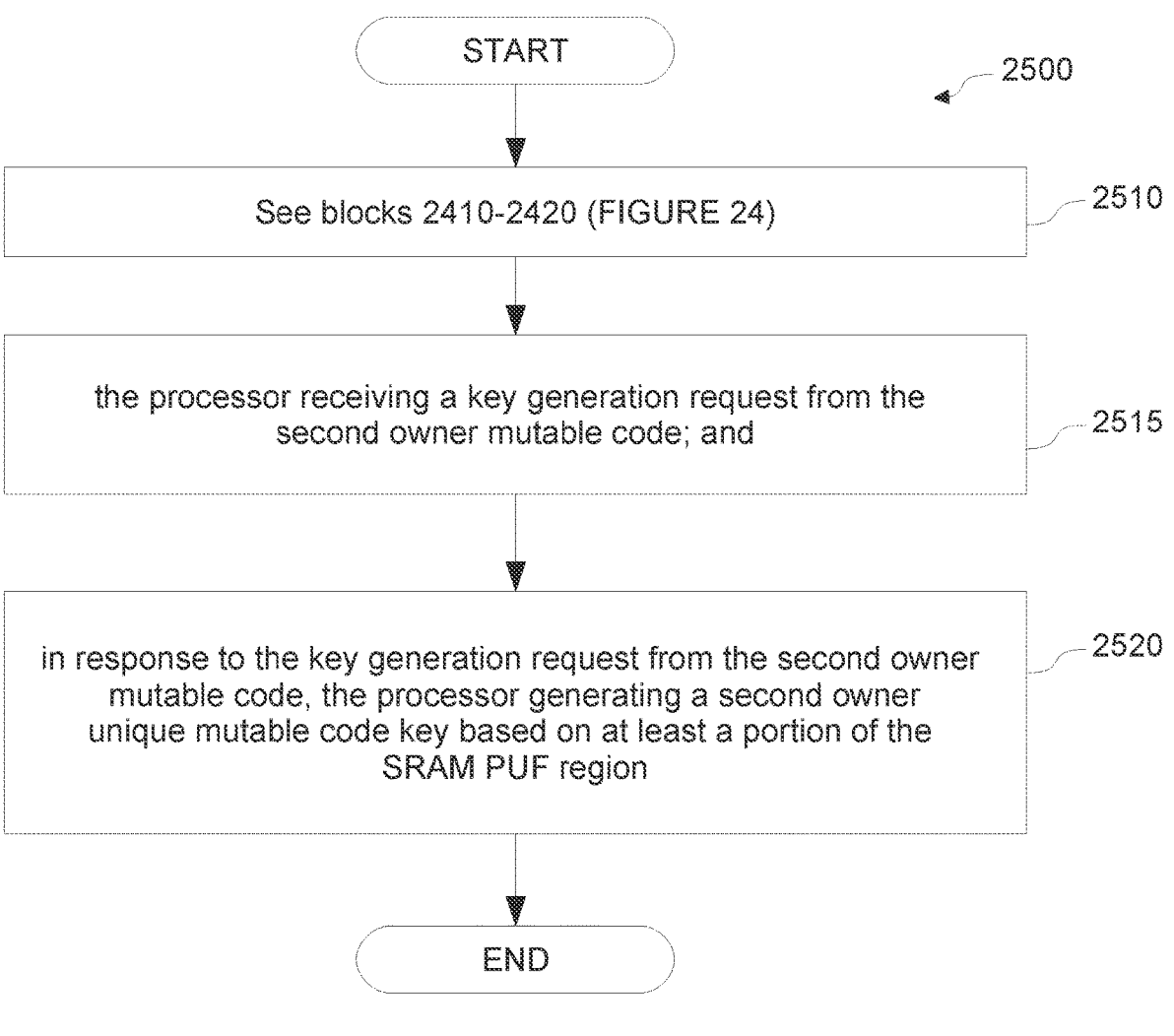

FIG. 25 illustrates a flow chart of an example method 2500 for using an SRAM PUF shared by multiple entities for managing device keys. According to one example, method 2500 may begin at block 2510. Teachings of the present disclosure may be implemented in a variety of configurations of system 100. As such, the initialization point for method 2500 and the order of 2510-2520 comprising method 2500 may depend on the implementation chosen.

According to an example, block 2510 may be the same as blocks 2410-2420 in FIG. 24. At block 2515, the processor may receive a key generation request from the second owner mutable code. At block 2520, in response to the key generation request from the second owner mutable code, the processor may generate a second owner unique mutable code key based on at least a portion of the SRAM PUF region. In an example, the generated second owner unique mutable code key may be based on keying material in SHD_PUF region 1606 (FIG. 16) and may be different than the DevAK key (e.g., for use other than responding to device attestation challenges).

Although FIG. 25 discloses a particular number of operations related to method 2500, method 2500 may be executed with greater or fewer operations than those depicted in FIG. 25. In addition, although FIG. 25 discloses a certain order of operations to be taken with respect to method 2500, the operations comprising method 2500 may be completed in any suitable order.

FIG. 26 illustrates a flow chart of an example method 2600 for using an SRAM PUF shared by multiple entities for managing device keys. According to one example, method 2600 may begin at block 2610. Teachings of the present disclosure may be implemented in a variety of configurations of system 100. As such, the initialization point for method 2600 and the order of 2610-2625 comprising method 2600 may depend on the implementation chosen.

According to an example, block 2610 may be the same as blocks 2110-2135 in FIG. 21. At block 2615, the method may include destroying the first unique private key during a reset of the electronic device. In an example, the first unique private key may be destroyed or erased during a reset because it is stored in volatile memory, the contents of which may not be maintained during the reset event. In an alternative example, the processor, responsive to instructions in the boot code may destroy or erase the first unique private key by making a stop( ) request to PUF engine 1955. In response to this request, PUF engine 1955, which may be mutable code stored in ROM (e.g., ROM 130), may destroy or erase the first unique private key. At block 2620, subsequent to the reset of the electronic device, the processor may generate a regenerated first unique private key equivalent to the first unique private key and not directly accessible by the first owner mutable code (e.g., PUF engine 1955 may not expose the regenerated key to first owner mutable code while still allowing first owner mutable code to sign data with the regenerated key). At block 2625, in response to a signing request from the first owner mutable code, the processor may use the first unique private keycode to sign the first data with the regenerated first unique private key. In an example, PUF engine 1955 may use the first unique private keycode as a reference or handle to determine the corresponding key ultimately used for signing the data.

Although FIG. 26 discloses a particular number of operations related to method 2600, method 2600 may be executed with greater or fewer operations than those depicted in FIG.

26. In addition, although FIG. 26 discloses a certain order of operations to be taken with respect to method 2600, the operations comprising method 2600 may be completed in any suitable order.

Figure 27:
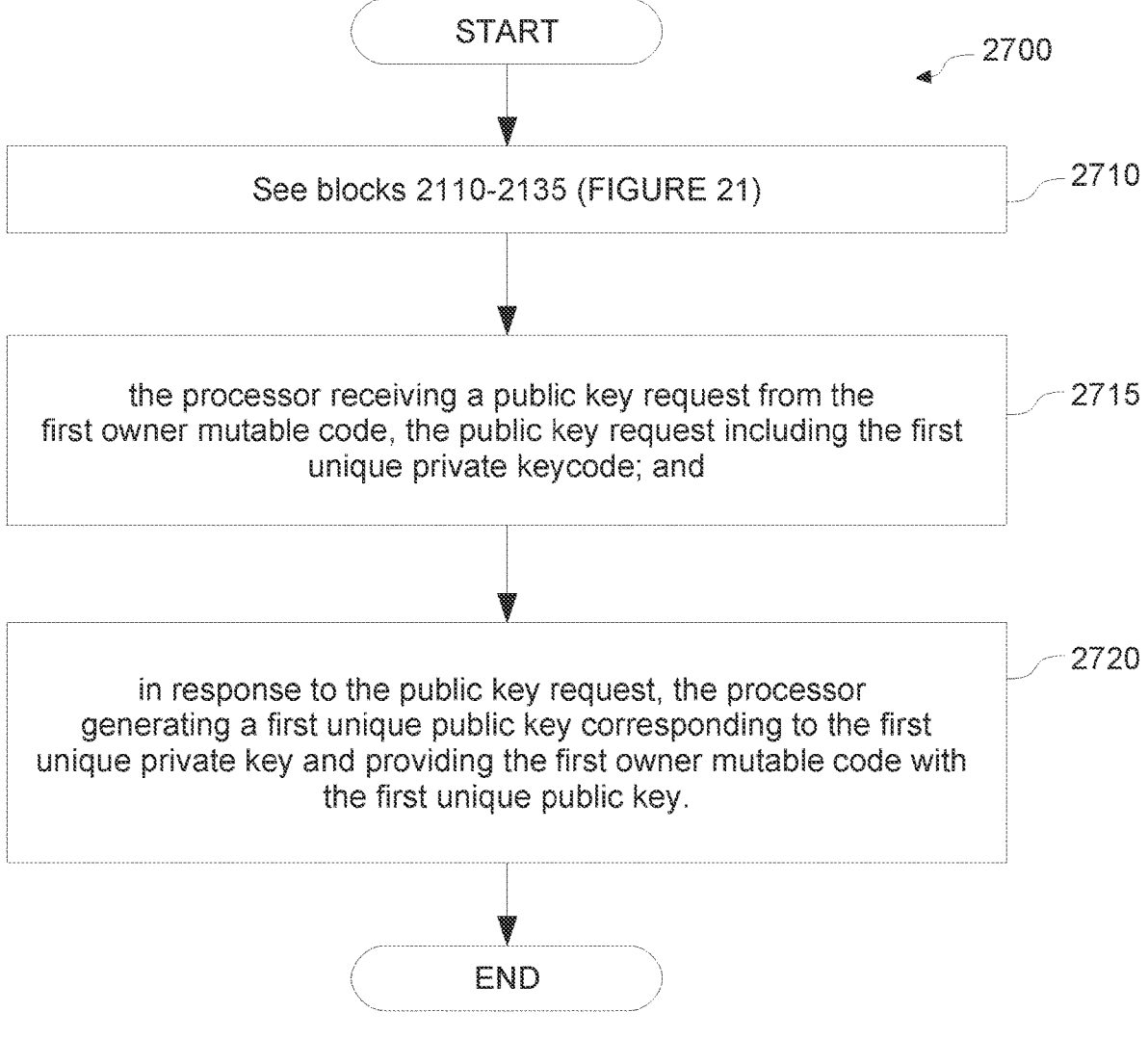

FIG. 27 illustrates a flow chart of an example method 2700 for using an SRAM PUF shared by multiple entities for managing device keys. According to one example, method 2700 may begin at block 2710. Teachings of the present disclosure may be implemented in a variety of configurations of system 100. As such, the initialization point for method 2700 and the order of 2710-2720 comprising method 2700 may depend on the implementation chosen.

According to an example, block 2710 may be the same as blocks 2110-2135 in FIG. 21. At block 2715, the processor may receive a public key request from the first owner mutable code, the public key request may include the first unique private keycode. At block 2720, in response to the public key request, the processor may generate a first unique public key corresponding to the first unique private key and provide the first owner mutable code with the first unique public key.

Although FIG. 27 discloses a particular number of operations related to method 2700, method 2700 may be executed with greater or fewer operations than those depicted in FIG. 27. In addition, although FIG. 27 discloses a certain order of operations to be taken with respect to method 2700, the operations comprising method 2700 may be completed in any suitable order.

Figure 28:
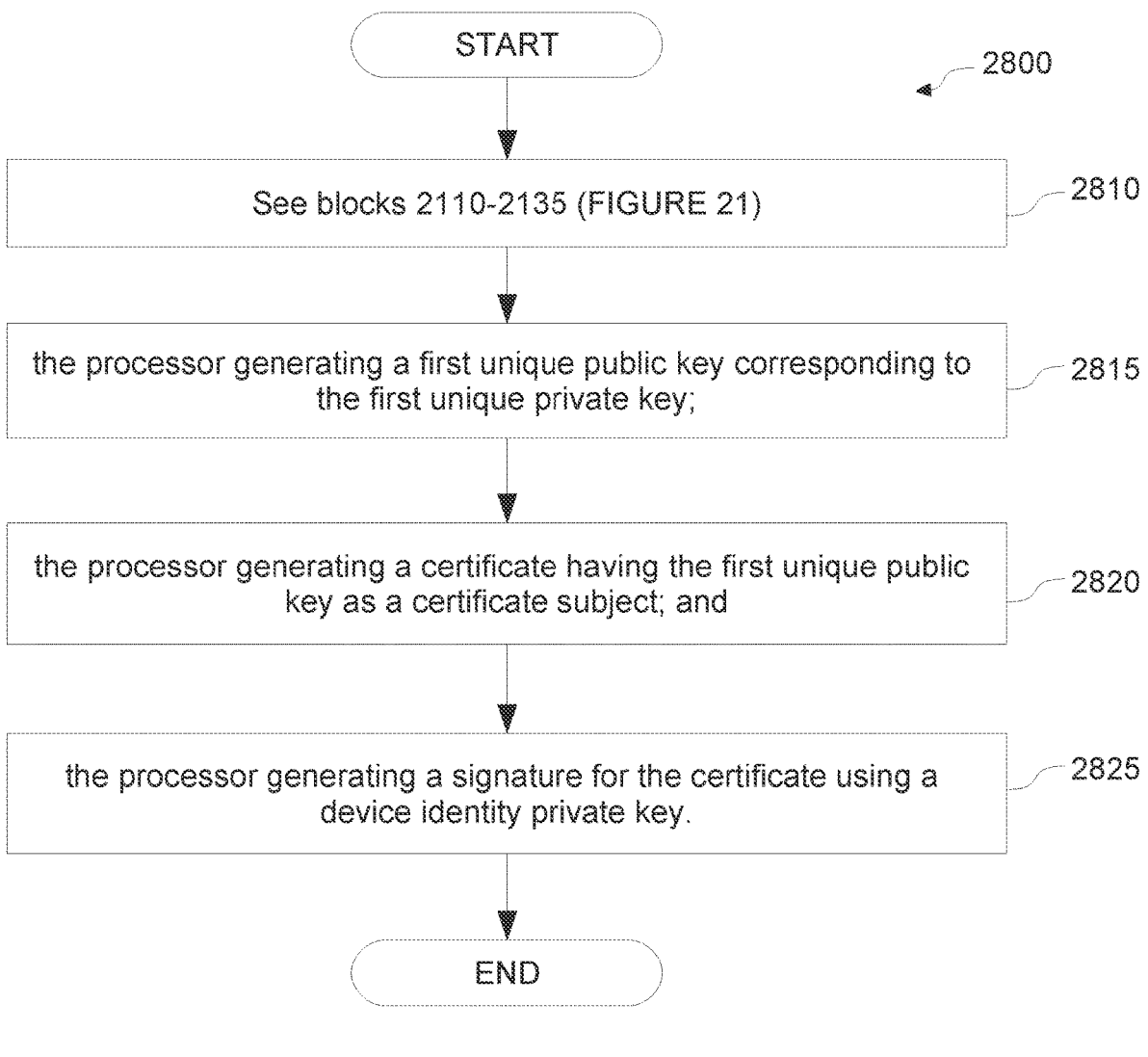

FIG. 28 illustrates a flow chart of an example method 2800 for using an SRAM PUF shared by multiple entities for managing device keys. According to one example, method 2800 may begin at block 2810. Teachings of the present disclosure may be implemented in a variety of configurations of system 100. As such, the initialization point for method 2800 and the order of 2810-2825 comprising method 2800 may depend on the implementation chosen.

According to an example, block 2810 may be the same as blocks 2110-2135 in FIG. 21. At block 2815, the processor may generate a first unique public key corresponding to the first unique private key. At block 2820, the processor may generate a certificate having the first unique public key as a certificate subject. At block 2825, the processor may generate a signature for the certificate using a device identity private key.

Although FIG. 28 discloses a particular number of operations related to method 2800, method 2800 may be executed with greater or fewer operations than those depicted in FIG. 28. For example, after block 2825, method 2800 may continue with additional operations illustrated in FIG. 29. In addition, although FIG. 28 discloses a certain order of operations to be taken with respect to method 2800, the operations comprising method 2800 may be completed in any suitable order.

Figure 29:
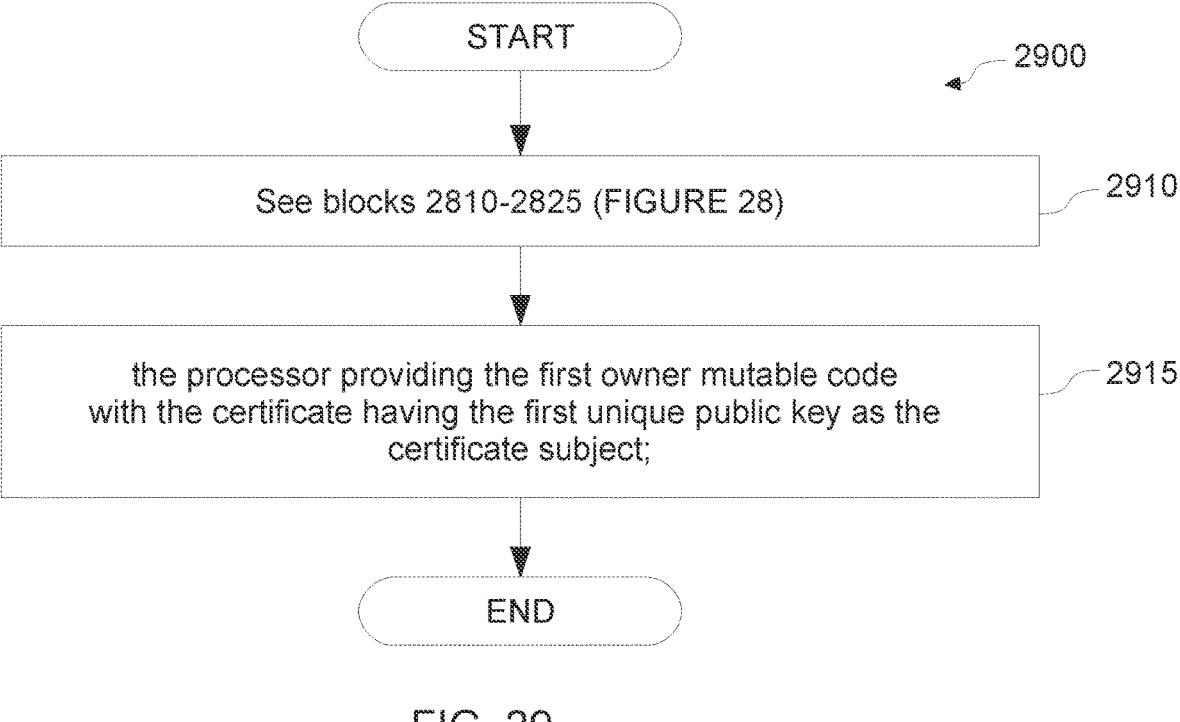

FIG. 29 illustrates a flow chart of an example method 2900 for using an SRAM PUF shared by multiple entities for managing device keys. According to one example, method 2900 may begin at block 2910. Teachings of the present disclosure may be implemented in a variety of configurations of system 100. As such, the initialization point for method 2900 and the order of 2910-2915 comprising method 2900 may depend on the implementation chosen.

According to an example, block 2910 may be the same as blocks 2810-2825 in FIG. 28. At block 2915, the processor may provide the first owner mutable code with the certificate that may have the first unique public key as the certificate subject.

Although FIG. 29 discloses a particular number of operations related to method 2900, method 2900 may be executed with greater or fewer operations than those depicted in FIG. 29. In addition, although FIG. 29 discloses a certain order of operations to be taken with respect to method 2900, the operations comprising method 2900 may be completed in any suitable order.

FIGS. 30A-30B illustrate a flow chart of an example method 3000 for using an SRAM PUF shared by multiple entities for managing device keys. According to one example, method 3000 may begin at block 3010. Teachings of the present disclosure may be implemented in a variety of configurations of system 100. As such, the initialization point for method 3000 and the order of 3010-3070 comprising method 3000 may depend on the implementation chosen.

At block 3010, for an electronic device having a processor, a non-volatile memory and an SRAM including an SRAM physically unclonable function (SRAM PUF) region, the processor may store a first owner information and a first owner mutable code in the non-volatile memory. In an example, the SRAM PUF region may comprise a secret unclonable silicon fingerprint unique to the electronic device. In the same or different example, the first owner information may be stored in non-volatile memory so that it may emulate a one-time-programmable memory (e.g., as an OTP emulated parameter, as described for FIG. 6) and may be unique to a first owner of the electronic device. At block 3015, the processor may generate a device identity private key based on at least a portion of the SRAM PUF region. At block 3020, the processor may generate a first unique private key that may be based on both the first owner information and at least a portion of the SRAM PUF region where the first unique private key may not be directly accessible by the first owner mutable code (e.g., PUF engine 1955 may not expose the first unique private key to first owner mutable code while still allowing first owner mutable code to sign data with the key). At block 3025, the processor may generate a first unique public key corresponding to the first unique private key. At block 3030, the processor may generate a first unique private keycode corresponding to the first unique private key. At block 3035, the processor may generate a certificate that may have the first unique public key as a certificate subject. At block 3040, the processor may sign the certificate using the device identity private key. At block 3045, the processor may provide the first owner mutable code with the first unique private keycode (e.g., by storing it in a firmware mailbox). At block 3050, the processor may provide the first owner mutable code with the certificate (e.g., by storing it in a firmware mailbox). At block 3055, the method may include erasing the first unique private key during a reset of the electronic device. In an example, the first unique private key may be destroyed or erased during a reset because it is stored in volatile memory, the contents of which may not be maintained during the reset event. In an alternative example, the boot code may cause the processor to destroy or erase the first unique private key by issuing a stop( ) request to PUF engine 1955. At block 3060, subsequent to the reset of the electronic device, the processor may generate a regenerated first unique private key equivalent to the first unique private key and not directly accessible by the first owner mutable code (e.g., PUF engine 1955 may not expose the regenerated key to first owner mutable code while still allowing first owner mutable code to sign data with the regenerated key). At block 3065, the processor may receive a signing request from the first owner mutable code, the signing request including the first unique private keycode and first data. In an example, the first data may comprise a device attestation challenge. At block 3070, in response to receiving the signing request from the first owner mutable code, the processor may sign the first data with the regenerated first unique private key and provide the first owner mutable code with the first data signed with the regenerated first unique private key.

Although FIGS. 30A-30B disclose a particular number of operations related to method 3000, method 3000 may be executed with greater or fewer operations than those depicted in FIG. 30. In addition, although FIG. 30 discloses a certain order of operations to be taken with respect to method 3000, the operations comprising method 3000 may be completed in any suitable order.

Secure Owner Revocation Emulation Container (REC)

The concepts of image key revocation and image rollback protection, as discussed in various examples above (e.g., FIG. 5), may apply to the first mutable code (FMC) that may be loaded and authenticated by boot code 140. The same concepts may also apply to images the FMC authenticates to extend the chain of trust (e.g., application firmware). With the introduction of device ownership, each owner may configure electronic device 101 to use a unique set of keys and image revisions that are used to validate the FMC during the boot code's authentication sequence. These keys and images may be validated using the TAGx image key revocation 508 and TAGx image rollback protection 509 information stored in secure RPMC owner container 302. The secure owner revocation emulation container (REC) may extend these concepts.

In an example, a new REC (e.g., FIG. 33) may be generated and stored in non-volatile memory 173 following a transfer of ownership. The new REC may contain revocation or rollback protection information related to assets associated with the current owner of electronic device 101. In an example, revocation and rollback protection information may correspond to assets such as keys (individual keys or key hash blobs), hash tables, or images. In the same or different examples, revocation and rollback protection information may correspond to assets such as static configuration data or accumulating data (revocation information, logs, status, etc.). In an example, revocation and rollback protection information may only be programmed, emulating OTP functionality, and not unprogrammed until a transfer of ownership occurs. In this manner, each owner of electronic device 101 may utilize the same number of assets as other owners (e.g., corresponding to the number of revocation and/or rollback protection bits provided in the REC). Without the REC, all owners may share asset revocation and rollback protection information stored in OTP memory 110 and, thus, the number of assets a current owner may revoke may be diminished by the number of assets a previous owner revoked.

Figure 31:
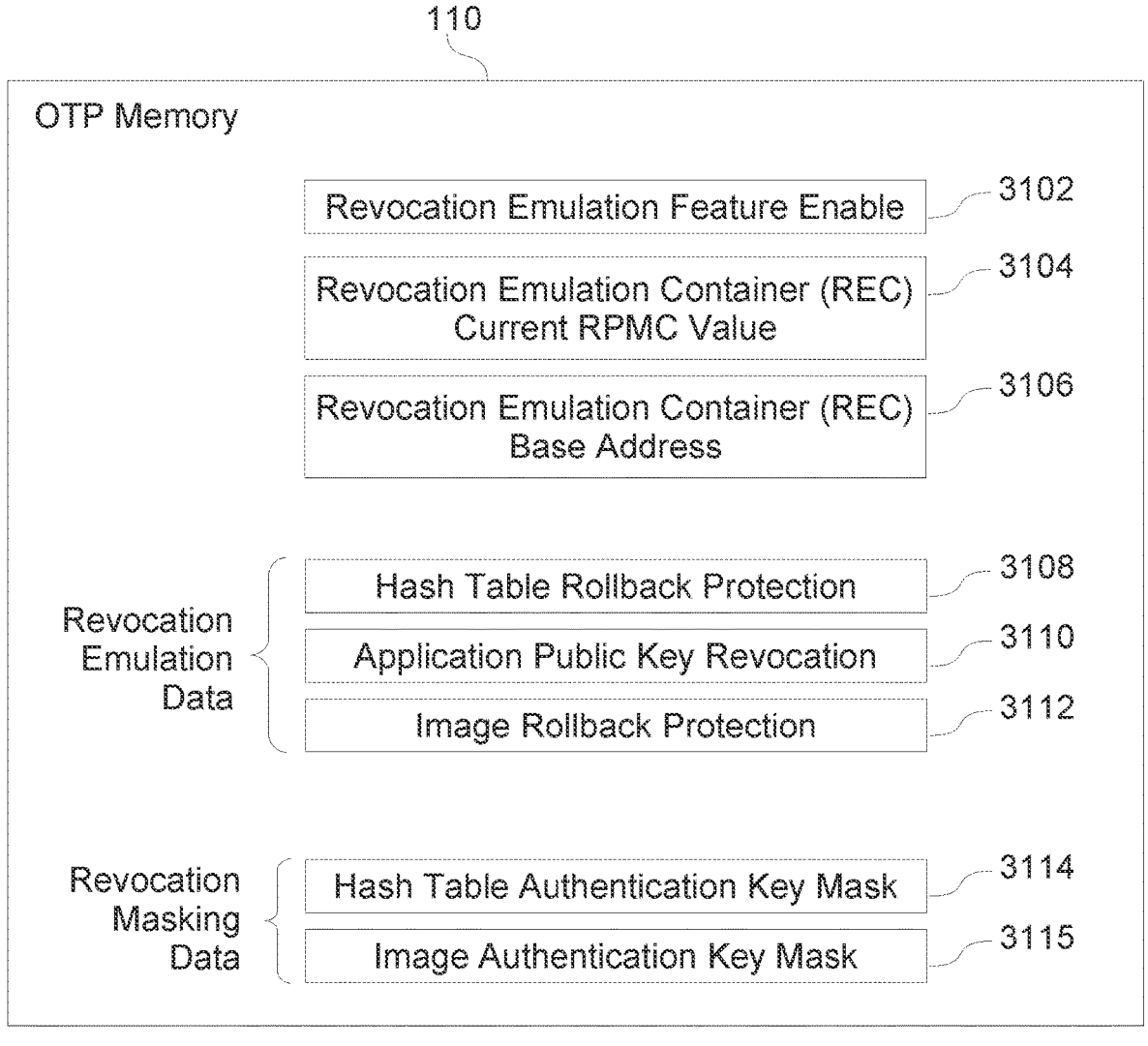
FIG. 31 illustrates a block diagram of an example OTP memory for managing keys, images, and other assets related to an owner of an electronic device.

FIG. 31 illustrates a block diagram of an example OTP memory for managing keys, images, and other assets related to an owner of an electronic device, including through the use of a secure owner REC. In an example, the information illustrated in OTP memory 110 of FIG. 31 may be in addition to the information illustrated in FIG. 2. Revocation emulation feature enable 3102 may indicate whether electronic device 101 supports the secure revocation emulation feature. In an example, if the value of revocation emulation feature enable 3102 indicates the feature is enabled, each owner of the electronic device 101 may be provided with their own set of emulated OTP (EOTP) asset revocation bits that may be stored in non-volatile memory 173 (e.g., in a secure REC (FIGS. 33-35)). In an example where asset revocation bits are for key and image assets, this feature may allow each owner of electronic device 101 to start at image revision 0 and key 0. In an alternative example where the value of revocation emulation feature enable 3102 indicates the feature is not enabled, the asset revocation bits may be stored in OTP memory 110. In this alternative example, the asset revocation bits may be shared among all the owners of electronic device 101 and a new owner may not use assets (e.g., keys or image revisions) revoked by a previous owner.

Revocation emulation container (REC) current RPMC value 3104 may be provided by a replay protected monotonic counter that is incremented over time. In an example, REC current RPMC value 3104 may be incremented upon a change of ownership of electronic device 101. In the example shown in FIG. 31, REC current RPMC value 3104 may be a value stored in OTP memory 110. In this example, bits in OTP memory 110 for REC current RPMC value 3104 may be set sequentially from lowest bit to highest bit, and the next REC current RPMC value may be the next integer value after the REC current RPMC value 3104. In the same or different examples, values less than REC current RPMC value 3104 may be considered revoked and values greater than REC current RPMC value 3104 may be considered unused (e.g., much like current RPMC value 202 in FIG. 2). A value less than REC current RPMC value 3104 may be considered revoked because OTP memory 110 may not be programmed to a lesser value because OTP memory, by definition, may be programmed only once. For example, when REC current RPMC value 3104 has a value of one (1), the least significant bit is programmed and cannot be unprogrammed to reset the REC current RPMC value 3104 back to a value of zero (0).

Regions 3108-3112 may act as revocation emulation data for various assets associated with the current owner of electronic device 101. In the illustrated example, assets may include hash tables, keys, and images corresponding, respectively, to regions 3108-3112. In an example, an owner may provide eight (8) public keys that may be used to authenticate other data. Application public key revocation 3110 may comprise one bit corresponding to each public key. In this example, when a bit in application public key revocation 3110 is programmed to a value of one (1), the corresponding key may be revoked. In an example, boot code 140 may not use a revoked key (e.g., before using a key, boot code 140 may check to ensure a corresponding bit in application public key revocation 3110 is not programmed to a value of one (1)). Similarly, hash table rollback protection 3108 and image rollback protection 3112 may indicate whether a current hash table or image revision (e.g., FMB) is available for use or has been revoked (not available for use). In an example, electronic device 101 may allow for up to 128 hash table revisions and 128 image revisions, and hash table rollback protection 3108 and image rollback protection 3112 may comprise, respectively, one bit corresponding to each revision. In this example, when a bit in hash table rollback protection 3108 is programmed to a value of one (1), the corresponding hash table revision may be revoked. In an example, boot code 140 may not use a revoked hash table (e.g., before using a hash table, boot code 140 may check to ensure a corresponding bit in hash table rollback protection 3108 is not programmed to a value of one (1)). In the same or different examples, when a bit in image rollback protection 3112 is programmed to a value of one (1), the corresponding image revision may be revoked. In an example, boot code 140 may not authenticate a revoked image (e.g., before loading an image, boot code 140 may check to ensure a corresponding bit in image rollback protection 3112 is not programmed to a value of one (1)).

Regions 3114-3115 may act as revocation masking data for various assets associated with the current owner of electronic device 101. Hash table authentication key mask 3114 may act as a permission mask for hash table revocation. Image authentication key mask 3115 may act as a permission mask for image revocation.

Although FIG. 31 illustrates various regions of OTP memory 310, other example systems may include electronic devices with more or fewer regions.

Revocation emulation container (REC) base address 3106 may be the base address where the default revocation emulation container is stored in non-volatile memory 173. In an example where revocation emulation feature enable 3102 indicates that electronic device 101 supports the secure revocation emulation feature, boot code may access the default revocation emulation container in non-volatile memory 173 using REC base address 3106.

Figure 32:
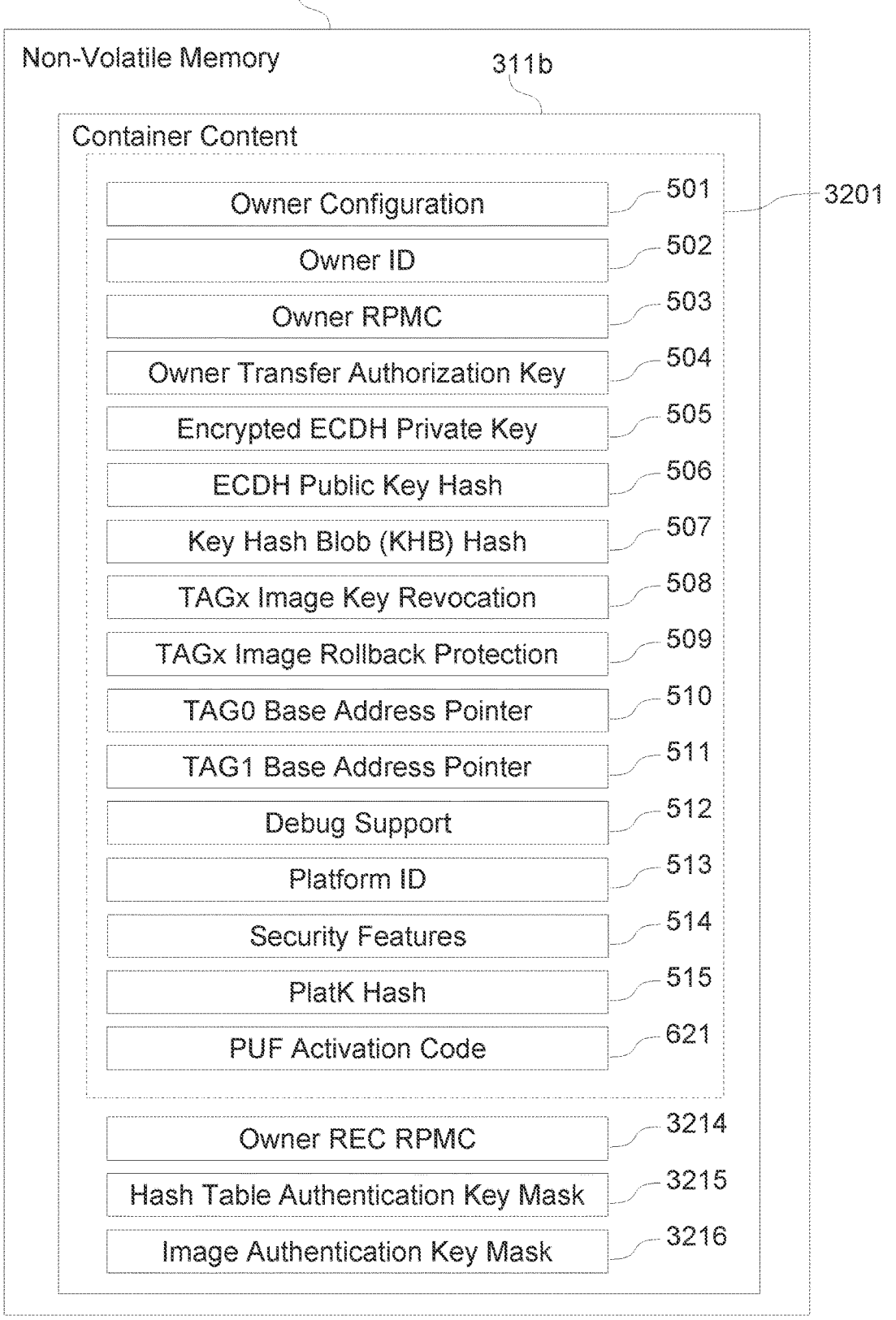
FIG. 32 illustrates a block diagram of example container content of an owner container for managing keys, images, and other assets related to an owner of an electronic device.

FIG. 32 illustrates a block diagram of example container content of an owner container for managing keys, images, and other assets related to an owner of an electronic device, including through the use of a secure owner REC. As depicted in FIG. 32, container content 311b may be programmed in non-volatile memory 173 and may include regions 501-515 (described with respect to FIG. 5) and 621 (described with respect to FIG. 6) (all previously-described regions in dashed box 3201). Container content 311b may further include regions 3214-3216 corresponding to a secure REC. Owner REC RPMC 3214 may equal the offset (e.g., the index) of the most significant bit (MSB) that is programmed in REC current RPMC value 3104. In an example, boot code 140 may determine whether a REC is valid by comparing owner REC RPMC 3214 with REC current RPMC value 3104 (stored in OTP memory 110). Hash table authentication key mask 3215 may comprise information used to generate hash table permission bits. Image authentication key mask 3216 may comprise information used to generate image table permission bits.

Although FIG. 32 illustrates various regions of container content 311b, other example systems may include electronic devices with more or fewer regions.

Figure 33:
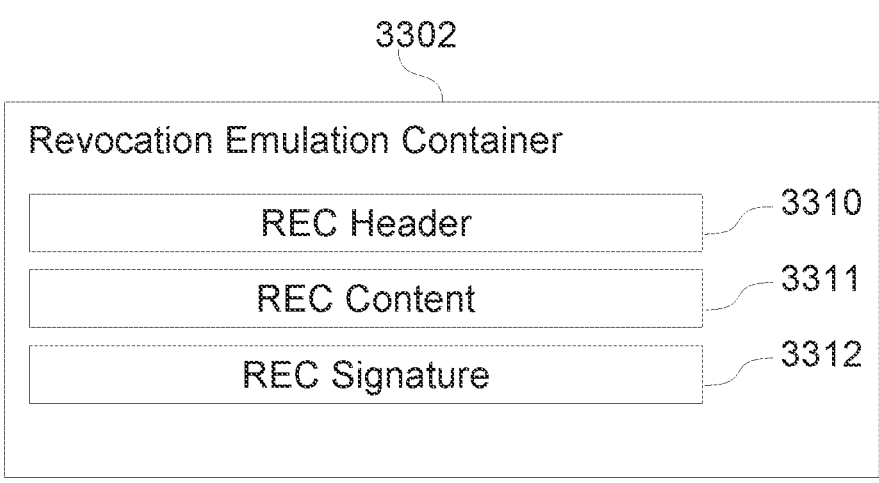
FIG. 33 illustrates a block diagram of an example secure Revocation Emulation Container for managing ownership, keys, images, and other assets related to an owner of an electronic device.

FIG. 33 illustrates a block diagram of an example secure revocation emulation container (REC) 3302 for managing ownership, keys, images, and other assets related to an owner of electronic device 101. In an example, REC 3302 may be a signed data image stored in non-volatile memory (e.g., OTP memory 110, non-volatile memory 173, among others) that may contain the current silicon owner's configuration and revocation information to enable boot code 140 to revoke various assets (e.g., keys, hash tables, and images, among others). As depicted in FIG. 33, owner container 3302 may include three regions: REC header 3310, REC content 3311, and REC signature 3312. In an example, REC 3302 may be a unique signed container of information modified, stored in, and retrieved from non-volatile memory (e.g., non-volatile memory 173) by the code that creates the container (e.g., boot code 140 or a ROM extension (e.g., an authenticated FMC)). According to examples in this disclosure, REC 3302 may be signed and updated only by the code that created the container. Higher-level firmware (e.g., code other than the code that created the container) may require a command interface (e.g., command memory 171, FIG. 7) to access or modify information in REC 3302. In an example, only immutable boot code (e.g., boot code 140) may access or modify information in REC 3302. In another example, boot code (whether immutable boot code or a ROM extension (e.g., an authenticated FMC)) may access or modify information in REC 3302. In an example, boot code that creates REC 3302 may create two redundant copies of REC 3302. One copy may be the primary REC and the other copy may be the fallback REC.

Although FIG. 33 illustrates various regions of REC 3302, other example systems may include electronic devices with more or fewer regions.

REC Signature

REC signature 3312 may comprise a signature corresponding to REC 3302 and may be generated by boot code 140 or a ROM extension (e.g., an authenticated FMC). In an example, boot code 140 may use a physically unclonable function (PUF) to generate a non-deterministic ECDSA signature. For example, REC signature 3312 may be an ECDSA-384 signature having the following characteristics:

Algorithm: Elliptic Curve Digital Signature Algorithm (ECDSA)

Key Size: 384 bit

Curve: NIST "secp384r1" curve

Hashing Algorithm: SHA384

Signed Message (m)={REC header 3310|REC content 3311}

Boot code 140 may derive the ECDSA private signing key used to sign REC 3302. In an example, boot code 140 may enroll/start the SRAM PUF (e.g., SHD_PUF region 1606/1608 in FIG. 16) prior to deriving the ECDSA private signing key. Once the ECDSA private signing key has been derived, boot code 140 may sign REC 3302.

REC Header

Figure 34:
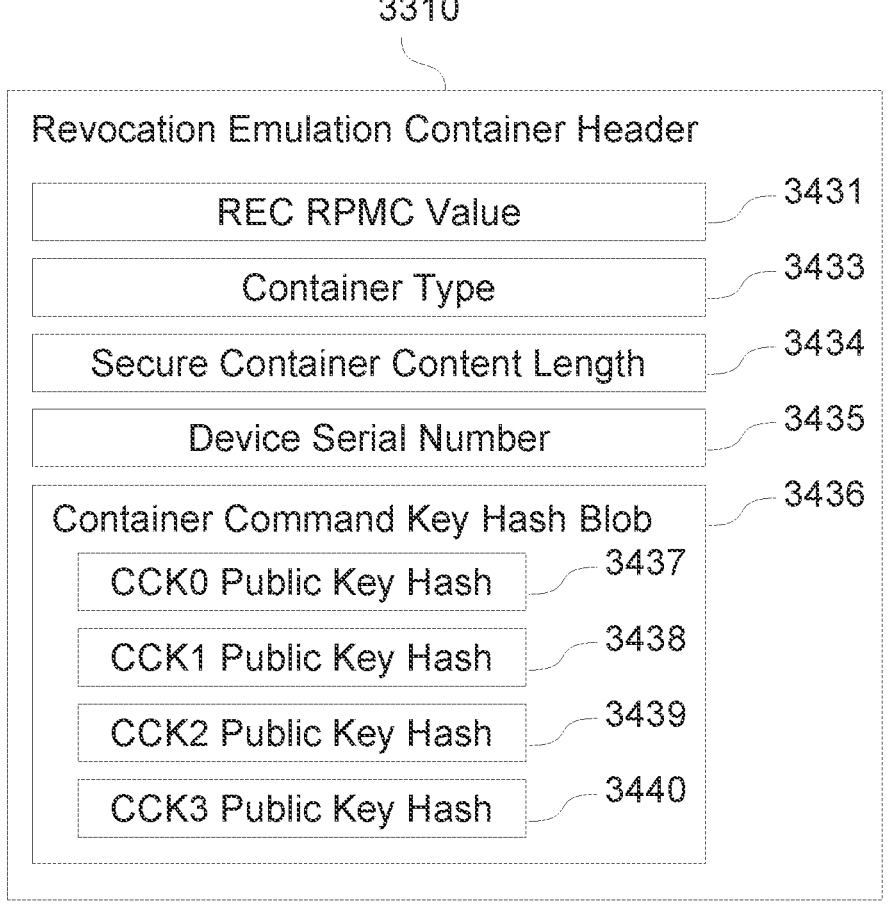
FIG. 34 illustrates a block diagram of an example secure Revocation Emulation Container header of an owner container for managing ownership, keys, images, and other assets related to an owner of an electronic device.

FIG. 34 illustrates a block diagram of an example REC header 3310 of revocation emulation container 3302 for managing ownership, keys, images, and other assets related to an owner of electronic device 101. In an example, REC header 3310 may have a common format for the RECs created for electronic device 101. As depicted in FIG. 34, REC header 3310 may include regions 3431-3436, including: REC RPMC value 3431, container type 3433, secure container content length 3434, device serial number 3435, and container command key hash blob 3436.

REC RPMC value 3431 may be provided by a replay protected monotonic counter that may be checked against the REC current RPMC value 3104 in OTP memory 110 to determine if this REC container is valid or has been revoked. In an example, when REC RPMC value 3431 for REC 3302 has a value of three (3), boot code 140 may determine that REC 3302 is valid when revocation emulation container (REC) current RPMC value 3104 also has a value of three (3). In the same or different examples, when REC RPMC value 3431 for REC 3302 has a value of three (3), boot code 140 may determine that REC 3302 is revoked when the revocation emulation container (REC) current RPMC value 3104 has a value greater than three (3). In some examples, REC RPMC value 3431 may be used in a check for primary and fallback REC containers.

Container type 3433 may represent a type associated with REC 3302. In an example, container type 3433 may have a value indicating the container is uninitialized. In another example, container type 3433 may have a value indicating REC 3302 is initialized and is a valid REC. Secure container content length 3434 may indicate the number of bytes in REC content 3311. Device serial number 3435 may correspond to the serial number of electronic device 101, e.g., unique serial number 205 in OTP memory 110. Container command key hash blob 3436 may contain a hash (e.g., SHA384 (Secure Hash Algorithm)) of one or more container command keys (CCK) which may be public keys of a cryptographic key pair. In the illustrated example, container command key hash blob 3436 may include hashes of public key CCK0 3437, CCK1 3438, CCK2 3439, and CCK3 3440. In an example, these key hashes may be used to verify commands related to REC 3302. (Alternatively, container command key hash blob 3436 may contain the public keys instead of hashes of the public keys. In this example, more memory may be needed.) In an example, CCK0-3 (3437-3440) may be revoked by setting the hash entry to zero (0). Although FIG. 34 illustrates various regions of REC header 3310, other example systems may include electronic devices with more or fewer regions.

REC Content

Figure 35:
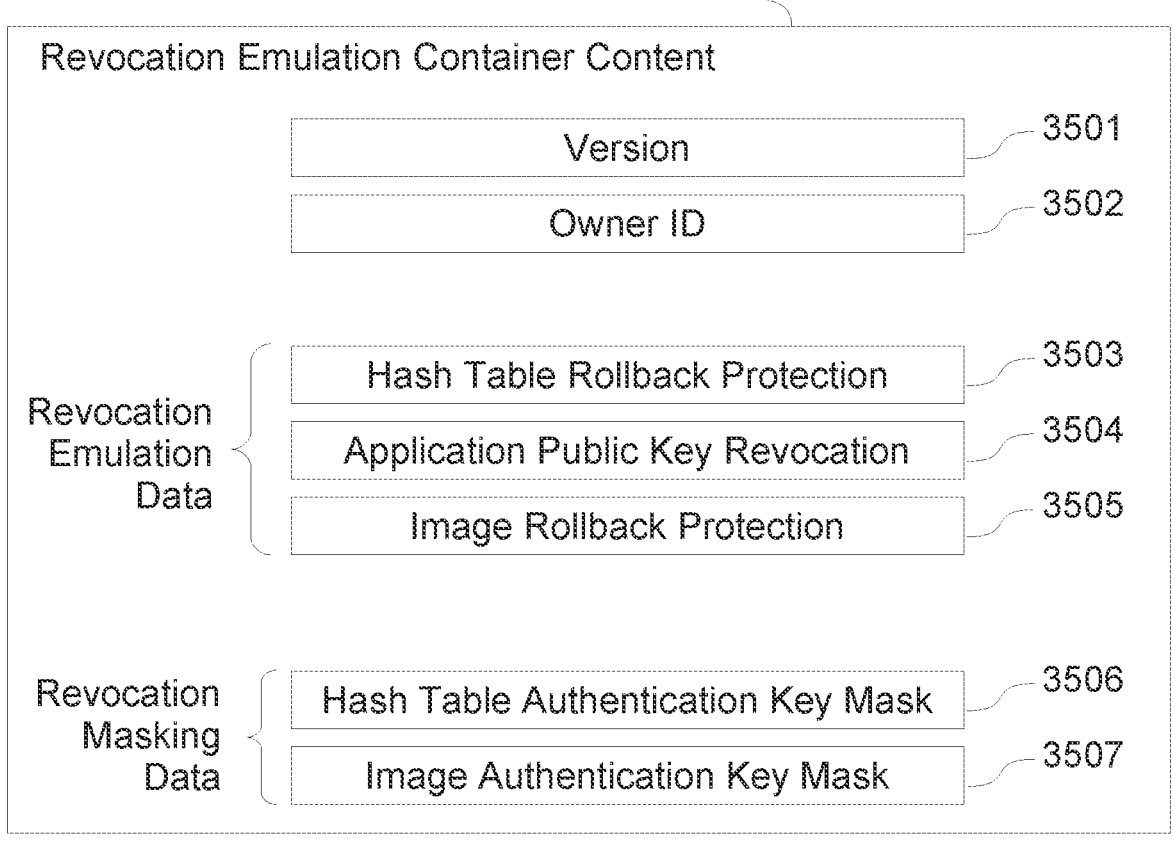
FIG. 35 illustrates a block diagram of example secure Revocation Emulation Container content of an owner container for managing ownership, keys, images, and other assets related to an owner of an electronic device.

FIG. 35 illustrates a block diagram of example REC content 3311 of REC 3302 for managing ownership, keys, images, and other assets related to an owner of electronic device 101. As depicted in FIG. 35, REC content 3311 may include regions 3501-3507, including: version 3501, owner ID 3502, hash table rollback protection 3503, application public key revocation 3504, image rollback protection 3505, hash table authentication key mask 3506, and image authentication key mask 3507. Version 3501 may indicate the REC content version to support updates to the REC format. Owner ID 3502 may be a value provided by the owner at the time of ownership transfer, may be the same as the owner ID 501 value stored in the current owner's secure RPMC owner container, and may be used to verify this REC belongs to the current owner.

Regions 3503-3505 may act as revocation emulation data for various assets associated with the current owner of electronic device 101. In the illustrated example, assets may include hash tables, keys, and images corresponding, respectively, to regions 3503-3505. In an example, an owner may provide eight (8) public keys that may be used to authenticate other data. Application public key revocation 3504 may comprise one bit corresponding to each public key. In this example, when a bit in application public key revocation 3504 is programmed to a value of one (1), the corresponding key may be revoked. In an example, boot code 140 may not use a revoked key (e.g., before using a key, boot code 140 may check to ensure a corresponding bit in application public key revocation 3504 is not programmed to a value of one (1)). Similarly, hash table rollback protection 3503 and image rollback protection 3505 may indicate whether a current hash table or image revision (e.g., FMB) is available for use or has been revoked (not available for use). In an example, electronic device 101 may allow for up to 128 hash table revisions and 128 image revisions, and hash table rollback protection 3503 and image rollback protection 3505 may comprise, respectively, one bit corresponding to each revision. In this example, when a bit in hash table rollback protection 3503 is programmed to a value of one (1), the corresponding hash table revision may be revoked. In an example, boot code 140 may not use a revoked hash table (e.g., before using a hash table, boot code 140 may check to ensure a corresponding bit in hash table rollback protection 3503 is not programmed to a value of one (1)). In the same or different examples, when a bit in image rollback protection 3505 is programmed to a value of one (1), the corresponding image revision may be revoked. In an example, boot code 140 may not authenticate a revoked image (e.g., before loading an image, boot code 140 may check to ensure a corresponding bit in image rollback protection 3505 is not programmed to a value of one (1)).

Revocation emulation data in regions 3503-3505 may be emulated OTP (EOTP) information stored in non-volatile memory 173. In an example, this feature may allow each owner of electronic device 101 to start at hash table revision 0, image revision 0, and key 0 (e.g., each region 3503-3505 may be initialized to zero (0) when REC 3302 is first created). In an example, regions 3503-3505 may be stored in non-volatile memory 173 and may emulate data stored in OTP memory 110 (OTP emulation) because trusted boot code 140 (e.g., immutable boot code or an authenticated ROM extension in FMC) may only program these regions, and no commands may be provided for boot code 140 (or other code) to un-program those regions. In the case where a malicious user may attempt to alter the REC 3302 while it is stored in non-volatile memory 173 (e.g., to alter any of the EOTP regions), verification of the REC will fail. For example, verification uses REC signature 3312 which is also stored in non-volatile memory 173. Because REC signature 3312 is generated from a private key based on the SRAM PUF (e.g., SHD_PUF region 1606/1608 in FIG. 16), and only boot code 140 may directly access the SRAM PUF, the malicious user is unable to spoof REC signature 3312. Thus, revocation emulation data in regions 3503-3505 in REC 3302 stored in non-volatile memory 173 may be considered to emulate OTP memory.

Regions 3506-3507 may act as revocation masking data for various assets associated with the current owner of electronic device 101. Hash table authentication key mask 3506 may act as a permission mask for hash table revocation. Image authentication key mask 3507 may act as a permission mask for image revocation.

Although FIG. 35 illustrates various regions of REC content 3311, other example systems may include electronic devices with more or fewer regions.

Revocation Emulation Container Methods

Figure 36:
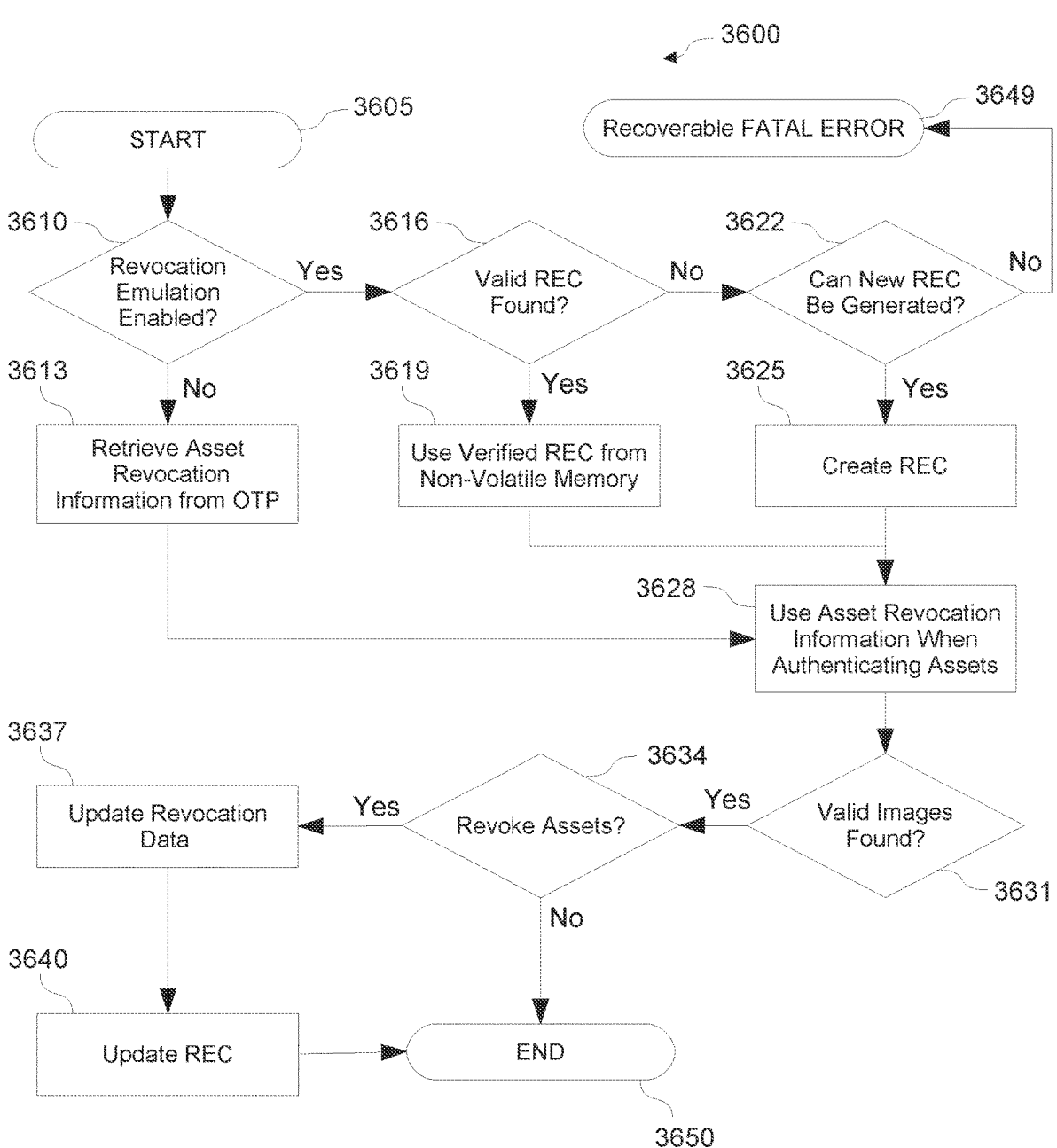
FIG. 36 illustrates a flow chart of an example method for revocation emulation.

FIG. 36 illustrates a flow chart of an example method for revocation emulation. According to one example, method 3600 may begin at block 3605. In an example, method 3600 may be performed by boot code 140. For simplicity, we may use the term boot code 140 as performing functions, which is meant to be understood as boot code 140 is read by processor 160 and causes processor 160 to perform the relevant functions. In some examples, starting block 3605 may represent a time when electronic device 101 is first powered up (i.e. power on reset (POR)) or a time following a reset of the electronic device (e.g., a device reset, a reboot, or a power cycle). In the same or different example, starting block 3605 may represent a time after which boot code 140 has determined that (1) the ownership feature of electronic device 101 is enabled (e.g., based on an enable bit in OTP memory 110 set during device provisioning) and (2) the device has a current owner (e.g., based on the state of a bit in RPMC flash container state 208 stored in OTP memory 110 (FIG. 2)). In these examples, method 1700 may be performed by boot code 140 at a time when volatile memory 172 (e.g., SRAM with ROM_PUF and SHD_PUF regions) may not be accessed by the FMC (e.g., because FMC has not yet been authenticated and loaded). Teachings of the present disclosure may be implemented in a variety of configurations of system 100. As such, the initialization point for method 3600 and the order of 3605-3650 comprising method 1700 may depend on the implementation chosen.

Following a POR or soft reset, boot code 140 may proceed to block 3610 where it may determine whether the revocation emulation feature is enabled. In an example, boot code 140 may make this determination based on the value of revocation emulation feature enable 3102 in OTP memory 110 (FIG. 31). If the revocation emulation feature is not enabled, boot code 140 may proceed to block 3613 where it may retrieve asset revocation information from OTP memory 110. In an example, boot code 140 may retrieve asset revocation such hash table rollback protection 3108, application public key revocation 3110, or image rollback protection 3112 (FIG. 31). In this example, all owners may share asset revocation and rollback protection information stored in OTP memory 110 and, thus, the number of assets (e.g., keys, images) a current owner may revoke may be diminished by the number of assets a previous owner revoked.

If at block 3610 boot code 140 determines the revocation emulation feature is enabled, boot code 140 may proceed to block 3616 where it may determine whether it can find a valid REC. In an example, a valid REC (e.g., REC 3302) is considered to be found when (1) the REC signature 3312 is valid, (2) the REC RPMC value 3431 is valid, and (3) other integrity checks pass. In the same or different example, boot code 140 may determine the REC signature 3312 is valid by taking the following steps:

1. Verify availability of SRAM PUF (e.g., PUF activation code 621 (FIG. 6) is present in current owner's secure RPMC owner container). In an example, a non-zero PUF activation code 621 may indicate the presence of PUF activation code 621 and the availability of the SRAM PUF.
2. Generate an ECDSA-384 private key for signing REC 3302. In an example, boot code 140 may use PUF engine 1955 (and the SRAM PUF API functions) (FIG. 19) to generate a private key. PUF engine 1955 may return a keycode for the newly generated key.
3. Generate an ECDSA-384 public key from private key. In an example, boot code 140 may use the keycode obtained in step #2 to request PUF engine 1955 generate the corresponding public key (e.g., Action 14 in FIG. 19).
4. Verify REC 3302 using derived public key. In an example, boot code 140 may use the public key obtained in step #3 and the REC 3302 header, content, and signature (which may be stored in volatile memory, e.g., SRAM) to request PUF engine 1955 to verify the REC 3302.

In the same or different example, boot code 140 may determine the REC RPMC value 3431 is valid by comparing it with REC current RPMC value 3104 in OTP memory 110. In an example, REC RPMC value 3431 may be valid when its value is equal to the index of the least significant bit that is set to zero in revocation emulation container (REC) current RPMC value 3104. In the same or different example, boot code 140 may perform any of the following integrity checks: (a) correct container version (e.g., version 3501 matches an expected value); (b) correct container type 3433 (e.g., REC); (c) correct container content length 3434 (e.g., 0x11c); (d) device serial number 3435 in REC 3302 matches serial number 205 value in OTP memory 110; (e) CCK key hash blob 3436 in REC 3302 match values (e.g., 436 in FIG. 4) programmed in the current owner's secure RPMC owner container; (f) owner ID 3502 in REC equal owner ID (e.g., 502 in FIG. 5) in the current owner's secure RPMC owner container; or (g) revocation masking data (e.g., 3506/3507) matches values stored in the current owner's secure RPMC owner container (e.g., 3215/3216 in FIG. 32).

Figure 38:
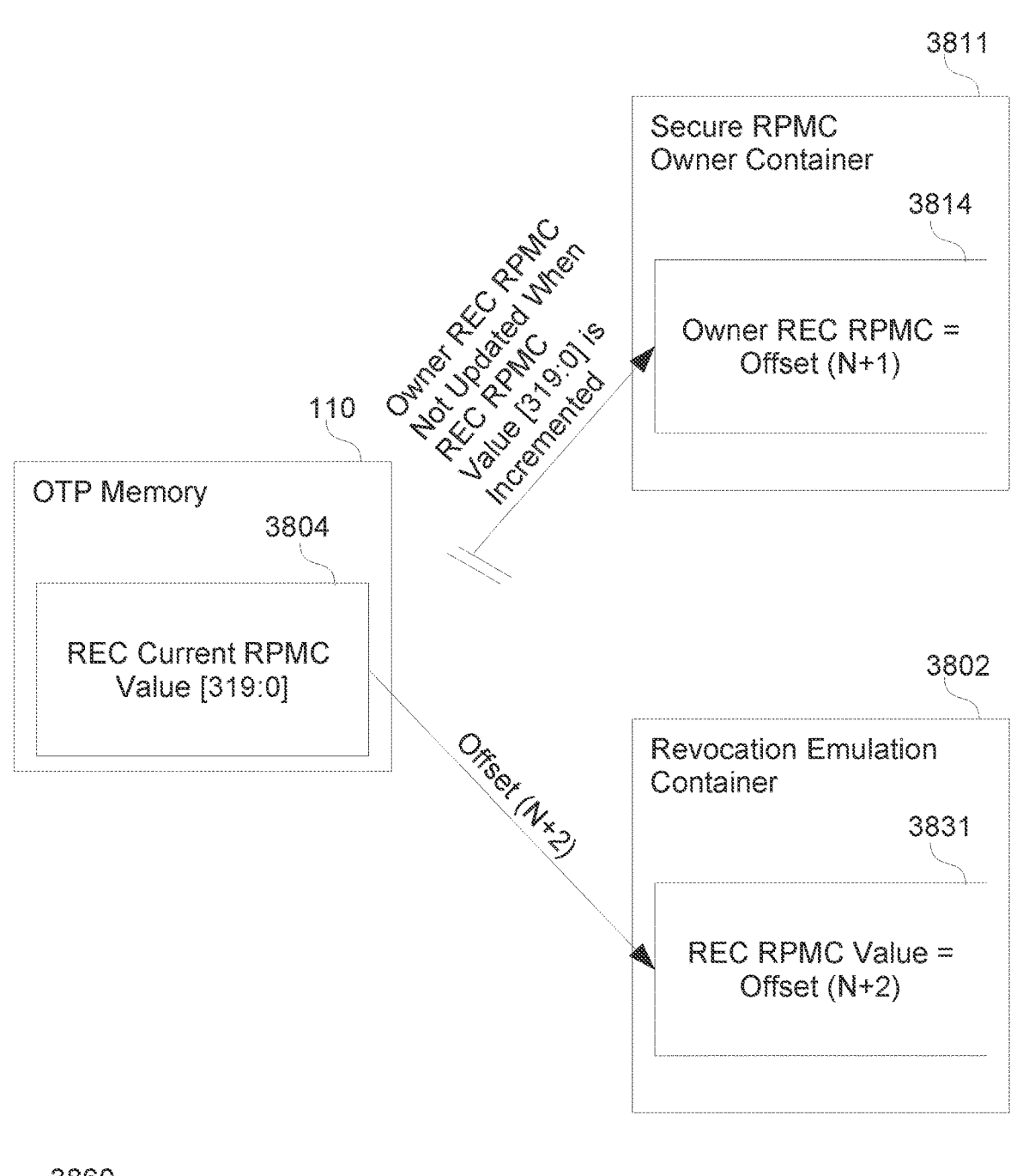
FIG. 38 illustrates a block diagram of various RPMC values related to revocation emulation, including how the REC RPMC value may be incremented to revoke an asset.

If at block 3616 boot code 140 determines it found a valid REC, boot code 140 may proceed to block 3619 where it uses the verified REC from non-volatile memory 173 in subsequent steps. If at block 3616 boot code 140 determines it has not found a valid REC, boot code 140 may proceed to block 3622 where it determines whether a new REC can be generated. In an example, boot code 140 may determine a new REC can be generated (1) if no assets (e.g., keys, image revisions, hash tables, among others) have been revoked by the current owner, and (2) the current owner's secure RPMC owner container has a valid PUF activation code 621 (FIG. 6). FIG. 38 illustrates an example of determining if no assets have been revoked by the current owner. In the same or different example, a non-zero PUF activation code 621 may indicate a valid PUF activation code 621.

If at block 3622 boot code 140 determines a new REC can be generated, boot code 140 may proceed to block 3625 where it may create a new REC. In an example, boot code 140 will create a new REC at the time a new owner of electronic device 101 is established (e.g., when revocation emulation feature enable 3102 indicates the feature is enabled).

Figure 37:
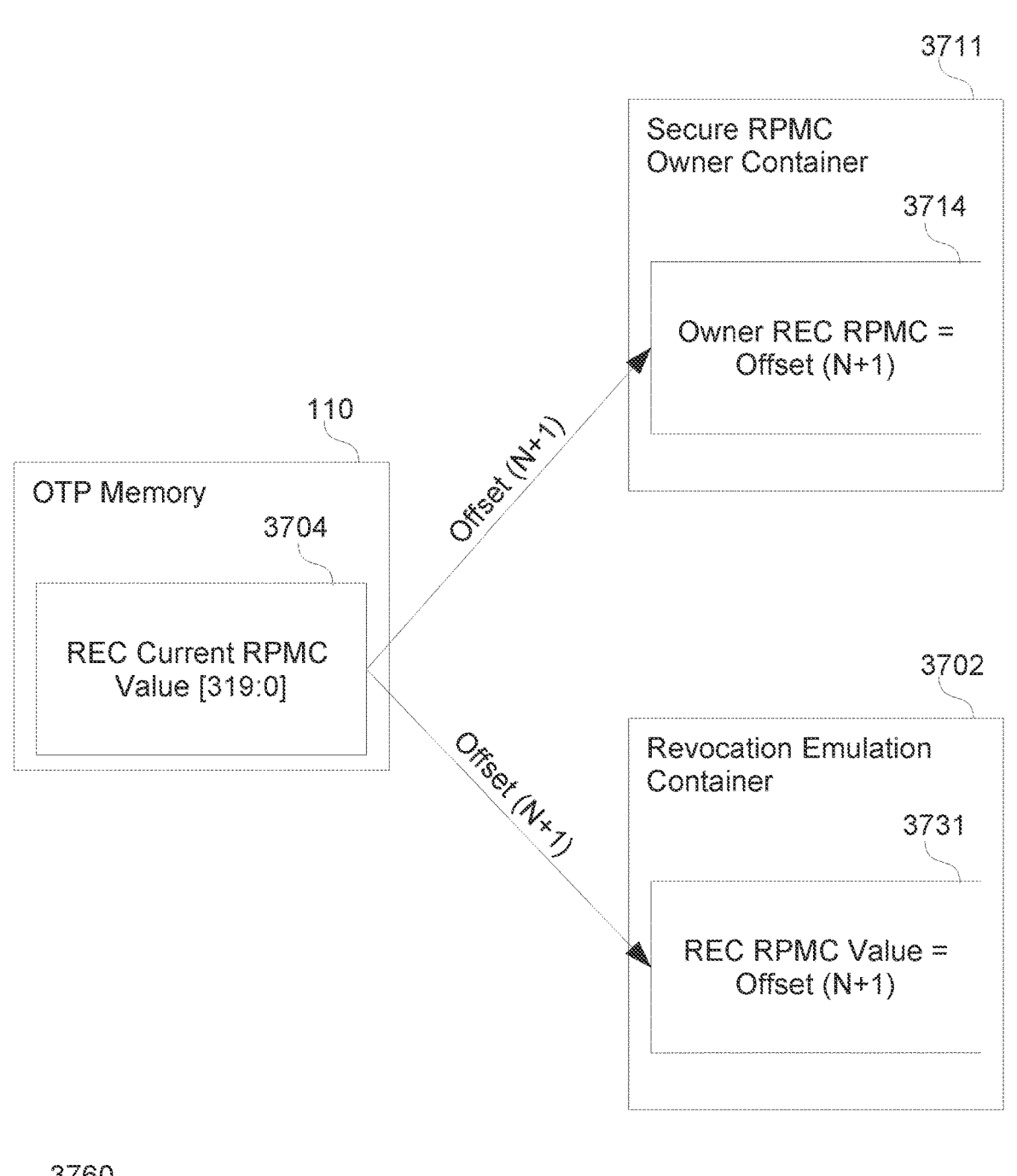
FIG. 37 illustrates a block diagram of various RPMC values related to revocation emulation, including how the REC container may be bounded to the owner container at the time of creation.

FIG. 37 illustrates a block diagram of various RPMC values related to revocation emulation and, more specifically, to creating a new REC at block 3625 (FIG. 36), including how the REC container may be bounded to the owner container at the time of creation. In an example, REC current RPMC value [319:0] 3704 in OTP memory 110 may be 320 bits wide allowing for 320 distinct secure revocation emulation containers in electronic device 101. (REC current RPMC value [319:0] 3704 is an example of one implementation of REC current RPMC value 3104 in FIG. 31.) Secure RPMC owner container 3711 may comprise owner REC RPMC 3714. (Secure RPMC owner container 3711 and owner REC RPMC 3714 are examples of one implementation of secure RPMC owner container 302 and owner REC RPMC 3214, respectively.) Revocation emulation container 3702 may comprise REC RPMC value 3731. (Revocation emulation container 3702 and REC RPMC value 3731 are examples of REC 3302 and REC RPMC value 3431.) In an example, when a new owner of electronic device 101 is established, new REC 3702 may be created (e.g., block 3625 in FIG. 36). When creating new REC 3702, boot code 140 may set the value of both owner REC RPMC 3714 and REC RPMC value 3731 to "Offset (N+1)", which may be the index of the least significant bit in REC current RPMC value [319:0] 3704 that is set to zero (as illustrated in block 3760).

FIG. 38 illustrates a block diagram of various RPMC values related to revocation emulation and, more specifically, to updating RPMC values at the time an asset (e.g., key, image, hash table) is revoked, including how the REC RPMC value may be incremented to revoke an asset. In an example, RPMC values from FIG. 37 may be present in electronic device 101 following a change of ownership. When an asset is revoked, boot code 140 may increment REC RPMC value 3831 (e.g., to N+2), and may set the least significant bit in REC current RPMC value [319:0] 3804 that is set to zero (e.g., N+1) to one, as illustrated in block 3860. In the same example, boot code 140 may not change owner REC RPMC 3814 (its value may still be N+1). Consequently, once an asset has been revoked, owner REC RPMC 3814 (e.g., N+1) may be less than the offset (e.g., the index) of the least significant bit equal to zero in REC current RPMC value [319:0] 3804 in OTP memory 110. In an example, boot code 140 may use these values at block 3622 to determine if a new REC can be generated. If owner REC RPMC 3814 is equal to the offset of the least significant bit equal to zero in REC current RPMC value [319:0] 3804, boot code 140 may determine that no assets (e.g., keys, images, hash tables) have been revoked by the current owner and, as such, may generate a new REC. If not, boot code 140 may not create a new REC since it is possible the current owner has revoked one or more assets.

According to an example, owner REC RPMC 3814 and REC RPMC value 3831 may both be initialized to a value of eight (1000*b*) when ownership is transferred. This initialization may occur when bits 0-7 of REC current RPMC value [319:0] 3804 are set to one (1). In this example, N=7 and (N+1)=8. When an asset is revoked, boot code 140 may increment REC RPMC value 3831 to a value of nine (1001*b*) (e.g., to N+2), and may set the least significant bit in REC current RPMC value [319:0] 3804 that is set to zero (e.g., bit 8 (i.e., N+1)) to one. In this example, boot code 140 may determine that it may not create a new REC because owner REC RPMC 3814, which retains its initialization value of eight is less than (and not equal to) the offset of the least significant bit equal to zero in REC current RPMC value [319:0] 3804, which is now bit nine (N+2) because bit eight was set to one.

Turning back to FIG. 36, if at block 3622 boot code 140 determines a new REC cannot be generated, boot code 140 may proceed to block 3649 indicating a recoverable fatal error. In an example, at block 3649, boot code 140 may cause electronic device 101 to enter crisis recovery mode so that the current owner may use the crisis port (e.g., I2C, UART) to recover by transferring ownership of electronic device 101.

Boot code may proceed from any of blocks 3613, 3619, and 3625 to block 3628 where it may use asset revocation information when authenticating assets. In an example where boot code arrives at block 3628 from block 3613, boot code may use asset revocation information retrieved from OTP memory (block 3616) when authenticating assets. In an example where boot code arrives at block 3628 from block 3619, boot code may use asset revocation information retrieved from the verified REC (block 3619) when authenticating assets. In an example where boot code arrives at block 3628 from block 3625, boot code may use asset revocation information retrieved from the newly created REC (block 3625) when authenticating assets.

After block 3628, boot code 140 may proceed to block 3631 where it may determine whether it can find a valid image. In an example, an image that boot code 140 authenticates and that is not revoked may be a valid image. In an example where revocation emulation feature enable 3102 is enabled, boot code 140 may copy the current owner's REC from non-volatile memory 173 to volatile memory 172 (e.g., SRAM) and authenticate the REC (in volatile memory 172) before attempting to authenticate an image. This may allow boot code 140 to use authenticated revocation emulation data (e.g., items 3503-3505 in FIG. 35) when determining whether it can find a valid image in block 3631. In an example, boot code 140 may check if the key used to sign an image has been revoked and if the image itself has been permanently removed from service (i.e., rollback protection). Boot code 140 may use the revocation and rollback protection information the same way during authentication regardless of whether the source of the revocation and rollback protection information (i.e., revocation emulation data) is OTP memory 110 or REC 3302.

If at block 3631 boot code 140 determines it has found a valid image, boot code 140 may proceed to block 3634 where it may determine whether to revoke assets. In an example, boot code 140 may determine whether to revoke assets using revocation information obtained from the current owner of electronic device 101. For example, revocation information may be provided via revocation information stored in a verified image stored in non-volatile memory. Because the image may be verified using the current owner's secret(s) (e.g., private key(s)), the current owner may maintain control over the revocation of assets such as images, hash tables, and keys, among others. In an example, boot code 140 may load and verify an image, and then check the revocation information within the image to determine whether any of the current silicon owner's assets (e.g., keys, images, hash tables) have been revoked. In an example, revocation information within a verified image may include a single permission bit corresponding to each available asset, and boot code 140 may determine an asset should be revoked if the corresponding permission bit is set within the verified image.

If at block 3634 boot code 140 determines there are assets to revoke, boot code 140 may proceed to block 3637 where it may update revocation data. In an example, if revocation emulation feature is not enabled (e.g., revocation emulation feature enable 3102 not set), boot code 140 may update revocation data in OTP memory 110 (e.g., programming corresponding bits in regions 3108-3112 (FIG. 31)). In an example, if revocation emulation feature is enabled (e.g., revocation emulation feature enable 3102 set), boot code 140 may update corresponding EOTP bits (e.g., revocation emulation data 3503-3505) in a copy of REC 3302 stored in volatile memory 172 (e.g., SRAM). (In one example, boot code 140 may copy REC 3302 from non-volatile memory 173 (e.g. SPI flash) to volatile memory 172 (e.g., SRAM) prior to verifying REC signature 3312 in block 3616. Boot code may then use the copy of REC 3302 in volatile memory 172 for the remaining blocks in FIG. 36. This approach may be more secure than operating on the REC copy in non-volatile memory 173 that may be accessed by a malicious user.) In the example where revocation emulation feature enable 3102 is enabled, boot code 140 may re-sign REC 3302 in volatile memory 172 (e.g., as described for REC signature 3312).

After updating revocation data in block 3637, boot code may proceed to block 3640, where it may update REC 3302 in non-volatile memory 173. In an example where revocation emulation feature enable 3102 is not enabled, boot code 140 may proceed from block 3640 to END block 3650 without updating REC 3302 as there may be no REC 3302 in non-volatile memory 173 in this case. In an example where revocation emulation feature enable 3102 is enabled, boot code 140 may take the following actions to update REC 3302 in non-volatile memory 173:

1. Update fallback REC in non-volatile memory 173. In an example, boot code 140 may do this by erasing the fallback REC, writing the updated fallback REC to the same location, reading the updated fallback REC from non-volatile memory 173, and verifying that the updated fallback REC read from non-volatile memory 173 is valid.

2. Increment revocation emulation container (REC) current RPMC value 3104 in OTP memory 110.

3. Update primary REC in non-volatile memory 173. In an example, boot code 140 may do this by erasing the primary REC, writing the updated primary REC to the same location, reading the updated primary REC from non-volatile memory 173, and verifying that the updated primary REC read from non-volatile memory 173 is valid.

Following block 3640, boot code 140 may proceed to END block 3650. If at block 3634 boot code 140 determines there are no assets to revoke, boot code 140 may proceed to END block 3650. In an example, boot code 140 may perform operations to exit the boot sequence in block 3650 allowing electronic device 101 to proceed with normal operation.

Although FIG. 36 discloses a particular number of operations related to method 3600, method 3600 may be executed with greater or fewer operations than those depicted in FIG. 36. For example, if boot code 140 determines there are no assets to revoke in block 3634, boot code 140 may proceed to check if the fallback REC needs to be repaired and, if so, repair it by replacing it with a copy of the valid primary REC. As another example, if a new REC cannot be generated (block 3622) or no valid images are found (block 3631) boot code 140 may proceed to a recoverable fatal error block. In addition, although FIG. 36 discloses a certain order of operations to be taken with respect to method 3600, the operations comprising method 3600 may be completed in any suitable order.

Figure 39A:
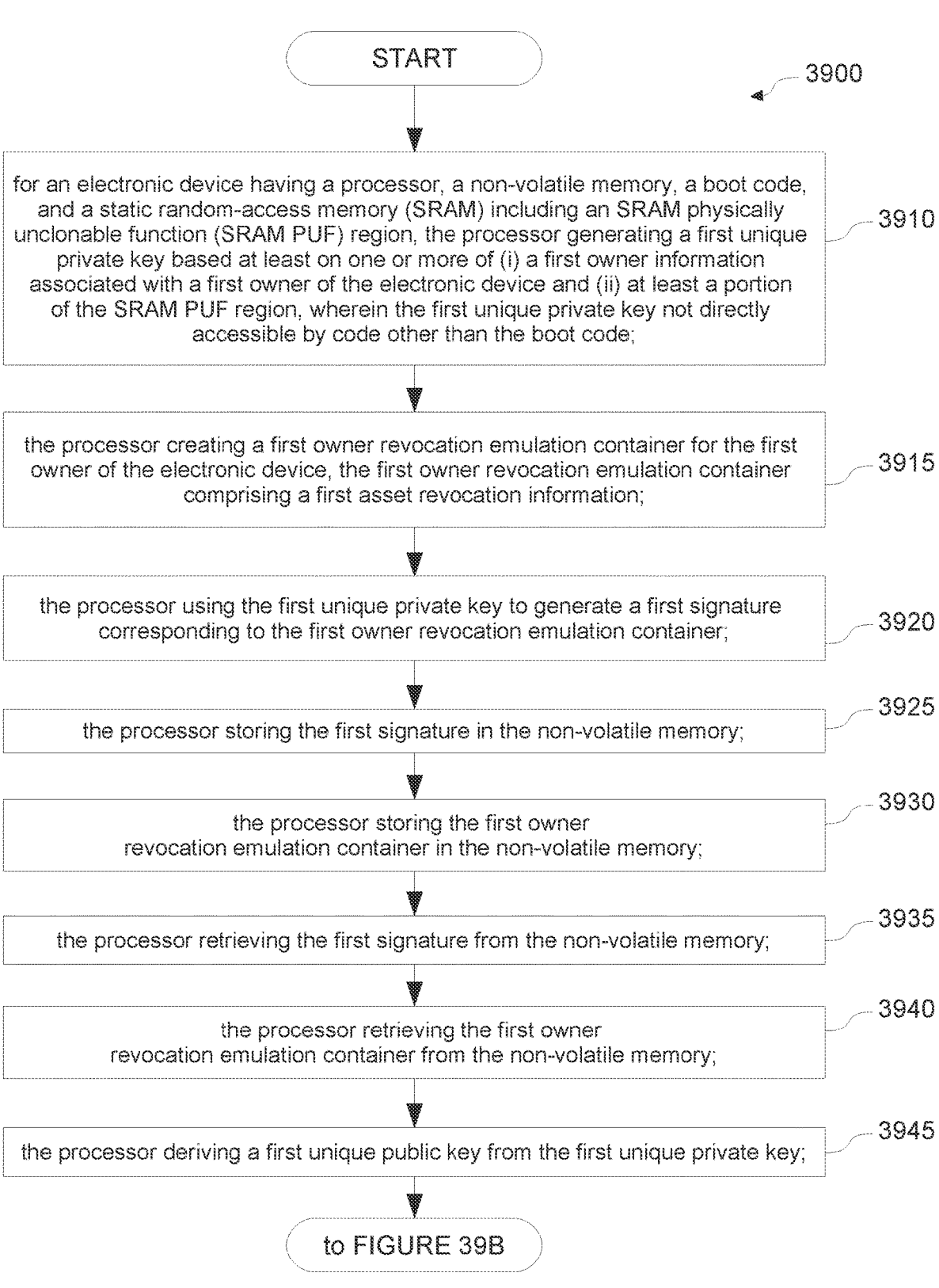

FIGS. 39A-B illustrate a flow chart of an example method 3900 for managing ownership, keys, images, and other assets related to an owner of an electronic device. According to one example, method 3900 may begin at block 3910. Teachings of the present disclosure may be implemented in a variety of configurations of system 100. As such, the initialization point for method 3900 and the order of 3910-3960 comprising method 3900 may depend on the implementation chosen.

At block 3910, for an electronic device having a processor, a non-volatile memory, a boot code, and a static random-access memory (SRAM) including an SRAM physically unclonable function (SRAM PUF) region, the processor may generate a first unique private key based at least on one or more of (i) a first owner information associated with a first owner of the electronic device and (ii) at least a portion of the SRAM PUF region, wherein the first unique private key may not be directly accessible by code other than the boot code. At block 3915, the processor may create a first owner revocation emulation container for the first owner of the electronic device, where the first owner revocation emulation container may comprise a first asset revocation information. At block 3920, the processor may use the first unique private key to generate a first signature corresponding to the first owner revocation emulation container.

At block 3925, the processor may store the first signature in the non-volatile memory. At block 3930, the processor may store the first owner revocation emulation container in the non-volatile memory. At block 3935, the processor may retrieve the first signature from the non-volatile memory. At block 3940, the processor may retrieve the first owner revocation emulation container from the non-volatile memory. At block 3945, the processor may derive a first unique public key from the first unique private key. At block 3950, the processor may use the first unique public key and the first signature retrieved from the non-volatile memory to verify the first owner revocation emulation container retrieved from the non-volatile memory.

Upon successful verification of the first owner revocation emulation container retrieved from non-volatile memory, at block 3955 the processor may use the first asset revocation information of the first owner revocation emulation container retrieved from non-volatile memory to determine whether to revoke use of a first owner asset associated with the first owner of the electronic device. In an example, the first owner asset associated with the first owner of the electronic device may be one of: a cryptographic key associated with the first owner, an executable image associated with the first owner; and a hash table associated with the first owner. At block 3960, the processor may revoke the subsequent use of the first owner asset based on a determination the first owner asset should be revoked. In an example, the processor may determine the first owner asset should be revoked by determining the first asset revocation information of the first owner revocation emulation container has been one-time programmed.

Although FIGS. 39A-B disclose a particular number of operations related to method 3900, method 3900 may be executed with greater or fewer operations than those depicted in FIGS. 39A-B. For example, after block 3960, method 3900 may continue with additional operations illustrated in FIGS. 40-42. In addition, although FIGS. 39A-B disclose a certain order of operations to be taken with respect to method 3900, the operations comprising method 3900 may be completed in any suitable order.

Figure 40:
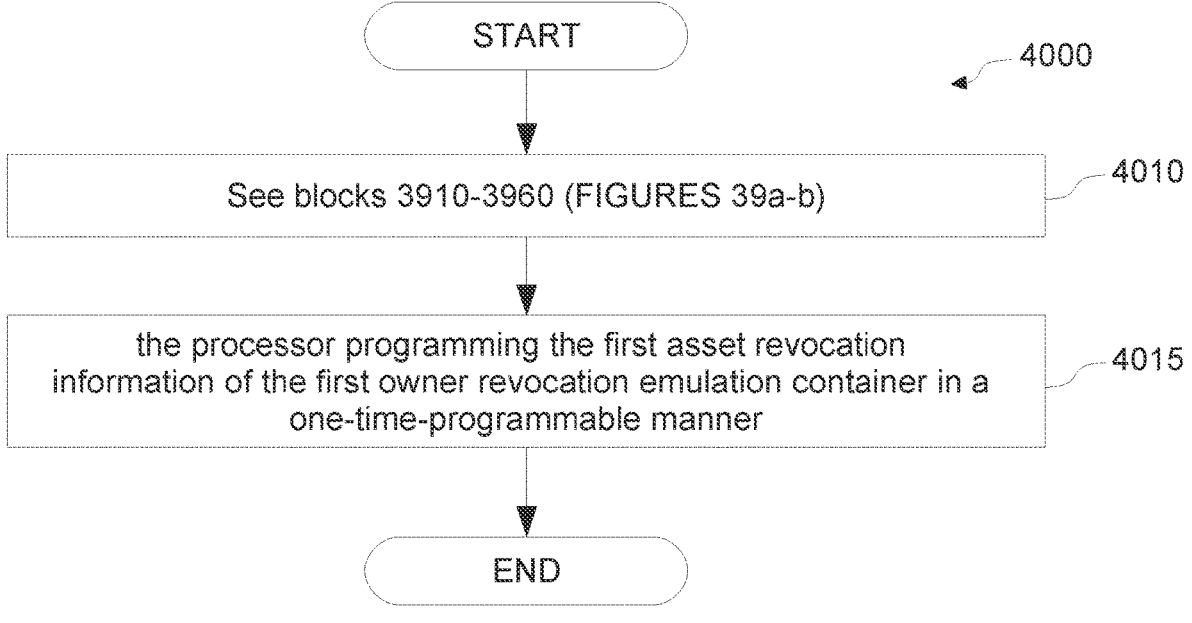

FIG. 40 illustrates a flow chart of an example method 4000 for managing ownership, keys, images, and other assets related to an owner of an electronic device. According to one example, method 4000 may begin at block 4010. Teachings of the present disclosure may be implemented in a variety of configurations of system 100. As such, the initialization point for method 4000 and the order of 4010-4015 comprising method 4000 may depend on the implementation chosen.

According to an example, block 4010 may be the same as blocks 3910-3960 in FIGS. 39A-B. At block 4015, the processor may program the first asset revocation information of the first owner revocation emulation container in a one-time-programmable manner. In an example, the processor may execute trusted boot code 140 (e.g., immutable boot code or an authenticated ROM extension in FMC) that may program the first asset revocation information of the first owner revocation emulation container, and no commands may be provided in boot code 140 (or other code) to un-program that information.

Although FIG. 40 discloses a particular number of operations related to method 4000, method 4000 may be executed with greater or fewer operations than those depicted in FIG. 40. In addition, although FIG. 40 discloses a certain order of operations to be taken with respect to method 4000, the operations comprising method 4000 may be completed in any suitable order.

Figure 41:
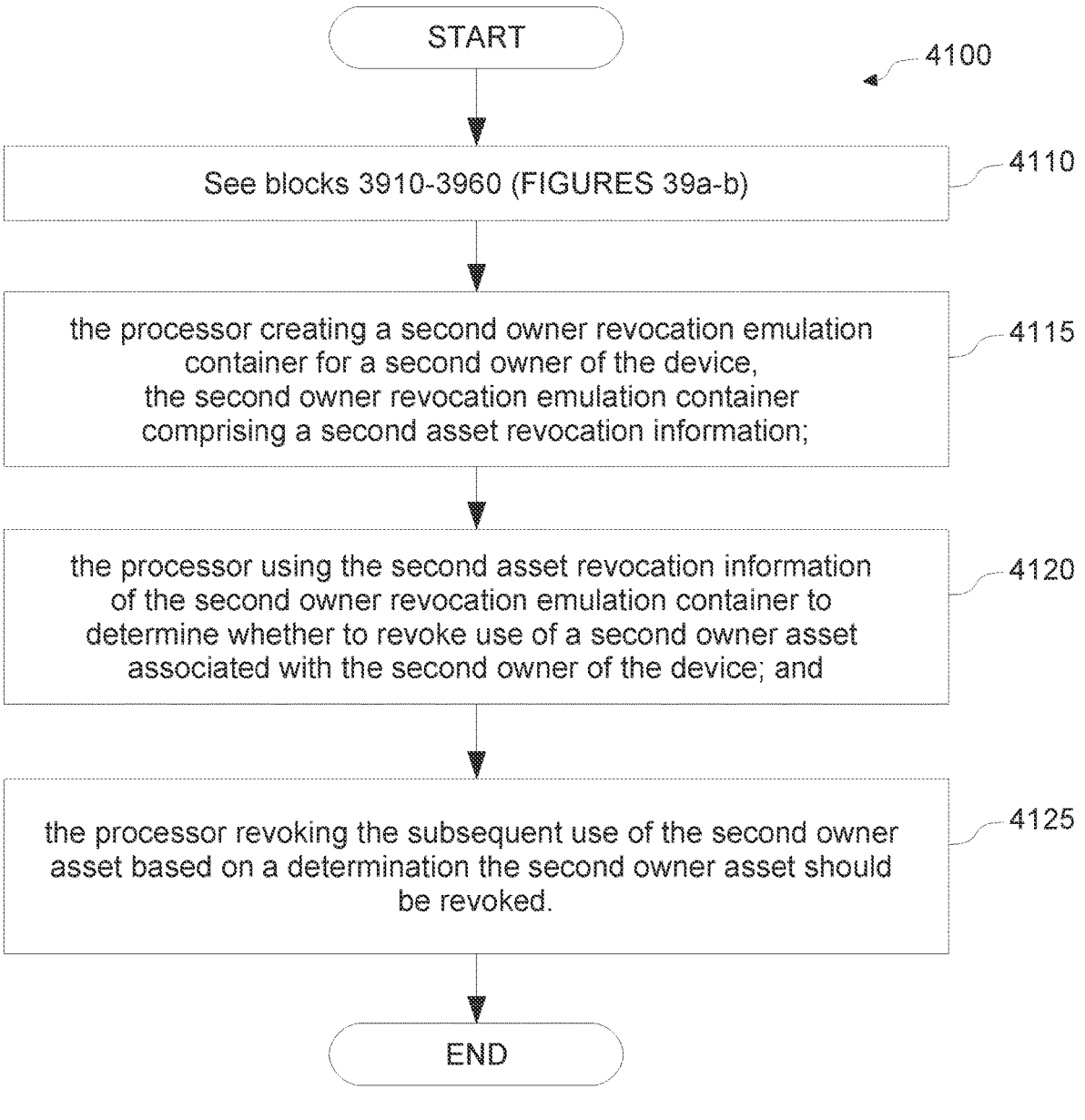

FIG. 41 illustrates a flow chart of an example method 4100 for managing ownership, keys, images, and other assets related to an owner of an electronic device. According to one example, method 4100 may begin at block 4110. Teachings of the present disclosure may be implemented in a variety of configurations of system 100. As such, the initialization point for method 4100 and the order of 4110-4125 comprising method 4100 may depend on the implementation chosen.

According to an example, block 4110 may be the same as blocks 3910-3960 in FIGS. 39A-B. At block 4115, the processor may create a second owner revocation emulation container for a second owner of the device, the second owner revocation emulation container may comprise a second asset revocation information. At block 4120, the processor may use the second asset revocation information of the second owner revocation emulation container to determine whether to revoke use of a second owner asset associated with the second owner of the device. At block 4125, the processor may revoke the subsequent use of the second owner asset based on a determination the second owner asset should be revoked.

Although FIG. 41 discloses a particular number of operations related to method 4100, method 4100 may be executed with greater or fewer operations than those depicted in FIG. 41. For example, after block 4125, method 4100 may continue with additional operations illustrated in FIG. 42. In addition, although FIG. 41 discloses a certain order of operations to be taken with respect to method 4100, the operations comprising method 4100 may be completed in any suitable order.

FIG. 42 illustrates a flow chart of an example method 4200 for managing ownership, keys, images, and other assets related to an owner of an electronic device. According to one example, method 4200 may begin at block 4210. Teachings of the present disclosure may be implemented in a variety of configurations of system 100. As such, the initialization point for method 4200 and the order of 4210-4250 comprising method 4200 may depend on the implementation chosen.

According to an example, block 4210 may be the same as blocks 4110-4125 in FIG. 41. At block 4215, the processor may generate a second unique private key based at least on one or more of (i) a second owner information associated with the second owner of the device and (ii) at least a portion of the SRAM PUF region, wherein the second unique private key may not be directly accessible by code other than the boot code. At block 4220, the processor may use the second unique private key to generate a second signature corresponding to the second owner revocation emulation container. At block 4225, the processor may store the second signature in the non-volatile memory. At block 4230, the processor may store the second owner revocation emulation container in the non-volatile memory. At block 4235, the processor may retrieve the second signature from the non-volatile memory. At block 4240, the processor may retrieve the second owner revocation emulation container from the non-volatile memory. At block 4245, the processor may derive a second unique public key from the second unique private key. At block 4250, the processor may use the second unique public key and the second signature retrieved from the non-volatile memory to verify the second owner revocation emulation container retrieved from the non-volatile memory.

Although FIG. 42 discloses a particular number of operations related to method 4200, method 4200 may be executed with greater or fewer operations than those depicted in FIG. 42. In addition, although FIG. 42 discloses a certain order of operations to be taken with respect to method 4200, the operations comprising method 4200 may be completed in any suitable order.

FIG. 43 illustrates a flow chart of an example method 4300 for managing ownership, keys, images, and other assets related to an owner of an electronic device. According to one example, method 4300 may begin at block 4310. Teachings of the present disclosure may be implemented in a variety of configurations of system 100. As such, the initialization point for method 4300 and the order of 4310-4325 comprising method 4300 may depend on the implementation chosen.

At block 4310, for an electronic device having a processor and a boot code, the processor may create a plurality of revocation emulation containers corresponding to a plurality of owners of the electronic device over time, wherein respective revocation emulation containers may comprise asset revocation information associated with respective owners of the electronic device. At block 4315, the processor may program the asset revocation information of the plurality of revocation emulation containers in a one-time-programmable manner. At block 4320, the processor may use the asset revocation information of the plurality of revocation emulation containers to determine whether to revoke use of respective assets of a plurality of assets associated with the plurality of owners of the electronic device over time. In an example, respective assets of the plurality of assets associated with the plurality of owners of the electronic device over time may comprise one of: a cryptographic key associated respective owners of the plurality of owners, an executable image associated with respective owners of the plurality of owners; and a hash table associated with respective owners of the plurality of owners. At block 4325, the processor may revoke the subsequent use of respective assets of the plurality of assets associated with the plurality of owners of the electronic device over time based on a determination the respective asset should be revoked. In an example, the processor may determine the respective asset should be revoked by determining respective asset revocation information of the respective revocation emulation container of the plurality of revocation emulation containers has been one-time programmed.

Although FIG. 43 discloses a particular number of operations related to method 4300, method 4300 may be executed with greater or fewer operations than those depicted in FIG. 43. For example, after block 4325, method 4300 may continue with additional operations illustrated in FIG. 44. In addition, although FIG. 43 discloses a certain order of operations to be taken with respect to method 4300, the operations comprising method 4300 may be completed in any suitable order.

Figure 44:
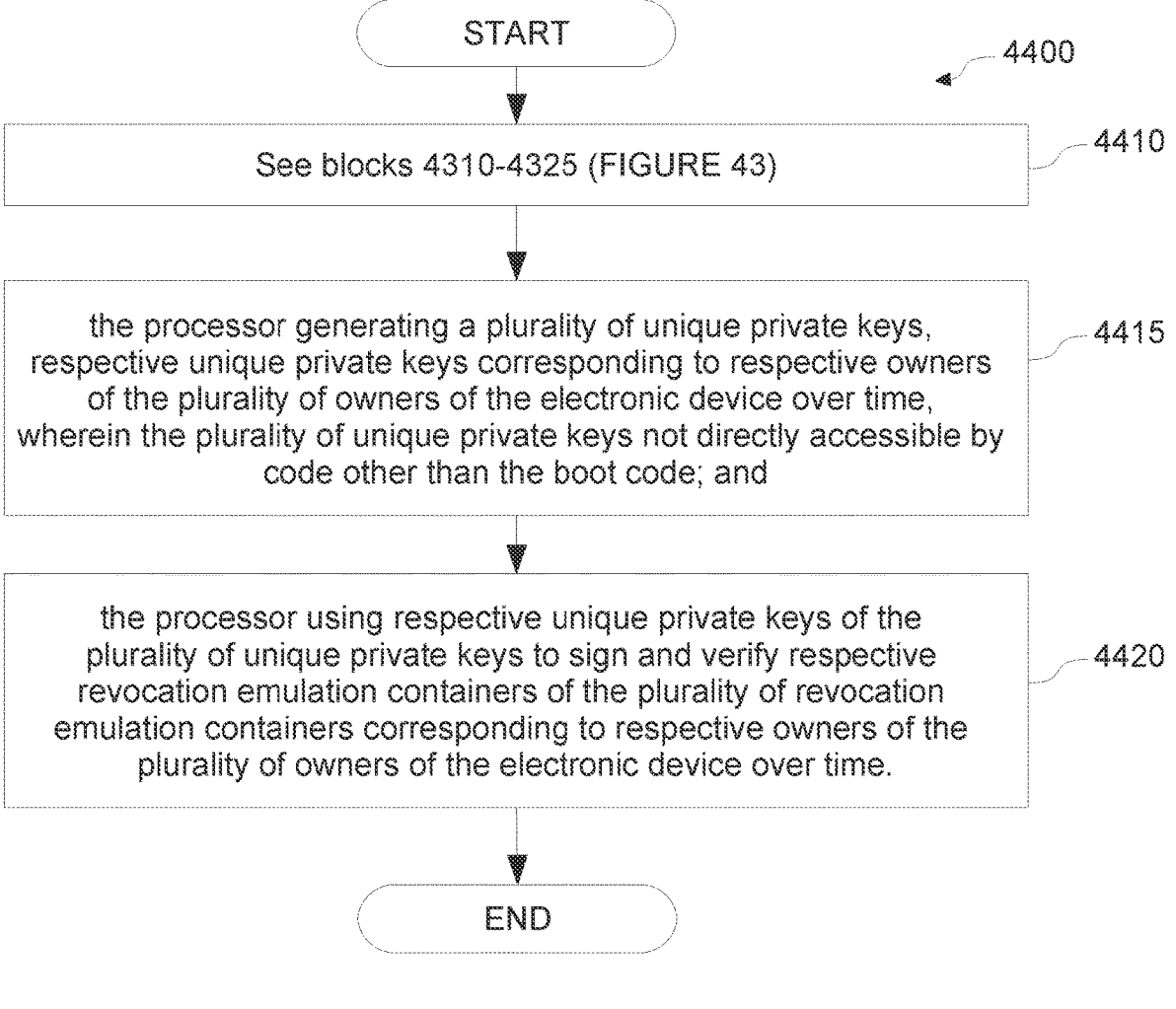

FIG. 44 illustrates a flow chart of an example method 4400 for managing ownership, keys, images, and other assets related to an owner of an electronic device. According to one example, method 4400 may begin at block 4410. Teachings of the present disclosure may be implemented in a variety of configurations of system 100. As such, the initialization point for method 4400 and the order of 4410-4420 comprising method 4400 may depend on the implementation chosen.

According to an example, block 4410 may be the same as blocks 4310-4325 in FIG. 43. At block 4415, the processor may generate a plurality of unique private keys, respective unique private keys corresponding to respective owners of the plurality of owners of the electronic device over time, wherein the plurality of unique private keys may not be directly accessible by code other than the boot code. In an example, the processor may generate respective unique private keys of the plurality of unique private keys based at least on one or more of (i) owner information associated with respective owners of the plurality of owners of the electronic device and (ii) at least a portion of a static random-access memory (SRAM) physically unclonable function (SRAM PUF) region of the electronic device. At block 4420, the processor may use respective unique private keys of the plurality of unique private keys to sign and verify respective revocation emulation containers of the plurality of revocation emulation containers corresponding to respective owners of the plurality of owners of the electronic device over time.

Although FIG. 44 discloses a particular number of operations related to method 4400, method 4400 may be executed with greater or fewer operations than those depicted in FIG. 44. In addition, although FIG. 44 discloses a certain order of operations to be taken with respect to method 4400, the operations comprising method 4400 may be completed in any suitable order.

Methods 1700, 2000-3000, 3600, and 3900-4400 may be implemented using system 100 or any other system operable to implement methods 1700, 2000-3000, 3600, and 3900-4400. Although examples have been described above, other variations and examples may be made from this disclosure without departing from the spirit and scope of these disclosed examples.

The invention claimed is:

1. A device, comprising:
a boot code;
a non-volatile memory;
the boot code executable by a processor to:
generate a first unique private key, wherein the first unique private key is not directly accessible by code other than the boot code;
create a first owner revocation emulation container for a first owner of the device, the first owner revocation emulation container comprising a first asset revocation information;
use the first unique private key to generate a first signature corresponding to the first owner revocation emulation container;
store the first signature in the non-volatile memory;
store the first owner revocation emulation container in the non-volatile memory;
retrieve the first signature from the non-volatile memory;
retrieve the first owner revocation emulation container from the non-volatile memory;
derive a first unique public key from the first unique private key;
use the first unique public key and the first signature retrieved from the non-volatile memory to verify the first owner revocation emulation container retrieved from the non-volatile memory;
after successful verification of the first owner revocation emulation container retrieved from the non-volatile memory, use the first asset revocation information of the first owner revocation emulation container retrieved from the non-volatile memory to determine whether to revoke use of a first owner asset associated with the first owner of the device; and
revoke the subsequent use of the first owner asset based on a determination the first owner asset should be revoked.

2. The device of claim 1, wherein the boot code comprises immutable boot code stored in read-only memory.

3. The device of claim 1, comprising:
a static random-access memory (SRAM) including a SRAM physically unclonable function (SRAM PUF) region;
wherein the boot code executable by the processor to generate a first unique private key comprises the boot code executable by the processor to generate a first unique private key based at least on one or more of (i) a first owner information associated with the first owner of the device and (ii) at least a portion of the SRAM PUF region.

4. The device of claim 1, wherein the boot code executable by the processor to:
program the first asset revocation information of the first owner revocation emulation container in a one-time-programmable manner.

5. The device of claim 4, wherein programming the first asset revocation information of the first owner revocation emulation container in a one-time-programmable manner comprises an absence of boot code to modify the first asset revocation information of the first owner revocation emulation container after it has been programmed by the boot code.

6. The device of claim 4, wherein the boot code executable by the processor to revoke the subsequent use of the first owner asset based on a determination the first owner asset should be revoked comprises determining the first asset revocation information of the first owner revocation emulation container has been one-time programmed.

7. The device of claim 1, wherein the first owner asset associated with the first owner of the device comprises one of: a cryptographic key associated with the first owner, an executable image associated with the first owner; and a hash table associated with the first owner.

8. The device of claim 1, wherein the boot code executable by the processor to:
create a second owner revocation emulation container for a second owner of the device, the second owner revocation emulation container comprising a second asset revocation information;
use the second asset revocation information of the second owner revocation emulation container to determine whether to revoke use of a second owner asset associated with the second owner of the device; and
revoke the subsequent use of the second owner asset based on a determination the second owner asset should be revoked.

9. The device of claim 8, comprising:
a static random-access memory (SRAM) including a SRAM physically unclonable function (SRAM PUF) region;
wherein the boot code executable by the processor to:
generate a second unique private key based at least on one or more of (i) a second owner information associated with the second owner of the device and (ii) at least a portion of the SRAM PUF region, wherein the second unique private key not directly accessible by code other than the boot code;
use the second unique private key to generate a second signature corresponding to the second owner revocation emulation container;
store the second signature in the non-volatile memory;
store the second owner revocation emulation container in the non-volatile memory;
retrieve the second signature from the non-volatile memory;
retrieve the second owner revocation emulation container from the non-volatile memory;
derive a second unique public key from the second unique private key;
use the second unique public key and the second signature retrieved from the non-volatile memory to verify the second owner revocation emulation container retrieved from the non-volatile memory.

10. A method, comprising:
for an electronic device having a processor, a non-volatile memory, a boot code, and a static random-access memory (SRAM) including an SRAM physically unclonable function (SRAM PUF) region, the processor generating a first unique private key based at least on one or more of (i) a first owner information associated with a first owner of the electronic device and (ii) at least a portion of the SRAM PUF region, wherein the first unique private key not directly accessible by code other than the boot code;
the processor creating a first owner revocation emulation container for the first owner of the electronic device, the first owner revocation emulation container comprising a first asset revocation information;

the processor using the first unique private key to generate a first signature corresponding to the first owner revocation emulation container;

the processor storing the first signature in the non-volatile memory;

the processor storing the first owner revocation emulation container in the non-volatile memory;

the processor retrieving the first signature from the non-volatile memory;

the processor retrieving the first owner revocation emulation container from the non-volatile memory;

the processor deriving a first unique public key from the first unique private key;

the processor using the first unique public key and the first signature retrieved from the non-volatile memory to verify the first owner revocation emulation container retrieved from the non-volatile memory;

upon successful verification of the first owner revocation emulation container retrieved from non-volatile memory, the processor using the first asset revocation information of the first owner revocation emulation container retrieved from non-volatile memory to determine whether to revoke use of a first owner asset associated with the first owner of the electronic device; and the processor revoking the subsequent use of the first owner asset based on a determination the first owner asset should be revoked.

11. The method of claim 10, comprising:

the processor programming the first asset revocation information of the first owner revocation emulation container in a one-time-programmable manner.

12. The method of claim 11, wherein the processor revoking the subsequent use of the first owner asset based on a determination the first owner asset should be revoked comprises determining the first asset revocation information of the first owner revocation emulation container has been one-time programmed.

13. The method of claim 10, wherein the first owner asset associated with the first owner of the electronic device comprises one of: a cryptographic key associated with the first owner, an executable image associated with the first owner; and a hash table associated with the first owner.

14. The method of claim 10, comprising:

the processor creating a second owner revocation emulation container for a second owner of the device, the second owner revocation emulation container comprising a second asset revocation information;

the processor using the second asset revocation information of the second owner revocation emulation container to determine whether to revoke use of a second owner asset associated with the second owner of the device; and the processor revoking the subsequent use of the second owner asset based on a determination the second owner asset should be revoked.

15. The method of claim 14, comprising:

the processor generating a second unique private key based at least on one or more of (i) a second owner information associated with the second owner of the device and (ii) at least a portion of the SRAM PUF region, wherein the second unique private key not directly accessible by code other than the boot code;

the processor using the second unique private key to generate a second signature corresponding to the second owner revocation emulation container;

the processor storing the second signature in the non-volatile memory;

the processor storing the second owner revocation emulation container in the non-volatile memory;

the processor retrieving the second signature from the non-volatile memory;

the processor retrieving the second owner revocation emulation container from the non-volatile memory;

the processor deriving a second unique public key from the second unique private key;

the processor using the second unique public key and the second signature retrieved from the non-volatile memory to verify the second owner revocation emulation container retrieved from the non-volatile memory.

* * * * *